US012726972B2

(12) United States Patent
Wang et al.

(10) Patent No.: US 12,726,972 B2
(45) **Date of Patent: *Sep. 1, 2026**

(54) MULTI-USER PARALLEL CHANNEL ACCESS IN WLAN SYSTEMS

(71) Applicant: InterDigital Patent Holdings, Inc., Wilmington, DE (US)

(72) Inventors: Xiaofei Wang, North Caldwell, NJ (US); Hanqing Lou, Syosset, NY (US); Monisha Ghosh, Chicago, IL (US); Nirav B. Shah, San Diego, CA (US); Guodong Zhang, Woodbury, NY (US); Ronald G. Murias, Calgary (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/286,806

(22) Filed: Jul. 31, 2025

(65) Prior Publication Data

US 2026/0075604 A1 Mar. 12, 2026

Related U.S. Application Data

(63) Continuation of application No. 18/453,813, filed on Aug. 22, 2023, now Pat. No. 12,543,164, which is a
(Continued)

(51) Int. Cl.
*H04W 72/121* (2023.01)
*H04L 1/00* (2006.01)
(Continued)

(52) U.S. Cl.
CPC ......... *H04W 72/121* (2013.01); *H04L 1/0025* (2013.01); *H04L 1/1664* (2013.01);
(Continued)

(58) Field of Classification Search
CPC ............... H04W 72/121; H04W 72/04; H04W 72/0453; H04W 72/20; H04W 72/21;
(Continued)

(56) References Cited

U.S. PATENT DOCUMENTS

| | | | |
|---|---|---|---|
| 5,768,264 | A | 6/1998 | Anderson et al. |
| 7,054,296 | B1 | 5/2006 | Sorrells et al. |

(Continued)

FOREIGN PATENT DOCUMENTS

| | | | |
|---|---|---|---|
| CN | 1871806 | A | 11/2006 |
| CN | 101656644 | A | 2/2010 |

(Continued)

OTHER PUBLICATIONS

Zhao, et al., "Applying Opportunistic Medium Access and Multiuser MIMO Techniques in Multi-Channel Multi-Radio WLANs", Dept. of Electrical & Computer Engineering State University of New York, Stony Brook, NY 11794, USA, Jan. 28, 2009, 22 pages.

(Continued)

*Primary Examiner* — Ashley Shivers
(74) *Attorney, Agent, or Firm* — Flaster Greenberg P.C.

(57) ABSTRACT

Methods and apparatuses are related to multi-user parallel channel access (MU-PCA). For example, a wireless transmit/receive unit (WTRU) is provided that is one of the plurality of WTRUs operable to simultaneously communicate via a plurality of channels managed by an access point (AP). The WTRU includes a receiver configured to receive, from the AP, over at least one channel of the plurality of channels, a group poll (G-Poll) message that includes a resource allocation that indicates at least one allocated channel of the plurality of channels for the WTRU; and a transmitter configured to transmit an uplink request message, to the AP in response to the G-Poll message, over the at least one allocated channel of the plurality of channels, the
(Continued)

uplink request message corresponding to uplink data the WTRU has for transmission to the AP.

20 Claims, 25 Drawing Sheets

Related U.S. Application Data continuation of application No. 17/978,250, filed on Nov. 1, 2022, now Pat. No. 11,770,819, which is a continuation of application No. 16/747,254, filed on Jan. 20, 2020, now Pat. No. 11,528,723, which is a continuation of application No. 16/298,712, filed on Mar. 11, 2019, now Pat. No. 10,542,555, which is a continuation of application No. 15/826,818, filed on Nov. 30, 2017, now Pat. No. 10,231,251, which is a continuation of application No. 15/581,261, filed on Apr. 28, 2017, now Pat. No. 9,860,908, which is a continuation of application No. 15/097,048, filed on Apr. 12, 2016, now Pat. No. 9,681,462, which is a continuation of application No. 13/781,909, filed on Mar. 1, 2013, now Pat. No. 9,338,789.

(60) Provisional application No. 61/684,051, filed on Aug. 16, 2012, provisional application No. 61/669,505, filed on Jul. 9, 2012, provisional application No. 61/605,538, filed on Mar. 1, 2012.

(51) Int. Cl.

| | |
|---|---|
| ***H04L 1/1607*** | (2023.01) |
| ***H04L 1/1829*** | (2023.01) |
| ***H04W 72/04*** | (2023.01) |
| ***H04W 72/0453*** | (2023.01) |
| ***H04W 72/20*** | (2023.01) |
| ***H04W 72/21*** | (2023.01) |
| ***H04W 74/00*** | (2009.01) |
| ***H04W 74/04*** | (2009.01) |
| ***H04W 74/06*** | (2009.01) |
| ***H04W 74/0816*** | (2024.01) |
| *H04B 17/318* | (2015.01) |
| *H04W 84/12* | (2009.01) |

(52) U.S. Cl.
CPC .......... *H04L 1/1685* (2013.01); *H04L 1/1861* (2013.01); *H04W 72/04* (2013.01); *H04W 72/0453* (2013.01); *H04W 72/20* (2023.01); *H04W 72/21* (2023.01); *H04W 74/004* (2013.01); *H04W 74/006* (2013.01); *H04W 74/04* (2013.01); *H04W 74/06* (2013.01); *H04W 74/0816* (2013.01); *H04B 17/318* (2015.01); *H04L 1/007* (2013.01); *H04W 84/12* (2013.01)

(58) Field of Classification Search
CPC . H04W 74/004; H04W 74/006; H04W 74/04; H04W 74/06; H04W 74/0816; H04W 84/12; H04L 1/0025; H04L 1/1664; H04L 1/1685; H04L 1/1861; H04L 1/007; H04B 17/318
See application file for complete search history.

(56) References Cited

U.S. PATENT DOCUMENTS

| | | | |
|---|---|---|---|
| 7,058,071 | B1 | 6/2006 | Myles et al. |
| 8,274,961 | B2 | 9/2012 | Sakoda et al. |
| 8,306,010 | B2 | 11/2012 | Gong et al. |
| 8,498,359 | B2 | 7/2013 | Lauer et al. |
| 8,582,485 | B2 | 11/2013 | Fischer et al. |
| 8,730,884 | B2 | 5/2014 | Kim |
| 8,842,606 | B2 | 9/2014 | Denteneer et al. |
| 8,971,264 | B2 | 3/2015 | Kwon et al. |
| 8,989,161 | B2 | 3/2015 | Kim et al. |
| 9,113,313 | B2 | 8/2015 | Cheong et al. |
| 9,173,234 | B2 | 10/2015 | Merlin et al. |
| 9,210,719 | B2 | 12/2015 | Habetha et al. |
| 9,338,789 | B2 | 5/2016 | Wang et al. |
| 9,363,753 | B2 | 6/2016 | Damnjanovic et al. |
| 9,407,342 | B2 | 8/2016 | Gong et al. |
| 9,497,342 | B2 | 11/2016 | Miyazaki |
| 9,564,999 | B2 | 2/2017 | Kim et al. |
| 9,585,043 | B2 | 2/2017 | Grandhi |
| 2005/0018638 | A1 | 1/2005 | Lindskog et al. |
| 2005/0058151 | A1 | 3/2005 | Yeh |
| 2005/0089005 | A1 | 4/2005 | Sakoda et al. |
| 2005/0111398 | A1 | 5/2005 | Wybenga et al. |
| 2005/0138199 | A1 | 6/2005 | Li et al. |
| 2005/0141448 | A1 | 6/2005 | Bolinth et al. |
| 2005/0195786 | A1 | 9/2005 | Shpak |
| 2006/0041676 | A1 | 2/2006 | Sherman |
| 2007/0076742 | A1 | 4/2007 | Du et al. |
| 2007/0171933 | A1 | 7/2007 | Sammour et al. |
| 2007/0211620 | A1 | 9/2007 | Mcbeath et al. |
| 2007/0248104 | A1 | 10/2007 | Rudolf et al. |
| 2007/0291674 | A1 | 12/2007 | Cheng et al. |
| 2007/0297353 | A1 | 12/2007 | Habetha et al. |
| 2008/0112351 | A1 | 5/2008 | Surineni et al. |
| 2009/0238095 | A1 | 9/2009 | Blackwell et al. |
| 2010/0046457 | A1 | 2/2010 | Abraham et al. |
| 2010/0054145 | A1 | 3/2010 | Frenger et al. |
| 2010/0080173 | A1 | 4/2010 | Takagi |
| 2010/0189025 | A1 | 7/2010 | Cheng |
| 2010/0260114 | A1 | 10/2010 | Vermani et al. |
| 2010/0260138 | A1 | 10/2010 | Liu et al. |
| 2010/0311432 | A1 | 12/2010 | Lauer et al. |
| 2011/0002319 | A1 | 1/2011 | Husen et al. |
| 2011/0038360 | A1 | 2/2011 | Ho |
| 2011/0044298 | A1 | 2/2011 | Wentink et al. |
| 2011/0090855 | A1 | 4/2011 | Kim |
| 2011/0110349 | A1 | 5/2011 | Grandhi |
| 2011/0116487 | A1 | 5/2011 | Grandhi |
| 2011/0149918 | A1 | 6/2011 | Gong et al. |
| 2011/0150004 | A1 | 6/2011 | Denteneer et al. |
| 2011/0158159 | A1 | 6/2011 | Gong et al. |
| 2011/0194644 | A1 | 8/2011 | Liu et al. |
| 2011/0205969 | A1 | 8/2011 | Ahmad et al. |
| 2011/0222486 | A1 | 9/2011 | Hart |
| 2011/0243025 | A1 | 10/2011 | Kim et al. |
| 2011/0261708 | A1 | 10/2011 | Grandhi |
| 2011/0268054 | A1 | 11/2011 | Abraham et al. |
| 2011/0305216 | A1* | 12/2011 | Seok ..................... H04W 74/08 370/329 |
| 2011/0310834 | A1 | 12/2011 | Seok |
| 2011/0317630 | A1* | 12/2011 | Zhu .................. H04W 74/0816 370/329 |
| 2011/0317633 | A1 | 12/2011 | Tan et al. |
| 2012/0020243 | A1 | 1/2012 | Gong |
| 2012/0020312 | A1 | 1/2012 | Lv et al. |
| 2012/0026928 | A1 | 2/2012 | Gong et al. |
| 2012/0044904 | A1 | 2/2012 | Takano et al. |
| 2012/0051334 | A1 | 3/2012 | Sridhara et al. |
| 2012/0057471 | A1 | 3/2012 | Amini et al. |
| 2012/0076073 | A1 | 3/2012 | Merlin et al. |
| 2012/0087358 | A1 | 4/2012 | Zhu et al. |
| 2012/0099555 | A1 | 4/2012 | Yoshii et al. |
| 2012/0134324 | A1 | 5/2012 | Chu et al. |
| 2012/0163483 | A1 | 6/2012 | Stacey et al. |
| 2012/0177017 | A1 | 7/2012 | Gong et al. |
| 2012/0182963 | A1 | 7/2012 | Kneckt et al. |
| 2012/0207036 | A1 | 8/2012 | Ong et al. |
| 2012/0230242 | A1 | 9/2012 | Kim et al. |
| 2012/0230317 | A1 | 9/2012 | Kim et al. |
| 2012/0243485 | A1 | 9/2012 | Merlin et al. |
| 2012/0269183 | A1 | 10/2012 | Sohn et al. |
| 2012/0300707 | A1 | 11/2012 | Gong et al. |
| 2013/0044607 | A1 | 2/2013 | Liu et al. |

(56) References Cited

U.S. PATENT DOCUMENTS

| | | | |
|---|---|---|---|
| 2013/0058218 A1 | 3/2013 | Wu et al. | |
| 2013/0077554 A1 | 3/2013 | Gauvreau et al. | |
| 2013/0128809 A1* | 5/2013 | Wentink | H04L 45/74 370/328 |
| 2013/0145224 A1 | 6/2013 | Kim et al. | |
| 2013/0170427 A1 | 7/2013 | Gong et al. | |
| 2013/0188610 A1 | 7/2013 | Fischer | |
| 2013/0223351 A1 | 8/2013 | Flammer, III | |
| 2013/0229996 A1 | 9/2013 | Wang et al. | |
| 2013/0252651 A1 | 9/2013 | Zavadsky et al. | |
| 2013/0286959 A1 | 10/2013 | Lou et al. | |
| 2013/0301569 A1 | 11/2013 | Wang et al. | |
| 2013/0301605 A1 | 11/2013 | Kim et al. | |
| 2013/0315211 A1 | 11/2013 | Balan et al. | |
| 2013/0336306 A1 | 12/2013 | Sohn et al. | |
| 2014/0003414 A1 | 1/2014 | Choudhury et al. | |
| 2014/0079016 A1 | 3/2014 | Dai et al. | |
| 2014/0098724 A1 | 4/2014 | Park et al. | |
| 2014/0119288 A1 | 5/2014 | Zhu et al. | |
| 2015/0003422 A1 | 1/2015 | Jin et al. | |
| 2015/0055577 A1 | 2/2015 | Han et al. | |
| 2015/0071051 A1 | 3/2015 | Zhu et al. | |
| 2015/0103767 A1 | 4/2015 | Kim et al. | |
| 2015/0244619 A1 | 8/2015 | Zheng et al. | |
| 2015/0249529 A1 | 9/2015 | Zheng et al. | |
| 2015/0250003 A1 | 9/2015 | Seok et al. | |
| 2016/0255656 A1 | 9/2016 | Lou et al. | |

FOREIGN PATENT DOCUMENTS

| | | | |
|---|---|---|---|
| CN | 102013959 A | 4/2011 |
| CN | 102771059 A | 11/2012 |
| CN | 102783201 A | 11/2012 |
| CN | 102845101 A | 12/2012 |
| CN | 102893534 A | 1/2013 |
| CN | 102893534 B | 5/2016 |
| CN | 102771059 B | 7/2016 |
| CN | 102845101 B | 8/2016 |
| EP | 2034652 A1 | 3/2009 |
| EP | 2034652 B1 | 2/2016 |
| EP | 3425839 B1 | 5/2024 |
| JP | 2007511972 A | 5/2007 |
| JP | 2007214920 A | 8/2007 |
| JP | 2013541293 A | 11/2013 |
| KR | 20130112733 A | 10/2013 |
| TW | 200929944 A | 7/2009 |
| WO | 2005112355 A1 | 11/2005 |
| WO | 2007038118 A2 | 4/2007 |
| WO | 2011090567 A2 | 7/2011 |
| WO | 2011099729 A2 | 8/2011 |
| WO | 2011100467 A2 | 8/2011 |
| WO | 2011115408 A2 | 9/2011 |
| WO | 2011123625 A1 | 10/2011 |
| WO | 2011123631 A1 | 10/2011 |
| WO | 2011130344 A1 | 10/2011 |
| WO | 2012028034 A1 | 3/2012 |
| WO | 2012039783 A1 | 3/2012 |
| WO | 2012040495 A1 | 3/2012 |

OTHER PUBLICATIONS

3GPP TS 36.211 V10.4.0, "Physical Channels and Modulation", Third Generation Partnership Project, Technical Specification Group Radio Access Network; Evolved Universal Terrestrial Radio Access (E-UTRA);(Release 10), Dec. 2011, 101 pages.

3GPP TS 36.211 V10.6.0, "Physical Channels and Modulation", Third Generation Partnership Project, Technical Specification Group Radio Access Network; Evolved Universal Terrestrial Radio Access (E-UTRA) (Release 10), Dec. 2012, 101 pages.

3GPP TS 36.211 V10.7.0, "Physical Channels and Modulation (Release 10)", 3rd Generation Partnership Project, Technical Specification Group Radio Access Network; Evolved Universal Terrestrial Radio Access (EUTRA), Feb. 2013, 101 Pages.

3GPP TS 36.211 V11. 1.0, "Physical Channels and Modulation", Third Generation Partnership Project, Technical Specification Group Radio Access Network; Evolved Universal Terrestrial Radio Access (E-UTRA); (Release 11), Dec. 2012, 108 pages.

3GPP TS 36.211 V11.4.0, "Evolved Universal Terrestrial Radio Access (EUTRA); Physical Channels and Modulation (Release 11)", 3rd Generation Partnership Project; Technical Specification Group Radio Access Network;, Sep. 2013, 120 Pages.

3GPP TS 36.211 V11.6.0, "Evolved Universal Terrestrial Radio Access (E-UTRA); Physical channels and modulation (Release 11", 3rd Generation Partnership Project; Technical Specification Group Radio Access Network, Sep. 2014, 120 Pages.

3GPP TS 36.211 V12.3.0, "Evolved Universal Terrestrial Radio Access (E-UTRA); Physical channels and modulation (Release 12)", 3GPP TS 36.211 V12.3.0, 3rd Generation Partnership Project; Technical Specification Group Radio Access Network, Sep. 2014, 124 pages.

3GPP TS 36.211 V8.9.0, "3rd Generation Partnership Project (3GPP)", Technical Specification Group Radio Access Network; Evolved Universal Terrestrial Radio Access (E-UTRA); Physical Channels and Modulation (Release 8), Dec. 2009, 83 pages.

3GPP TS 36.211 V9.1.0, "Evolved Universal Terrestrial Radio Access (EUTRA); Physical Channels and Modulation (Release 9)", 3rd Generation Partnership Project; Technical Specification Group Radio Access Network;, Mar. 2010, 85 Pages.

Breit, et al., "IEEE P802.11 Wireless LANs: TGac Channel Model Addendum", IEEE 802.11-09/0308r5, May 2009, 8 pages.

Erceg, et al., "IEEE P802.11 Wireless LANs: TGn Channel Models", EEE 802.11-03/940r4, May 10, 2004, 45 Pages.

He Yong, "Wireless Network Design and Implementation Based on WLAN", China Telecom Co.ltd. Zhenjiang branch, Nanjing University of Science and Technology, Master's Thesis of Engineering, Oct. 2010, 58 pages.

IEEE 802.11-15/0132R15, "Specification Framework for TGax", IEEE P802.112 Wireless LANs, Jan. 2016, 43 pages.

IEEE P802.11AC/D1 .0, "Draft Standard for Information Technology—Telecommunications and information exchange between systems—Local and metropolitan area networks—Specific requirements", Part 11: Wireless LAN Medium Access Control (MAC) and Physical Layer (PHY) specifications; Amendment 5: Enhancements for Very High Throughput for Operation in Bands below 6GHZ, May 2011, 263 pages.

IEEE P802.11AC/D2.0, "Draft Standard for Information Technology—Telecommunications and information exchange between systems—Local and metropolitan area networks—Specific requirements", Part 11: Wireless LAN Medium Access Control (MAC) and Physical Layer (PHY) specifications; Amendment 4: Enhancements for Very High Throughput for Operation in Bands below 6GHZ,, Jan. 2012, 359 pages.

IEEE P802.11AF/D1.06, "Draft Standard for Information Technology Telecommunications and information exchange between systems Local and metropolitan a anetworks—Specific requirements", Part 11: Wireless LAN Medium Access Control(MAC) and Physical Layer (PHY) specifications; Amendment 5: TV White Spaces Operation, Mar. 2012, 140 pages.

IEEE P802.11AF/D4.0, "Draft Standard for Information Technology—Telecommunications and information exchange between systems—Local and metropolitan area networks—Specific requirements;", Part 11: Wireless LAN Medium Access Control (MAC) and Physical Layer (PHY) specifications; Amendment 5: TV White Spaces Operation,, Apr. 2013, 326 pages.

IEEE P802.11AH/D1.0, "Draft Standard for Information technology—Telecommunications and information exchange between systems Local and metropolitan area networks—Specific requirements", Part 11: Wireless LAN Medium Access Control (MAC) and Physical Layer (PHY) specifications; Amendment 6: Sub 1 GHz License Exempt Operation, Oct. 2013, 394 Pages.

IEEE P802.11AXTM/D8.0, "Part 11: Wireless LAN Medium Access Control (MAC) and Physical Layer (PHY) Specifications Amendment 1: Enhancements for High Efficiency WLAN", Draft Standard for Information technology—Telecommunications and information exchange between systems Local and metropolitan area networks—Specific requirements, Oct. 2020, 820 pages.

(56) References Cited

OTHER PUBLICATIONS

IEEE STD 802.11-2007, "Draft Standard for Information Technology—Telecommunications and information exchange between systems—Local and metropolitan area networks—Specific requirements", Part 11: Wireless LAN Medium Access Control (MAC) and Physical Layer (PHY) specifications, Nov. 2007, 1233 pages.

IEEE STD 802.11AX™, "IEEE Standard for Information Technology—Telecommunications and Information Exchange between Systems Local and Metropolitan Area Networks—Specific Requirements", Part 11: Wireless LAN Medium Access Control (MAC) and Physical Layer (PHY) Specifications Amendment 1:Enhancements for High Efficiency WLAN, Feb. 9, 2021, 767 pages.

IEEE STD 802.11N-2009, "Part 11: Wireless LAN Medium Access Control (MAC) and Physical Layer (PHY) Specifications", IEEE Standard for Information technology—Telecommunications and information exchange between systems—Local and metropolitan area networks—Specific requirements, Amendment 5: Enhancements for Higher Throughput, Sep. 11, 2009, 536 Pages.

IEEE STD. 802.11-2012, "IEEE Standard for Information technology—Telecommunications and information exchange between systems quirements—Local and metropolitan area networks—Specific re", IEEE Std. 802.11-2012, Part 11: Wireless LAN Medium Access Control (MAC) and Physical Layer (PHY) Specifications, Mar. 29, 2012, 2793 pages.

IEEE STD. 802.11-REVMB/D12, "IEEE Standard for Information technology—Telecommunications and information exchange between systems—Local and metropolitan area networks—Specific requirements", Part 11: Wireless LAN Medium Access Control (MAC) and Physical Layer (PHY) Specifications,, Nov. 2011, 2910 pages.

Lou, et al., "Multi-User Parallel Channel Access for High Efficiency Carrier Grade Wireless LANs", IEEE International Conference on Communications, 2014, pp. 3865-3870.

Lou, et al., "Sub-channel selection for multi-user channel access in next generation Wi-Fi", , IEEE 25th Annual International Symposium on Personal, Indoor, and Mobile Radio Communication (PIMRC), 2014, 6 pages.

Nguyen, et al., "Uplink multi-user MAC protocol for 11ax", IEEE 11-14/0598r0, May 11, 2014, 17 pages.

* cited by examiner 200
204
AP
$202_1$
STA1
$202_2$
STA2
$202_3$
STA1
$202_4$
STA4

$218_1$ CHANNEL 1
$218_2$ CHANNEL 2
$218_3$ CHANNEL 3
$218_4$ CHANNEL 4
$206_{AP}$
DATA
$208_{STA2}$
ACK
$210_{STA3}$
DATA
$212_{AP}$
ACK
$213_{STA1}$
DATA
$216_{AP}$
ACK
220
IDLE FREQUENCY BAND 1300
218₁ CHANNEL 1
218₂ CHANNEL 2
218₃ CHANNEL 3
218₄ CHANNEL 4
G-POLL
ULR
G-CTS
DATA
ACK
SIFS
1310
302AP
1304STA1
1304STA3
1304STA4
306AP
1308STA1
1308STA3
1308STA4
1312AP
TIME 1400
1402AP
1404STA4
1406STA3
1408STA1
1410
1412AP
1414STA1
1414STA3
1414STA4
1416AP

3000

MULTI-USER PARALLEL CHANNEL ACCESS IN WLAN SYSTEMS

CROSS REFERENCE TO RELATED APPLICATIONS

This application is a continuation of U.S. Non-Provisional patent application Ser. No. 18/453,813, filed Aug. 22, 2023, which issued as U.S. Pat. No. 12,543,164 on Feb. 3, 2026, which is a continuation of U.S. Non-Provisional patent application Ser. No. 17/978,250, filed Nov. 1, 2022, which issued as U.S. Pat. No. 11,770,819 on Sep. 26, 2023, which is a continuation of U.S. Non-Provisional patent application Ser. No. 16/747,254, filed on Jan. 20, 2020, which issued as U.S. Pat. No. 11,528,723 on Dec. 13, 2022, which is a continuation of U.S. Non-Provisional patent application Ser. No. 16/298,712, filed Mar. 11, 2019, which issued as U.S. Pat. No. 10,542,555 on Jan. 21, 2020, which is a continuation of U.S. Non-Provisional patent application Ser. No. 15/826,818, filed on Nov. 30, 2017, which issued as U.S. Pat. No. 10,231,251 on Mar. 12, 2019, which is a continuation of U.S. Non-Provisional patent application Ser. No. 15/581,261, filed Apr. 28, 2017, which issued as U.S. Pat. No. 9,860,908 on Jan. 2, 2018, which is a continuation of U.S. Non-Provisional patent application Ser. No. 15/097,048, filed Apr. 12, 2016, which issued as U.S. Pat. No. 9,681,462 on Jun. 13, 2017, which is a continuation of U.S. Non-Provisional patent application Ser. No. 13/781,909, filed Mar. 1, 2013, which issued as U.S. Pat. No. 9,338,789 on May 10, 2016, which claims the benefit of U.S. Provisional Patent Application No. 61/684,051, filed Aug. 16, 2012, U.S. Provisional Patent Application No. 61/669,505, filed Jul. 9, 2012, and U.S. Provisional Patent Application No. 61,605,538, filed Mar. 1, 2012, the entire contents of which are hereby incorporated by reference herein.

BACKGROUND

A Wireless Local Area Network (WLAN) in Infrastructure Basic Service Set (BSS) mode may have an Access Point (AP) for the BSS and one or more stations (STAs) associated with the AP. The AP may have access or interface to a Distribution System (DS) or another type of wired/wireless network that carries traffic in and out of the BSS. Traffic to STAs that originates from outside the BSS may arrive through the AP and may be delivered to the STAs. Traffic originating from STAs to destinations outside the BSS may be sent to the AP to be delivered to the respective destinations. Traffic between STAs within the BSS may also be sent through the AP where the source STA may send traffic to the AP and the AP may deliver the traffic to the destination STA. Such traffic between STAs within a BSS may be considered peer-to-peer traffic. Such peer-to-peer traffic may also be sent directly between the source and destination STAs with a direct link setup (DLS) using, for example, an 802.11e DLS or an 802.11z tunneled DLS (TDLS). A WLAN in Independent BSS (IBSS) mode may have no AP and STAs may communicate directly with each other. This mode of communication may be referred to as "ad-hoc" mode of communication.

In an 802.11 infrastructure mode of operation, the AP may transmit a beacon on a fixed channel called primary channel. This channel is 20 Mega-Hertz (MHz) wide and is the operating channel of the BSS. This channel is also used by the STAs to establish a connection with the AP. The fundamental channel access mechanism in an 802.11 system is Carrier Sense Multiple Access with Collision Avoidance (CSMA/CA). In this mode of operation, every STA, including the AP, may sense the primary channel. If the channel is detected to be busy, the STA may back off. Hence, only one STA may transmit at any given time in a given BSS.

In 802.11n, High Throughput (HT) STAs may also use 40 MHz wide channel for communication. This may achieved by combining the primary 20 MHz channel with another adjacent 20 MHz channel to form a 40 MHz wide channel. In 802.11ac, Very High Throughput (VHT) STAs may support 40 MHz, 80 MHz and 160 MHz wide channels. While 40 MHz and 80 MHz channels may be formed by combining contiguous 20 MHz channels similar to 802.11n above, 160 MHz channel may be formed either by combining 8 contiguous 20 MHz channels or two non-contiguous 80 MHz channels (80+80 configuration). In case of "80+80" configuration, the data, after channel encoding, may be passed through a segment parser that may divide it into two streams. Inverse Fast Fourier Transform (IFFT) and time domain processing may be done on each stream separately. The streams may then be mapped on to the two channels and the data may be sent out. On the receiving end, this mechanism may be reversed and the combined data may be sent to the medium access control (MAC) layer.

In sub 1 GHz modes of operation (for example, 802.11af and 802.11ah), the channel operating bandwidths may be reduced when compared to 802.11n and 802.11ac. 802.11af may support 5 MHz, 10 MHz and 20 MHz wide bands in TV White Space (TVWS) while 802.11ah may support=1 MHz, 2 MHz, 4 MHz and 8 MHz in non-TVWS. Some STAs in 802.11ah may be considered to be sensors with limited capabilities and may only support 1 MHz transmission mode.

In WLAN systems with multiple channel width such as 802.11n, 802.11ac, 802.11af and 802.11ah, there may be a primary channel, which may have a bandwidth equal to the largest common operating bandwidth supported by all STAs in the BSS. The bandwidth of the primary channel may be limited by the STA that supports the smallest bandwidth operating mode. In the example of 802.11ah, the primary channel may be 1 MHz wide if there are STAs that only supports 1 MHz mode while the AP and other STAs in the BSS may support 2 MHz, 4 MHz, 8 MHz and 16 MHz operating modes. All carrier sensing and NAV setting may depend on the status on the primary channel. For example, if the primary channel is busy, due to an STA supporting only 1 MHz operating mode transmitting to the AP, then the entire available frequency bands may be considered busy even though the majority of it may be idle and available. In 802.11ah and 802.11af, all packets may be transmitted using a clock that may be down clocked 4 or 10 times as compared to the 802.11ac specification.

In the United States, the available frequency bands which may be used by 802.11ah may be from 902 MHz to 928 MHz; in Korea, from 917.5 MHz to 923.5 MHz; and in Japan, from 916.5 MHz to 927.5 MHz. The total bandwidth available for 802.11ah may be 6 MHz to 26 MHz depending on the country code.

In addition, in the 802.11 Standards, only one STA may be able to transmit at any given time in a BSS. On the DL (i.e. where the AP transmits to a STA), if Multi-User multiple-input multiple output (MU-MIMO) is not used, the AP may conduct packet exchanges with only one STA at any given time. If multi-user MIMO (MU-MIMO) is utilized, the AP may transmit to multiple STAs. However, all STAs involved in MU-MIMO may be communicating on the same band, which may be limited by the STAs with the smallest operating bandwidth. In this scenario, remaining frequency bandwidth may remain idle even though it may be available to the AP and other STAs.

SUMMARY

A method and apparatus may provide multi-user parallel channel access (MU-PCA). For example, a wireless transmit/receive unit (WTRU) is provided that is one of a plurality of WTRUs operable to simultaneously communicate via a plurality of channels managed by an access point (AP). The WTRU may include a receiver configured to receive, from the AP, over at least one channel of the plurality of channels, a group poll (G-Poll) message that includes a resource allocation that indicates at least one allocated channel of the plurality of channels for the WTRU; and a transmitter configured to transmit an uplink request message, to the AP in response to the G-Poll message, over the at least one allocated channel of the plurality of channels, the uplink request message corresponding to uplink data the WTRU has for transmission to the AP.

In another example, a method is provided for use in a WTRU that is one of a plurality of WTRUs operable to simultaneously communicate via a plurality of channels managed by an access point (AP). The method may include receiving, from the AP, over at least one channel of the plurality of channels, a group poll (G-Poll) message that includes a resource allocation that indicates at least one allocated channel of the plurality of channels for the WTRU; and transmitting an uplink request message, to the AP in response to the G-Poll message, over the at least one allocated channel of the plurality of channels, the uplink request message corresponding to uplink data the WTRU has for transmission to the AP.

BRIEF DESCRIPTION OF THE DRAWINGS

A more detailed understanding may be had from the following description, given by way of example in conjunction with the accompanying drawings wherein.

DETAILED DESCRIPTION

Figure 1A:
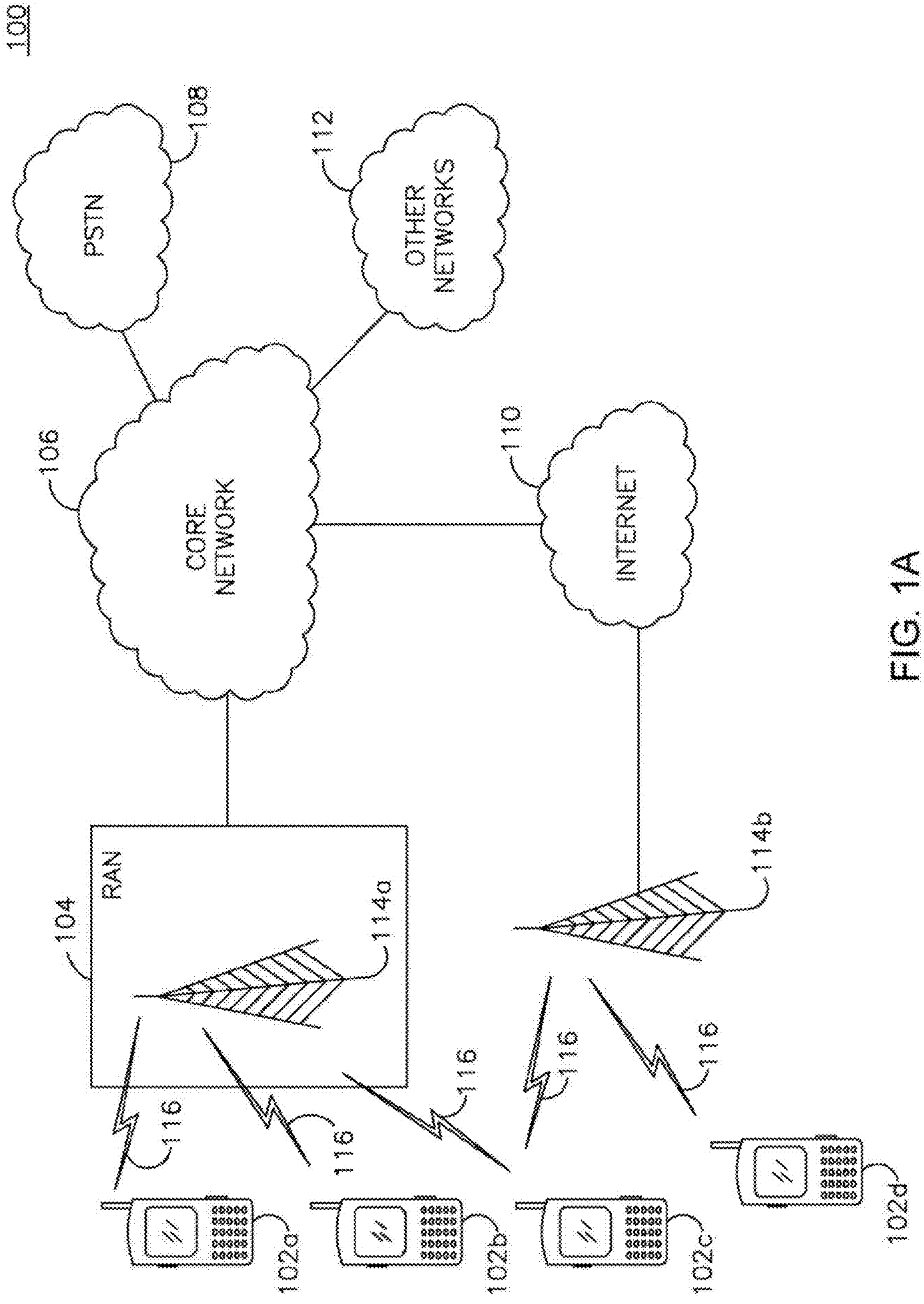
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102*a*, 102*b*, 102*c*, 102*d*, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d* may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114*a* and a base station 114*b*. Each of the base stations 114*a*, 114*b* may be any type of device configured to wirelessly interface with at least one of the WTRUs 102*a*, 102*b*, 102*c*, 102*d* to facilitate access to one or more communication networks, such as the core network 106, the Internet 110, and/or the other networks 112. By way of example, the base stations 114*a*, 114*b* may be a base transceiver station (BTS), a Node-B, an eNode B, a Home Node B, a Home eNode B, a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104, which may also include other base stations and/or network elements (not shown), such as a base station controller (BSC), a radio network controller (RNC), relay nodes, etc. The base station 114*a* and/or the base station 114*b* may be configured to transmit and/or receive wireless signals within a particular geographic region, which may be referred to as a cell (not shown). The cell may further be divided into cell sectors. For example, the cell associated with the base station 114*a* may be divided into three sectors. Thus, in one embodiment, the base station 114*a* may include three transceivers, i.e., one for each sector of the cell. In another embodiment, the base station 114*a* may employ multiple-input multiple output (MIMO) technology and, therefore, may utilize multiple transceivers for each sector of the cell.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104 and the WTRUs 102*a*, 102*b*, 102*c* may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114*a* and the WTRUs 102*a*, 102*b*, 102*c* may implement radio technologies such as IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114*b* and the WTRUs 102*c*, 102*d* may implement a radio technology such as IEEE 802.11 to establish a wireless local area network (WLAN). In another embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, etc.) to establish a picocell or femtocell. As shown in FIG. 1A, the base station 114*b* may have a direct connection to the Internet 110. Thus, the base station 114*b* may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102*a*, 102*b*, 102*c*, 102*d*. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102*a*, 102*b*, 102*c*, 102*d* to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The other networks 112 may include wired or wireless communications networks owned and/or operated by other service providers. For example, the other networks 112 may include another core network connected to one or more RANs, which may employ the same RAT as the RAN 104 or a different RAT.

Some or all of the WTRUs 102*a*, 102*b*, 102*c*, 102*d* in the communications system 100 may include multi-mode capabilities, i.e., the WTRUs 102*a*, 102*b*, 102*c*, 102*d* may include multiple transceivers for communicating with different wireless networks over different wireless links. For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
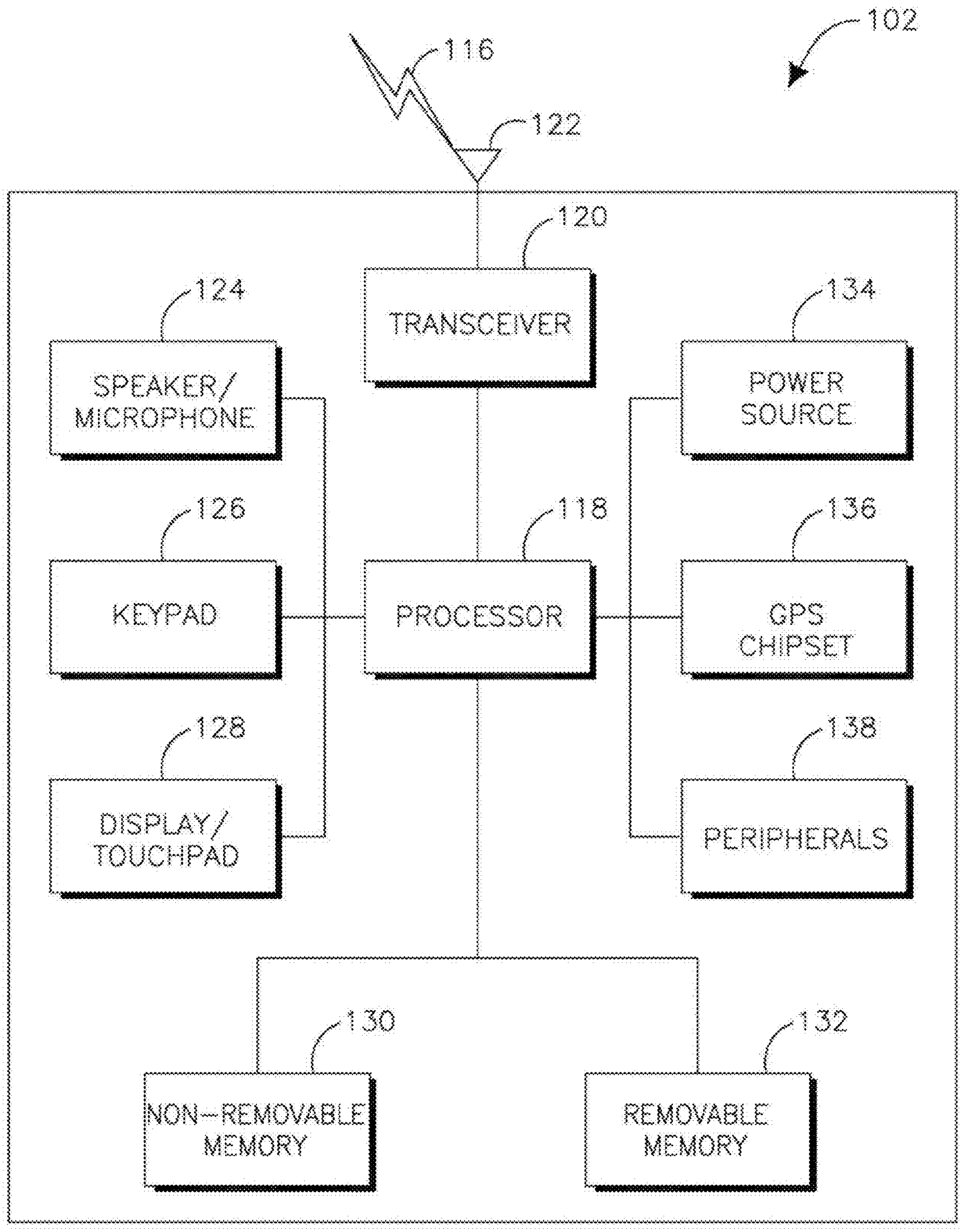
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
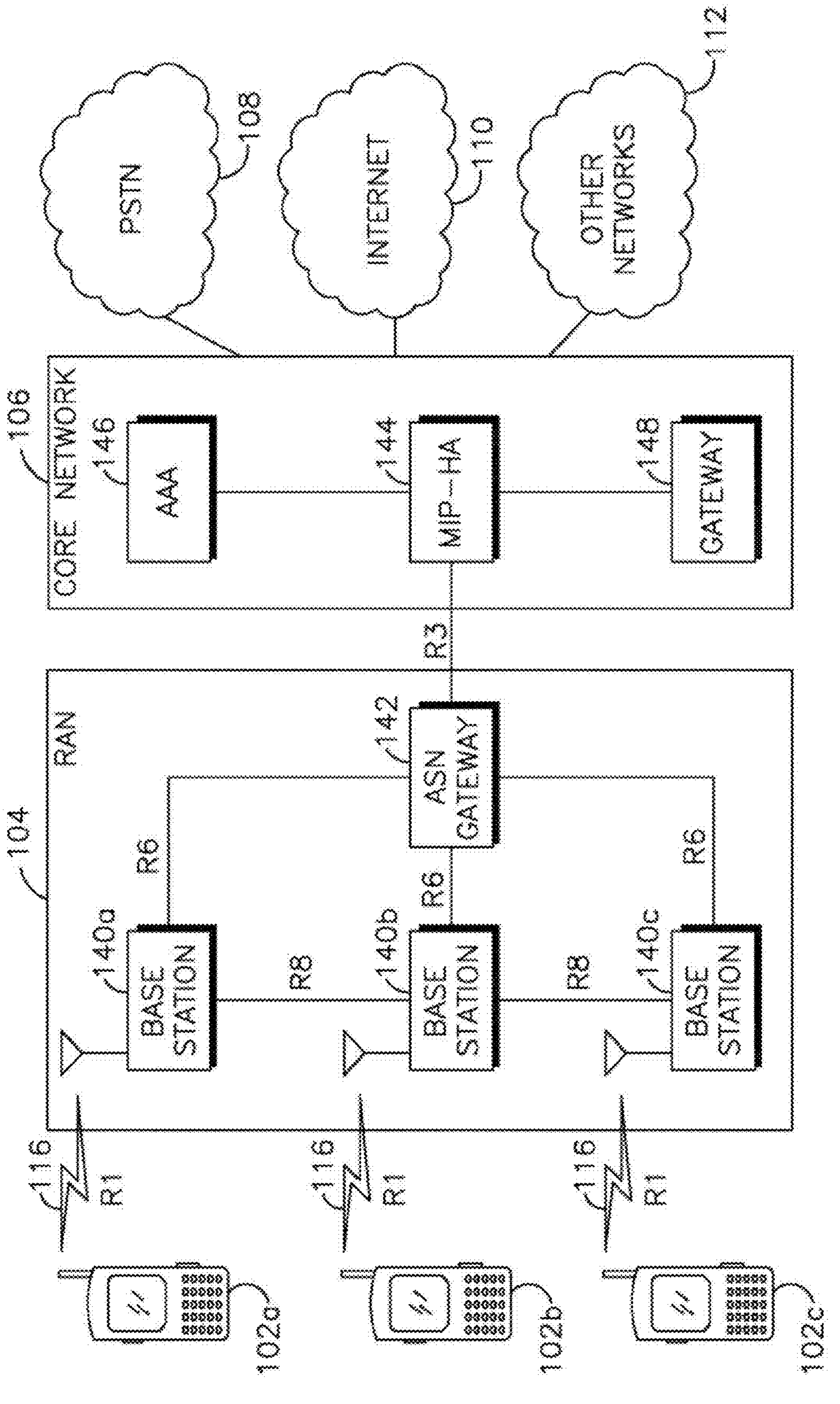
FIG. 1C is a system diagram of an example radio access network and an example core network that may be used within the communications system illustrated in FIG. 1A.

FIG. 1C is a system diagram of the RAN 104 and the core network 106 according to an embodiment. The RAN 104 may be an access service network (ASN) that employs IEEE 802.16 radio technology to communicate with the WTRUs 102*a*, 102*b*, 102*c* over the air interface 116. As will be further discussed below, the communication links between the different functional entities of the WTRUs 102*a*, 102*b*, 102*c*, the RAN 104, and the core network 106 may be defined as reference points.

As shown in FIG. 1C, the RAN 104 may include base stations 140*a*, 140*b*, 140*c*, and an ASN gateway 142, though it will be appreciated that the RAN 104 may include any number of base stations and ASN gateways while remaining consistent with an embodiment. The base stations 140*a*, 140*b*, 140*c* may each be associated with a particular cell (not shown) in the RAN 104 and may each include one or more transceivers for communicating with the WTRUs 102*a*, 102*b*, 102*c* over the air interface 116. In one embodiment, the base stations 140*a*, 140*b*, 140*c* may implement MIMO technology. Thus, the base station 140*a*, for example, may use multiple antennas to transmit wireless signals to, and receive wireless signals from, the WTRU 102*a*. The base stations 140*a*, 140*b*, 140*c* may also provide mobility management functions, such as handoff triggering, tunnel establishment, radio resource management, traffic classification, quality of service (QoS) policy enforcement, and the like. The ASN gateway 142 may serve as a traffic aggregation point and may be responsible for paging, caching of subscriber profiles, routing to the core network 106, and the like.

The air interface 116 between the WTRUs 102*a*, 102*b*, 102*c* and the RAN 104 may be defined as an R1 reference point that implements the IEEE 802.16 specification. In addition, each of the WTRUs 102*a*, 102*b*, 102*c* may establish a logical interface (not shown) with the core network 106. The logical interface between the WTRUs 102*a*, 102*b*, 102*c* and the core network 106 may be defined as an R2 reference point, which may be used for authentication, authorization, IP host configuration management, and/or mobility management.

The communication link between each of the base stations 140*a*, 140*b*, 140*c* may be defined as an R8 reference point that includes protocols for facilitating WTRU handovers and the transfer of data between base stations. The communication link between the base stations 140*a*, 140*b*, 140*c* and the ASN gateway 215 may be defined as an R6 reference point. The R6 reference point may include protocols for facilitating mobility management based on mobility events associated with each of the WTRUs 102*a*, 102*b*, 100*c*.

As shown in FIG. 1C, the RAN 104 may be connected to the core network 106. The communication link between the RAN 104 and the core network 106 may defined as an R3 reference point that includes protocols for facilitating data transfer and mobility management capabilities, for example. The core network 106 may include a mobile IP home agent (MIP-HA) 144, an authentication, authorization, accounting (AAA) server 146, and a gateway 148. While each of the foregoing elements are depicted as part of the core network 106, it will be appreciated that any one of these elements may be owned and/or operated by an entity other than the core network operator.

The MIP-HA may be responsible for IP address management, and may enable the WTRUs 102*a*, 102*b*, 102*c* to roam between different ASNs and/or different core networks. The MIP-HA 144 may provide the WTRUs 102*a*, 102*b*, 102*c* with access to packet-switched networks, such as the Internet 110, to facilitate communications between the WTRUs 102*a*, 102*b*, 102*c* and IP-enabled devices. The AAA server 146 may be responsible for user authentication and for supporting user services. The gateway 148 may facilitate interworking with other networks. For example, the gateway 148 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. In addition, the gateway 148 may provide the WTRUs 102*a*, 102*b*, 102*c* with access to the other networks 112, which may include other wired or wireless networks that are owned and/or operated by other service providers.

Although not shown in FIG. 1C, it will be appreciated that the RAN 104 may be connected to other ASNs and the core network 106 may be connected to other core networks. The communication link between the RAN 104 the other ASNs may be defined as an R4 reference point, which may include protocols for coordinating the mobility of the WTRUs 102*a*, 102*b*, 102*c* between the RAN 104 and the other ASNs. The communication link between the core network 106 and the other core networks may be defined as an R5 reference, which may include protocols for facilitating interworking between home core networks and visited core networks.

In a WLAN system of multiple channel width, when the communicating STA may only be capable of transmitting and receiving on a small fraction of the available bandwidth, the 802.11 standards may prescribe that the remaining available frequency bandwidth remains idle for the entire BSS even though the AP and other STAs are capable of utilizing that portion of available bandwidth. Consequently, resources in such BSSs may be under-utilized and wasted. This problem may exist in any WLAN system with multiple channel widths such as, for example, 802.11n, 802.11ac and 802.11af, and in 802.11ah, where some STAs in a BSS only support the minimum 1 MHz operation mode.

Figure 2A:
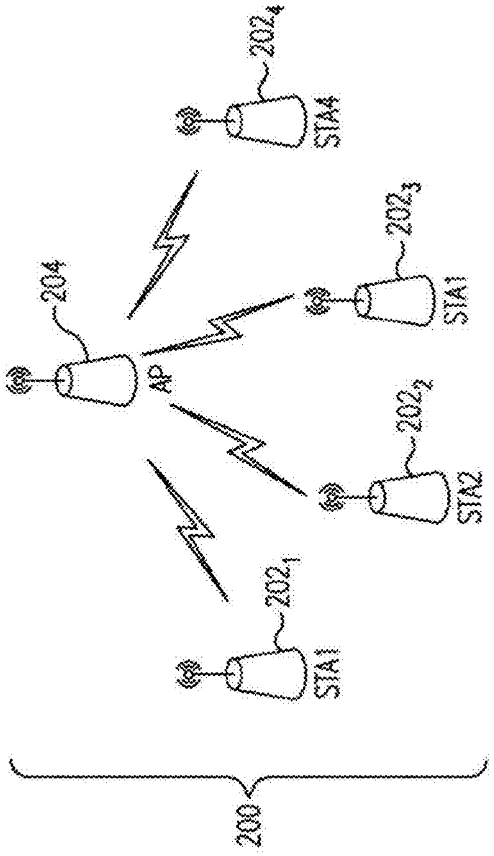
FIG. 2A shows an example of a WLAN BSS including an AP and four STAs.
Figure 2B:
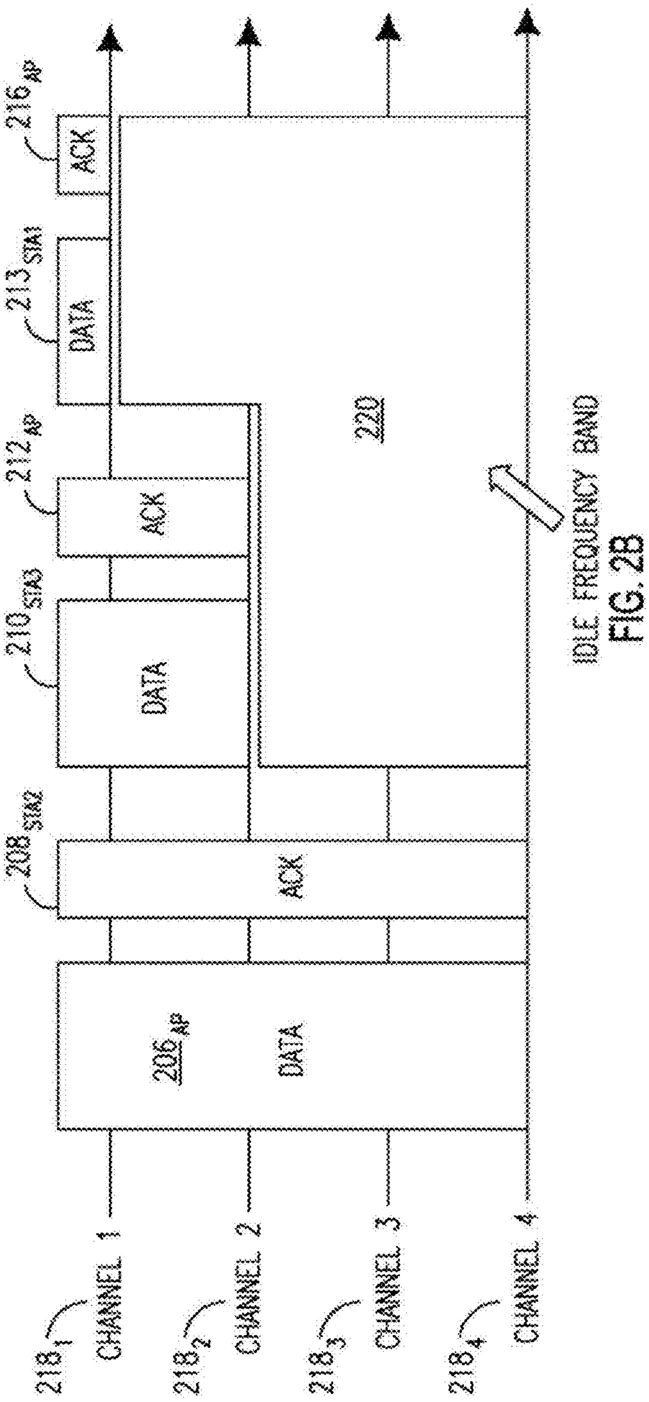
FIG. 2B shows an example of frequency resource wastage in a WLAN system with multiple channel widths.

FIG. 2A shows an example of a WLAN BSS 200 including an AP 204, and 4 STAs: STA1 $\mathbf{202}_1$, STA2 $\mathbf{202}_2$, STA3 $\mathbf{202}_3$, and STA4 $\mathbf{202}_4$. FIG. 2B shows an example MAC scheme with frequency resource wastage in a WLAN system with multiple channel widths, for example the WLAN BSS 200 of FIG. 2A. FIG. 2B shows transmissions over time over four channels $\mathbf{218}_{1 \ldots 4}$ performed by the AP and STAs in FIG. 2A. Throughout all the figures showing example MAC schemes like FIG. 2B, the entity performing the transmission (e.g. AP, STA1, STA2, STA3 or STA4) is indicated in the subscript of each transmission. For illustrative purposes, it is assumed throughout the figures that each of the channels $\mathbf{218}_{1 \ldots 4}$ are 1 MHz wide and that channel $\mathbf{218}_1$ is a primary channel, although the channels could be any bandwidth and channels $\mathbf{218}_{1 \ldots 4}$ could be contiguous or non-contiguous. In addition, the AP 204 and STAs $\mathbf{202}_{1 \ldots 4}$ of FIG. 2A may be operational on more or less than 4 channels and any of the channels could be contiguous, or non-contiguous, located within the same band or in different frequency bands. Also, the MAC schemes illustrated in the figures are examples, and each feature or element (e.g. type message of transmission) may be used alone without the other features and elements (e.g. other types of message transmissions) of the described MAC schemes or in various combinations with or without other features and elements.

In the example of FIGS. 2A and 2B, it is assumed that the AP 204 may be capable of 1 MHz, 2 MHz and 4 MHz operation mode; STA1 $\mathbf{202}_1$ and STA4 $\mathbf{202}_4$ may be capable of 1 MHz mode; STA2 $\mathbf{202}_2$ may be capable of 1 MHz, 2 MHz and 4 MHz mode; and STA3 $\mathbf{202}_3$ may be capable of 1 MHz and 2 MHz mode. When STA2 $\mathbf{202}_2$ and the AP 204 communicate, the packets are transmitted over the available frequency bandwidth which includes all four channels $\mathbf{218}_{1 \ldots 4}$, for example in data transmission $\mathbf{206}_{AP}$ from the AP 204 to the STA2 $\mathbf{202}_2$ and in acknowledgement (ACK) transmission $\mathbf{208}_{STA2}$ from STA2 $\mathbf{202}_2$ to AP 204. Data transmission $\mathbf{210}_{STA3}$ to the AP 204 and ACK $\mathbf{212}_{AP}$ to STA3

$202_3$ is limited to 2 MHz or channels $218_{1-2}$. Similarly, data transmission $213_{STA1}$ to the AP 204 and ACK $216_{AP}$ to STA1 $202_1$ is limited to 1 MHz or channel $218_1$. The unused channels are idle frequency bands 220. Therefore, in this example, when STA1 $202_1$ or STA3 $202_3$ communicates with the AP 204, at least half, or in the case of STA1 $202_1$, three-quarters, of the available bandwidth may be idle while other STAs in the BSS may have packets to transmit. This may limit the capacity of a BSS and may become a bottleneck, especially for technologies such as 802.11af and 802.11ah that may operate on sub 1 GHz bands and may have much smaller bandwidths compared to 802.11n and 802.11ac.

In examples of use cases such as smart meters, an AP may need to support up to 6000 STAs in one BSS in 802.11ah. Due to the CSMA/CA nature of the WLAN Medium Access Control (MAC) layer, a large number of users may cause significant congestion and delay and therefore very low effective throughput in the BSS due to packet collisions. As illustrated above, in cases of Multi-User Parallel Channel Access (MU-PCA) in WLAN systems with multiple channel widths, a portion or sometimes the majority of the bandwidth available to a BSS may be wasted due to medium access by a single STA which only operates on a portion of the available bandwidth. Additionally, congestion, delay and effectively no throughput may be caused by the CSMA/CA nature of the 802.11 MAC Layer functions when a WLAN system must support up to 6000 STAs in a single BSS.

The enablement of parallel medium access among multiple STAs supporting disparate operating channel widths over the available bandwidth, which may be contiguous or non-contiguous, and which may be located within the same band or in separate bands (for example, any combination of the 2.4 GHz industrial, scientific and medical (ISM) band, the sub-6 GHz band, the 60-GHz band, the sub-1 GHz band, the 3.5 GHz band, or the 45 GHz band, etc.), may increase frequency bandwidth utilization and efficiency and support a large number of STAs, for example up to 6000 STAs.

In the 80+80 channel configuration, non-contiguous aggregation may be defined in 802.11ac for a single STA access, where the data from/to the single STA may be split into two streams, each transmitted on one of the two non-contiguous 80 MHz channels individually. This may be extended to other channel combinations and enhancements that allow packets to/from multiple STAs to be transmitted from/to the AP on multiple frequency bands simultaneously, with one STA on one or more channels, where the width of the channel may depend on the STAs' and AP's supported operating bandwidth. In this way, the number of supported STAs may be increased and the utilization of resources may be significantly increased through multi-user parallel channel access (MU-PCA). Moreover, a MU-PCA session may be assigned to a single STA to enable Single User Parallel Channel Access (SU-PCA) or single user channel aggregation, over a number of contiguous or non-contiguous channels in DL or UL directions or in Direct Link Setup (DLS) or Tunneled Direct Link Setup (TDLS) transmissions or receptions, which is a special case of MU-PCA.

MU-PCA may be achieved by utilizing transmit/receive with symmetrical bandwidth. The term 'symmetrical bandwidth' means that the AP and STAs utilize the same bandwidth to transmit and to receive. The APs integrate the PHY layer design enhancement, in which case the impact on the hardware of the non-AP STAs is minimal. MU-PCA may also be achieved by utilizing transmit/receive with asymmetrical bandwidth. The term "asymmetrical bandwidth" means that the AP utilizes wideband to transmit and to receive, while STAs utilize relatively narrower frequency band to transmit and to receive. PHY layer modifications may occur at both the AP and the non-AP STAs in order to support MU-PCA.

MU-PCA may use transmit/receive with symmetrical bandwidth and may use MAC Layer and PHY Layer designs and procedures. MAC Layer designs and procedures may consist of schemes that enable standalone downlink MU-PCA, standalone uplink MU-PCA, combined DL/UL MU-PCA and/or MU-PCA retransmissions in case of transmission errors. PHY Layer designs and procedures may exist in the AP for supporting MU-PCA at the AP. PHY layer designs and procedures may impact the hardware of the AP since the AP may support simultaneous multiple connections to different STAs, however a (non-AP) STA may not be impacted in the case where it communicates with the AP using only channels of operating bandwidth that it already supports.

In MAC schemes, it may be assumed that there is one primary channel for each BSS. The primary channel may be of any bandwidth and may be contiguous or non-contiguous to the other channels. The AP and/or the non-AP STAs may monitor the primary channel appropriately (for example, according to power-save mode protocol/procedures) if they are not actively transmitting, receiving or in doze state or other power saving mode. As discussed herein, the primary channel is assumed to be channel 1 unless stated otherwise.

STAs that participate in the MU-PCA may be organized into groups either in a pre-arranged or ad hoc fashion for both UL, DL or combined UL and DL transmissions. The STA grouping for UL versus DL may be the same or different. STAs may be grouped together according to many different criteria such as, for example, operating channel width, similar received power at the AP, RSSI, QoS priorities, propagation delay, synchronizations, or buffered packet length, among other things. With coordination, the grouped STAs may be able to utilize the entire or at least the majority of the available frequency bandwidth. For example, if the entire available frequency band is 4 MHz, contiguous or non-contiguous, then a potential STA group may contain four nodes that support only 1 MHz operating mode, or two nodes that support only 1 MHz operating mode and one node that supports 2 MHz operating mode.

MU-PCA may be provided for multiple STAs simultaneously over multiple channels of disparate bandwidth, where these channels could be contiguous or non-contiguous, located within the same frequency band or different frequency bands (for example, any combination of the 2.4 GHz ISM band, the 3.5 GHz band, the sub-6 GHz band, the 45 GHz band, the 60-GHz band or the sub-1 GHz band, etc.). Moreover, a MU-PCA session may be assigned to a single STA to enable SU-PCA over a number of contiguous or non-contiguous channels in DL, UL or combined UL and DL directions or in Direct Link Setup (DLS) or Tunneled Direct Link Setup (TDLS) transmissions or receptions.

The standalone DL MU-PCA may be supported by MAC schemes by using the exchanges of packets such as Group Request-To-Send (G-RTS), Group Clear-To-Send (G-CTS) and MU-PCA Management (MPM). Examples of such MAC schemes are illustrated in FIGS. 6-9 and discussed in detail below, where each feature or element illustrated for the purposes of example may be used alone without the other features and elements of the described MAC schemes or in various combinations with or without other features and elements. In the following, the format of the control frames such as G-RTS, G-CTS, MPM as well as the transmission of the control frames are described. The example frames shown in FIGS. 3, 4 and 5 do not show all possible fields that may be included in the frame. For example, the MAC header and frame body may include other fields not shown. Moreover, the fields may appear in any order and may not necessarily be in the order shown. For example, the Type, SubType and destination address (DA) fields may not appear in the MAC header in the order shown.

Figure 3:
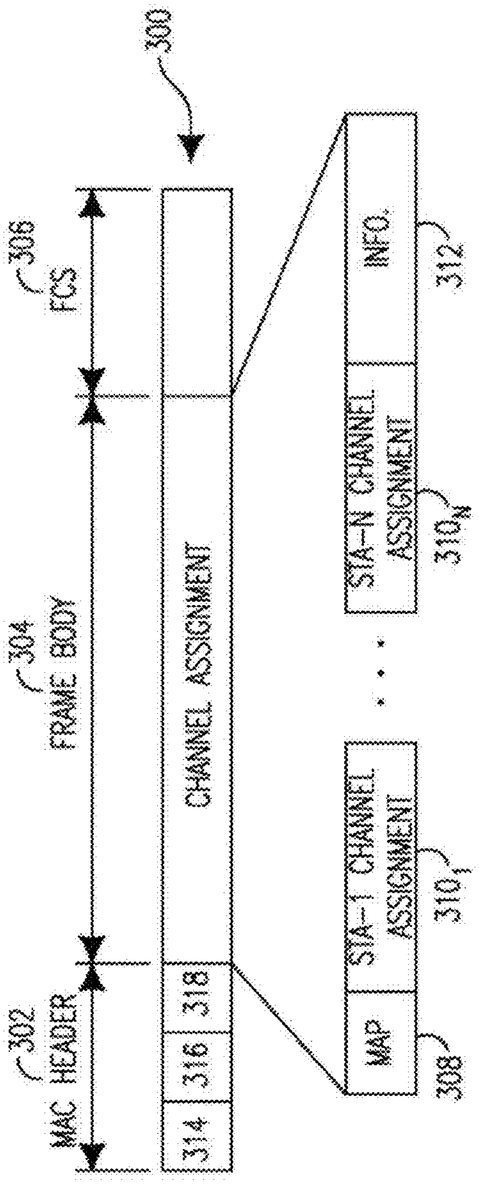
FIG. 3 shows an example frame format for a group request-to-send (G-RTS) control frame.

FIG. 3 shows an example frame format for a G-RTS control frame 300. The G-RTS frame 300 may include a MAC header 302, frame body 304 and frame check sequence (FCS) 306. The Frame body 304 may include a MAP field 308, channel assignment fields $\mathbf{310}_{1 \ldots N}$, and an additional information (Info) field 312. The MAC header 302 may include a Type 314, a SubType 316, and a destination address (DA) field 318, among other fields not shown. The G-RTS frame 300 may be, for example, a modified version of an RTS frame and may contain a frame body 304 containing channel assignment information. The G-RTS frame 300 may also be implemented as other types of frames such as action frames, action no-ACK frames or any other type of management or control frames. The G-RTS frame 300 may also be implemented as an IE, a field or subfield of a management or control frame.

In the FIG. 3 example, the G-RTS frame 300 may be identified as the G-RTS frame 300 in the MAC header 302, for example, in the Type 314 and SubType 316 fields in the MAC header 302. For example, if the Type 314 and SubType 316 fields comprise bits B2, B3, B4, B5, B6, and B7, the bits could be set as shown in Table 1 to identify the frame as control type and G-RTS subtype.

TABLE 1

| B3 B2 | Type Description | B7 B6 B5 B4 | Subtype Description |
|---|---|---|---|
| 0 1 | Control | 0 1 1 0 | G-RTS |

The DA field 318 in the MAC Header 302 may be set to a multicast MAC address if the group of STAs involved in the DL MU-PCA has been formed and can be identified by the multicast MAC address. The DA field may alternatively be set to a broadcast address and the STAs involved in the DL MU-PCA may be identified in the frame body 304 or by the Group ID in the Physical Layer Convergence Procedure (PLCP) header (not shown). If SU-PCA is used, the G-RTS frame 300 may also be transmitted to a unicast MAC address of the targeted STA.

The frame body 304 of the G-RTS frame 300 may contain the channel assignments $\mathbf{310}_{1 \ldots N}$ for the group of STAs involved in the DL MU-PCA. The MAP field 308 of the frame body 304, which may itself be implemented as a part of any other field or subfield or Information Element (IE), may indicate, for example: the length of the frame body 304 (i.e. the channel assignment); and the number of channel assignment fields $\mathbf{310}_{1 \ldots N}$, i.e. for how many STAs N the G-RTS contains channel assignments. Other additional information fields 312 not discussed may be included.

If the DA field 318 is set to the broadcast address, then each of the STA channel assignment $\mathbf{310}_{1 \ldots N}$ may have explicit identifications (IDs) for each of STAs in the DL MU-PCA group. the IDs may be, for example, Association ID (AID), MAC addresses or other form of IDs that the AP and the STAs have established/negotiated. If the DA field 318 is set to a multicast address for a group, then the channel assignment fields $\mathbf{310}_{1 \ldots N}$ may implicitly (e.g. by the order of the STA in the MU-PCA group) or explicitly contain the IDs for the DL STAs. Each STA indicated may be assigned to one or more contiguous or non-contiguous channels. The IDs used to explicitly indicate the DL MU-PCA group STAs in channel assignment fields $\mathbf{310}_{1 \ldots N}$ may be, for example, AID, MAC addresses or other form of IDs that the AP and the STAs have negotiated. Multiple STAs in the MU-PCA group may be assigned to the same channel if the STAs are capable of multi-user multi-input multi-output (MU MIMO), in which case the frame body 304 (e.g. channel assignment) may also contain the number of spatial streams assigned for each of the MU MIMO STAs assigned to the same set of channels.

Figure 4:
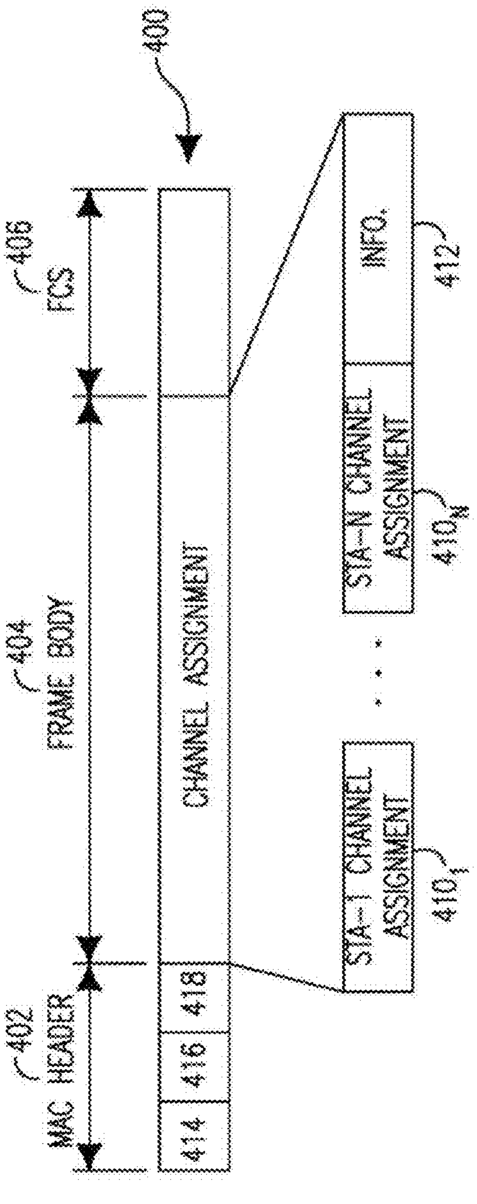
FIG. 4 shows an example frame format for a group clear-to-send (G-CTS) control frame.

FIG. 4 shows an example frame format for a G-CTS control frame 400. The G-CTS frame 400 may include a MAC header 402, frame body 404 and frame check sequence (FCS) 406. The Frame body 404 may include a MAP field 408, channel assignment fields $\mathbf{410}_{1 \ldots N}$, and an additional information (Info) field 412. The MAC header 402 may include a Type field 414, a SubType field 416, and a DA field 418, among other fields not shown. The G-CTS frame 400 may be implemented as a modified version of a CTS frame. The G-CTS frame 400 may also be implemented as other type of frames such as action frames, action No-ACK frames or any other types of management and control frames.

The frame body 404 may contain channel assignment fields $\mathbf{410}_{1 \ldots N}$ for STAs participating in UL MU-PCA. For example, the bits B2-B7 in the Type field 414 and SubType field 416 in the MAC Header 402 may identify the G-CTS frame 400 as a control type frame and as a G-CTS subtype as shown in Table 2.

TABLE 2

| B3 B2 | Type Description | B7 B6 B5 B4 | Subtype Description |
|---|---|---|---|
| 0 1 | Control | 0 1 0 1 | G-CTS |

The DA field 418 in the MAC Header 402 may be set to a multicast MAC address representing a group of STAs if the MU-PCA group has been formed and can be identified by the multicast MAC address. Alternatively, the DA field 418 may be set to a broadcast address and the STAs involved in the MU-PCA may be identified in the frame body 504 or by the Group ID in the PLCP header (not shown). If SU-PCA is used, the G-CTS frame 400 may be transmitted to a unicast MAC address of the targeted STA.

The MAP field 408, which may be implemented as a part of another field in the frame body 404 or in the MAC header 402 (or in the PLCP header, not shown), may indicate the presence of information available, such as channel assignment fields $\mathbf{410}_{1 \ldots N}$ for STAs, in the G-CTS frame 400. When used in the context of standalone DL MU-PCA, the G-CTS frame body 404 may contain a MAP element and may not contain the channel assignment fields $\mathbf{410}_{1 \ldots N}$. Multiple STAs in the MU-PCA group may be assigned to the same channel if the STAs are capable of MU MIMO, in which case the channel assignment in the frame body 404 may also contain the number of spatial streams assigned for each of the MU MIMO STAs assigned to the same set of channels.

Figure 5:
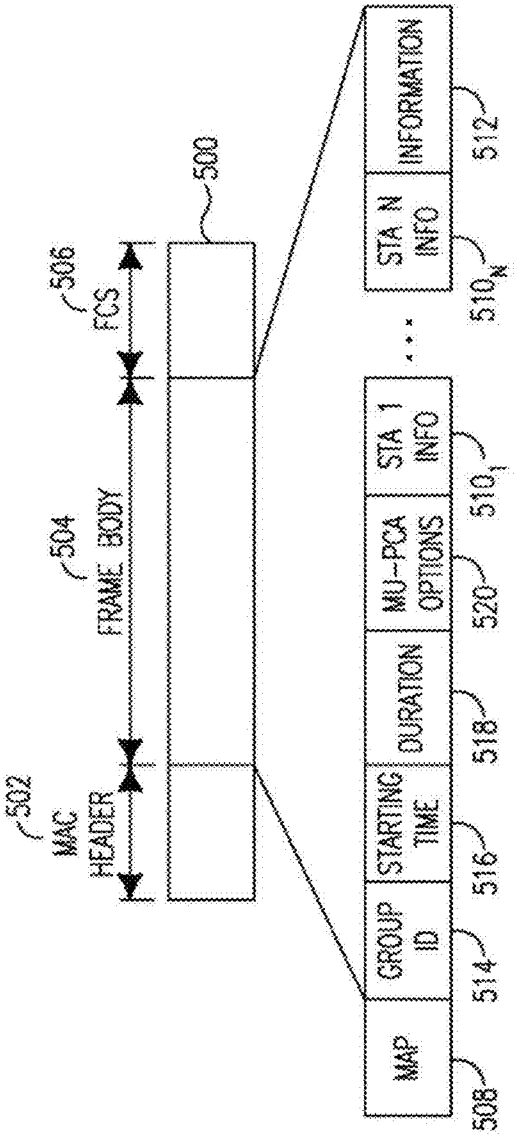
FIG. 5 shows an example frame format for a multi-user parallel channel access (MU-PCA) management (MPM) frame.

FIG. 5 shows an example frame format for a MU-PCA management (MPM) frame 500. The MPM 500 may include a MAC header 502, frame body 504 and FCS 506. The Frame body 504 may include any of the following fields: MAP field 508, group ID 514, starting time 516, duration 518, MU-PCA options 520, STA information fields $510_{1 \ldots N}$ corresponding to STAs 1 to N, and additional information 512. These fields are described in more detail in the following.

MAP field 508 may indicate the types of information contained in the MPM 500. For example, the MAP field 508 may indicate how many STA Information (Info) fields $510_{1 \ldots N}$ the MPM 500 contains. The MAP field 508 may itself be implemented as a field or subfield of other fields. Group ID 514 may indicate ID of the MU-PCA Group of STAs 1 to N which may have been pre-arranged or formed in an ad hoc manner. Starting time field 516 may indicate the starting time of the next MU-PCA session, which may be DL or UL or combined DL/UL MU-PCA transmission including a DL or UL or combined DL/UL SU-PCA transmission. The starting time may be implicitly defined if, for example, the next frames are transmitted at a set interval, such as a Short Interframe Space (SIFS) interval, starting at the end of the MPM 500. The Duration field 518 may indicate the duration of the next MU-PCA session. The duration may be implicitly defined by the value included in a duration field in the MAC header 502 (not shown).

The MU-PCA Options fields 520 may indicate the options for the MU-PCA session, such that the options include: UL MU-PCA, DL MU-PCA, combined UL/DL MU-PCA. The MU-PCA Options fields 520 may similarly be used to indicate the equivalent SU-PCA options if the MPM 500 is transmitted to a single STA. Each STA information field $510_{1 \ldots N}$ may contain the information for a respective STA 1 through N regarding the upcoming MU-PCA session. Each STA Info field STA $510_{1 \ldots N}$ may contain subfields with information (note: the subfields are not explicitly shown in FIG. 5). For example, a STA ID subfield may indicate the ID of the STA which may be implemented as MAC address, AID, or other IDs that the AP and STAs have agreed upon. A STA ID subfield may not be used if, for example, the MPM is a unicast frame to a particular STA and the MPM is used to initiate a SU-PCA transmission. In another example, the STA ID subfield may not be used if a MU-PCA group has been formed and the order of the STAs in the MU-PCA group has been determined so that each STA belonging to the MU-PCA may be aware which subfield contains the information for itself.

In another example, channel assignment subfield(s) may indicate a number of channels assigned to the STA as well as the location of the channels assigned. The location of the channels may be implemented using parameters such as channel numbers, center frequencies, bandwidth, offset from the primary channel, or frequency bands, among other things. Multiple STAs in the MU-PCA group may be assigned to the same channel if the STAs are capable of MU MIMO, in which case the channel assignment subfields may also contain the number and/or order of spatial streams assigned for each of the MU MIMO STAs assigned to the same set of channels.

Control packets such as G-RTS, G-CTS, ACK and MPM in the context of standalone DL MU-PCA may be transmitted in multiple modes. They may be transmitted on each of the individual channels (for example, as illustrated in FIGS. 6-9, as will be discussed in detail below) to provide correct network allocation vector (NAV) settings for all STAs that utilize the channels, in the same or overlapping BSSs. On the other hand, the control frames may be modulated and transmitted over multiple channels (for example, using a larger IFFT) if STAs are aware of transmission over a larger bandwidth and capable of receiving such transmission. For example, G-RTS, G-CTS and ACKs may be sent across two channels, for example channels 2 and 3, if only STAs supporting 2 MHz mode are assigned to operate on channels 2 and 3 across the entire network coverage area, in which case all STAs may be receiving and setting their NAV correctly.

In the following, all Figures illustrating MAC schemes reference the entities in the example BSS of FIG. 2A, where communication by the AP 204 and STA1-STA4 $202_{1 \ldots 4}$ is over channels $218_{1 \ldots 4}$, where a subscript indicates the transmitting entity. As explained above, for illustrative purposes, it is assumed that each of the channels $218_{1 \ldots 4}$ are 1 MHz wide and that channel $218_1$ is a primary channel. Furthermore, Short Interframe Space (SIFS) interval is used as an example inter frame spacing, however, any other types of inter frame spacing (IFS) may be used including reduced IFS (RIFS), and arbitration IFS (AIFS).

Figure 6:
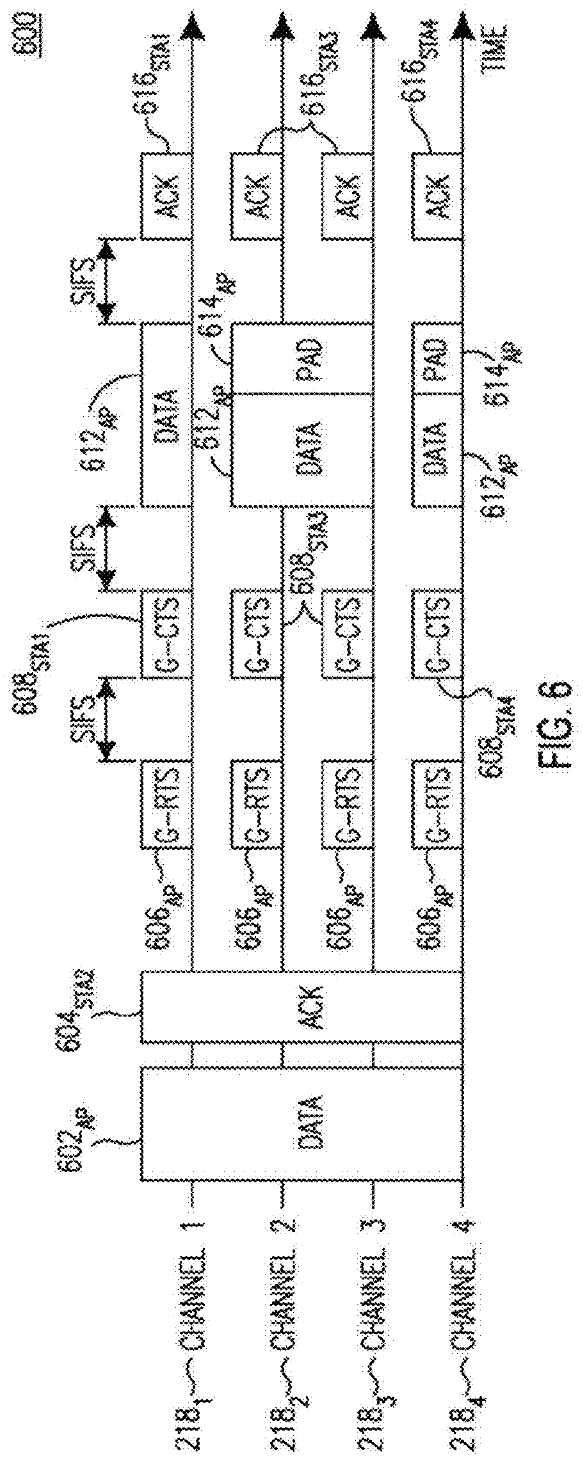
FIG. 6 shows an example medium access control (MAC) scheme for enabling DL MU-PCA using control frames over multiple channels.
Figure 7:
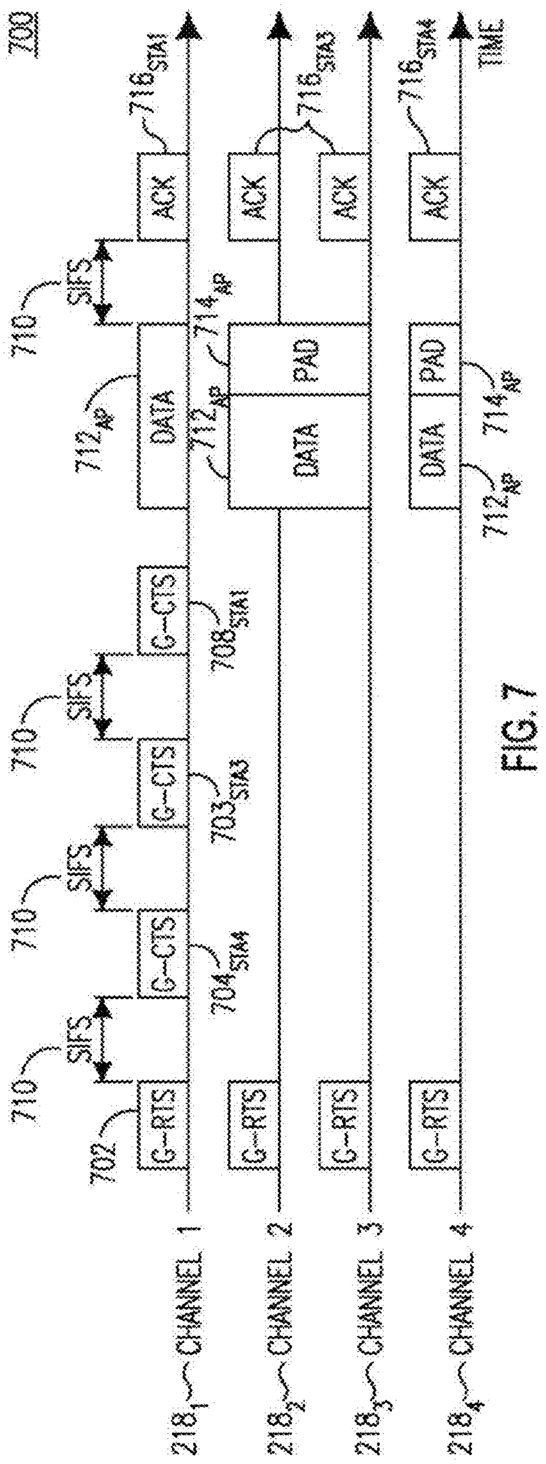
FIG. 7 shows an example MAC scheme for standalone downlink (DL) MU-PCA using G-RTS and G-CTS on the primary channel.

Examples of behavior of the AP and STAs using DL MU-PCA with control frames transmitted over the entire bandwidth, and over the primary channel only, are shown in FIGS. 6 and 7, respectively. FIG. 6 shows example MAC schemes 600 for enabling DL MU-PCA using control frames over the entire available bandwidth. In the example of FIG. 6, after AP transmission $204_{AP}$ of a data packet to STA2, which is capable of supporting transmission/reception over the entire available bandwidth, and ACK transmission $206_{STA2}$ back to the AP, the AP may conduct clear channel assessment (CCA) on all available bandwidth.

After obtaining access to all available channels, the AP may send out G-RTS $606_{AP}$ with channel assignment on all channels $218_{1 \ldots 4}$ for any of the following functions: to alert the group of STAs participating in the DL MU-PCA of the channels that they may switch to receive their DL packets from the AP; to reserve all channels till at least all DL MU-PCA packets have been ACKed by the STAs by setting NAV for all STAs operating on these channels, and potentially using them as their own primary channel. If one of the channels $218_{1 \ldots 4}$ is already occupied by some other STAs, then G-RTS $606_{AP}$ may not be sent on that channel and no STAs in the DL MU-PCA group may be assigned to that channel.

The STAs in the DL MU-PCA group may switch to the channels assigned to them and switch to the correct operating mode, for example: STA1 is assigned to channel 1 $218_1$ so it may switch to channel 1 $218_1$ and operate using 1 MHz mode; STA3 is assigned to channels 2 and 3 $218_{2\text{-}3}$ so it may switch to channels 2 and 3 and operate using 2 MHz mode; STA4 is assigned to channel 4 $218_4$ so it may switch to channel 4 and operates using 1 MHz mode.

Accordingly, the STAs may respectively transmit G-CTS (or simply CTS) $608_{STA1}$, $608_{STA3}$ and $608_{STA4}$. These G-CTSs may alert the AP of their readiness for receiving their DL packets, and may reserve the channel(s) till at least all DL MU-PCA packets have been ACKed by the STAs by setting NAV for all nodes operating on these channels, potentially using them as their own primary channel. For example, the duration field of a (G-)CTS may be set to the value of Duration_G-RTS-SIFS_Time−(G-)CTS_Time, where Duration_G-RTS is the duration setting contained in the G-RTS packet, SIFS_Time is the duration of the SIFS 610 and (G-)CTS_Time is the transmission time of the G-CTS packet.

Upon receiving the (G-)CTS $608_{STA1}$, $608_{STA3}$ and $608_{STA4}$ from each STA, the AP may transmit the data packets $612_{AP}$ to each respective STA on their assigned channels. Since the data packets may be of different length and may be transmitted using different MCS, the longest packet may be chosen to be transmitted on the primary channel $218_1$ so that the entire BSS may rely on the timing of the primary channel to stay synchronized for BSS-wide operations. Padding $614_{AP}$ may be transmitted by the AP on any channel to make the data packets of equal length (in time) so that the DL transmissions on all channels $218_{1 \ldots 4}$ end at the same time. Once the STAs receive their respective data packets, they may respectively send out ACK packets $616_{STA1}$, $616_{STA3}$ and $616_{STA4}$ to the AP to indicate successful reception.

For STAs that are monitoring the channels, when they receive a G-RTS from the AP that is not addressed to them, they may cancel the NAV if no transmission from the AP has been detected after waiting for a duration of time, that may be equal to, for example (G-)CTS_Time+2×SIFS_Time+Y×A_Slot_Time+aPHY-RX-START-Delay, where (G-)CTS_Time is the duration of a (G-)CTS packet $608_{STAX}$, SIFS_Time is the duration of SIFS 610, A_Slot_Time is the duration of a slot, aPHY-RX-START-Delay may be a delay in the PHY layer pertaining to start of reception, and Y may be an configurable parameter.

The MAC DL MU-PCA scheme shown in FIG. 6 assumes that the STAs participating in the DL MU-PCA are capable of switching channels as well as switching between transmission and reception modes within the SIFS interval. If, however, the STAs are not capable of switching channels within the SIFS interval, the initial control packet exchanges must take place on the primary channel, as shown in FIG. 7.

FIG. 7 shows an example MAC scheme 700 for standalone DL MU-PCA using G-RTS and G-CTS on the primary channel. The AP may conduct CCA on all available channels. After obtaining access to all channels, the AP may send out G-RTS 702 with channel assignment on all channels. The G-RTS 702 transmission may be used to reserve all channels till at least all DL MU-PCA packets have been ACKed by the STAs by setting NAV for all nodes operating on these channels, potentially using them as their own primary channel, and to alert the group of STAs participating in the DL MU-PCA of the order that they should send their (G-)CTS on the primary channel with SIFS interval 710 between each STA's (G-)CTS, as well as the channels that the STAs should switch to receive their DL packets from the AP. In order to provide sufficient time for STAs to switch channels, the STA that is assigned to receive on the primary channel may be designated by the AP the last STA of the DL MU-PCA group to transmit its CTS (or G-CTS).

The STAs may then transmit (G-)CTS $604_{STA4}$, $606_{STA3}$ and $608_{STA1}$ sequentially on the primary channel according to the order assigned by the AP, with a SIFS interval between each (G-)CTS. (G-)CTS $604_{STA4}$, $606_{STA3}$ and $608_{STA1}$ may serve to alert the AP of their readiness to switch channels to receive their DL packets, and reserve the channel(s) till at least all DL MU-PCA packets have been ACKed by the STAs by setting NAV for all nodes operating on these channels, potentially using them as their own primary channel. For example, the duration field of the nth (G-)CTS may be set to Duration_G-RTS−Y×SIFS_Time−Y×(G-)CTS_Time, where Duration_G-RTS is the duration setting contained in the G-RTS packet, SIFS_Time is the duration of the SIFS and (G-)CTS_Time is the transmission time of a (G-)CTS packet.

The first STA assigned to transmit in the MU-PCA group (in this example STA4) may transmit a (G-)CTS a SIFS time after the first G-RTS frame; upon receiving the (G-)CTS $604_{STA4}$ from the first STA, STA4, the AP may transmit another G-RTS (or another control frame, for example, G-Poll) on the primary channel to the next STA (in this example, STA3) to request a (G-)CTS from the second STA; the second STA may respond with a (G-)CTS; the process may then repeat until all STAs in the MU-PCA group have transmitted their (G-)CTS frames. The duration field in the G-RTS and (G-)CTS frames may be adjusted accordingly with the durations of the additional SIFSs and G-RTS frames.

The STAs in the DL MU-PCA group may switch to the channels assigned to them and may switch to the correct operating mode. For example, STA1 is assigned to Channel 1 $218_1$ so it may stay on Channel 1 $218_1$ and operate using 1 MHz mode; STA3 is assigned to channels 2 and 3 $218_{2-3}$ so it may switch to channels 2 and 3 and operate using 2 MHz mode; STA4 is assigned to channel 4 $218_4$ so it may switch to channel 4 and operates using 1 MHz mode.

Upon receiving the G-CTS $604_{STA4}$, $606_{STA3}$ and $608_{STA1}$, the AP may transmit the data packets $712_{AP}$ to each respective STA on their respectively assigned channels. Since the data packets $712_{AP}$ may be of different lengths and could be transmitted using different MCS, the longest packet may be chosen to transmitted on the primary channel so that the entire BSS may rely on the timing of the primary channel to stay synchronized for BSS-wide operations. Padding may be used on all channels $218_{1-4}$ to make the data packets of equal length (in time) so that the DL transmissions end at the same time. If one G-CTS is not received, the AP may choose to not to transmit the DL packet for the corresponding STA on its assigned channel or it may choose to proceed with transmission as normal. Once the STAs receive their respective data packets, they send out ACK packets $716_{STA1}$, $716_{STA3}$, and $716_{STA4}$ to the AP to indicate the reception.

For STAs that are monitoring the channels, when they receive a G-RTS from the AP that is not addressed to them, they may cancel the NAV if no transmission from the AP has been detected after waiting for a period of time. For example, the period of time may be equal to N×G-CTS_Time+(N+1)×SIFS_Time+Y×A_Slot_Time+aPHY-RX-START-Delay, where N is the number of STAs contained in the channel assignments in the G-RTS packet, G-CTS_Time is the duration of a G-CTS packet, SIFS_Time is the duration of SIFS, A_Slot_Time is the duration of a slot, aPHY-RX-START-Delay may be a delay in the PHY layer pertaining to start of reception, and Y may be a configurable parameter based on the WLAN systems.

Figure 8:
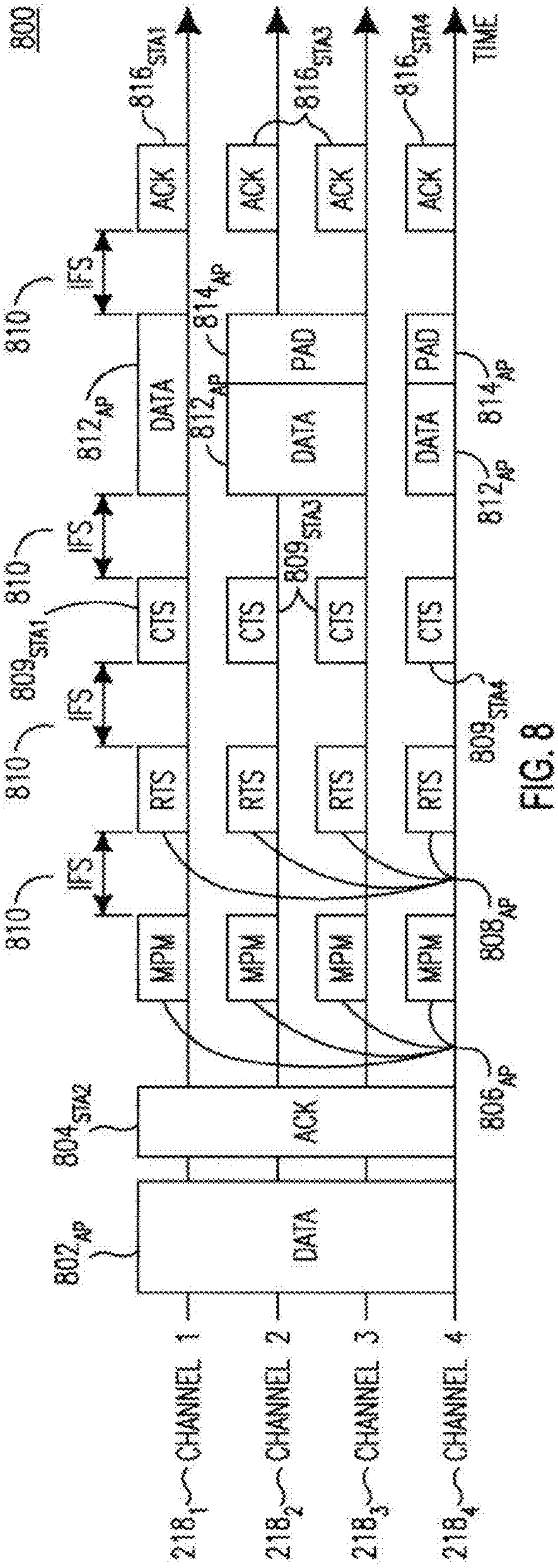
FIG. 8 shows an example MAC scheme for enabling DL MU-PCA using control frames over multiple channels, and which also enables MU-PCA for WiFi STAs.

FIG. 8 shows an example MAC scheme 800 for enabling DL MU-PCA using control frames over the entire available bandwidth, and which also enables MU-PCA for WiFi STAs, which may be adherent to existing WiFi standards and drafts and may not be able to interpret MPM, G-RTS and G-CTS frames.

In the example of FIG. 8, an AP transmission $802_{AP}$ of a data packet to STA2, which is capable of supporting transmission/reception over the entire available bandwidth $218_{1 \ldots 4}$, may be acknowledged by STA2's ACK $804_{STA2}$. The AP may transmit an MPM frame $806_{AP}$, which may contain the options indicating that it is a DL MU-PCA (or DL SU-PCA) transmission announcement with channel assignments for each STA in the MU-PCA group. In an example, the AP may conduct CCA on all available bandwidth $218_{1 \ldots 4}$ and may transmit MPM $806_{AP}$ on all channels $218_{1 \ldots 4}$. The MPM frames $806_{AP}$ may contain information in their MAC header to set NAV on all channels $218_{1 \ldots 4}$ for the entire MU-PCA session. In another example, the MPM may not contain NAV setting information; the AP may access the medium on all channels $218_{1 \ldots 4}$ using an IFS 810 that is sufficiently short (for example short IFS (SIFS) or point IFS (PIFS)) to allow the AP to maintain access to the medium so that the AP may transmit RTS frames $\mathbf{808}_{AP}$ (or G-RTS frames) on all channels $\mathbf{218}_{1\ldots4}$ to initiate the DL MU-PCA session.

In an example, the AP may conduct CCA only on the primary channel $\mathbf{218}_1$ and transmit MPM frame $\mathbf{806}_{AP}$ on the primary channel $\mathbf{218}_1$. The MPM frame $\mathbf{806}_{AP}$ may announce the DL MU-PCA (or DL SU-PCA) session and subsequently, the AP may conduct CCA on all channels $\mathbf{218}_{1\ldots4}$ and when it has access on all channels $\mathbf{218}_{1\ldots4}$, it may transmit an RTS frame $\mathbf{808}_{AP}$ (or G-RTS frames) on all channels $\mathbf{218}_{1\ldots4}$ to initiate the DL MU-PCA session.

After obtaining access to all available channels $\mathbf{218}_{1\ldots4}$, the AP may send out RTS (or G-RTS) frames $\mathbf{808}_{AP}$ so that it may alert the group of STAs participating in the DL MU-PCA that they may switch to their assigned channel to receive their DL packets from the AP; and so that it may reserve all channels $\mathbf{218}_{1\ldots4}$ until at least all DL MU-PCA packets have been ACKed by the STAs by setting NAV for all nodes operating on these channels, potentially using them as their own primary channel. If one of the channels is already occupied by some other STAs, then no RTS or G-RTS may be sent on that channel and no STAs in the DL MU-PCA group may be assigned to that channel.

For WiFi STAs that may not be able to interpret MPM or G-RTS frames, the AP may assign these STAs on the primary channel or any set of contiguous or non-contiguous channels including the primary channel that the legacy WiFi STAs that are capable of operating. If legacy WiFi STAs are involved in the MU-PCA sessions, the AP may transmit RTS on all channels or at least may transmit RTS on the channels that the legacy WiFi devices are assigned to after having sent the MPM frames to all (other) STAs first.

In an example, if STA1 is a 802.11n STA with its primary channel being channel 1, it may operate on 40 MHz bandwidth on both channels 1 and 2. The AP may assign STA1 on channels 1 and 2 for a 40 MHz operation. The AP may assign other STAs that are able to interpret MPM or G-RTS on channels 3 and 4. The AP may then transmit RTS frames $\mathbf{808}_{AP}$ on channels 1 and 2 or on all channels 1-4 to initiate the MU-PCA sessions. In another example, if STA1 is a 802.11ac STA with its primary channel being channel 1 with an 80 MHz bandwidth, and STA1 is capable of 80+80 non-contiguous operation, the AP may assign STA1 on channels 1 and 3 using 80+80 non-contiguous operation. The AP may then assign other STAs that are able to interpret MPM or G-RTS on channels 2 and 3. The AP may then transmit RTS frames on channels 1 and 3 or on all channels 1-4 to initiate the MU-PCA sessions.

The STAs in the DL MU-PCA group may switch to the channels assigned to them and switch to the correct operating mode. In an example, STA1 may be assigned to channel 1 so it may switch to Channel 1 and operate using 1 MHz mode; STA3 may be assigned to Channels 2 and 3 so it may switch to Channels 2 and 3 and operate using 2 MHz mode; STA4 may be assigned to Channel 4 so it may switch to Channel 4 and operate using 1 MHz mode.

Referring back to the example of FIG. 8, the STAs (STA1, STA3, STA4) may then transmit CTS (or G-CTS) $\mathbf{809}_{STA1}$, $\mathbf{809}_{STA3}$ and $\mathbf{809}_{STA4}$ on their respectively assigned channel(s) so that they may: alert the AP of their readiness for receiving their DL packets; and reserve the channel(s) until at least all DL MU-PCA packets have been ACKed by the STAs by setting NAV for all nodes operating on these channels, potentially using them as their own primary channel. For example, the duration field of the G-CTS may be set to Duration_G-RTS−SIFS_Time−G-CTS_Time, where Duration_G-RTS is the duration setting contained in the RTS (or G-RTS) packet $\mathbf{808}_{AP}$, SIFS_Time is the duration of the IFS 810 and G-CTS_Time is the transmission time of the G-CTS packet. A STA may transmit a CTS frame if it receives a RTS from the AP, and the STA may transmit G-CTS if it receives a G-RTS from the AP.

Upon receiving CTS (or G-CTS) $\mathbf{809}_{STA1}$, $\mathbf{809}_{STA3}$ and $\mathbf{809}_{STA4}$, the AP may transmit the data packets $\mathbf{812}_{AP}$ to each STA (STA1, STA3, STA4) on their respectively assigned channels. Since the data packets $\mathbf{812}_{AP}$ could be of different length (for example, the data packet $\mathbf{812}_{AP}$ on channel 1 is longer than the data packets $\mathbf{812}_{AP}$ on the other channels) and could be transmitted using different MCS, the longest packet could be chosen to be transmitted on the primary channel $\mathbf{218}_1$ so that the entire BSS may rely on the timing of the primary channel $\mathbf{218}_1$ to stay synchronized for BSS-wide operations. Padding $\mathbf{814}_{AP}$ may be used on all channels $\mathbf{218}_{1\ldots4}$ to make the data packets of equal length in time so that the DL transmissions on all channels $\mathbf{218}_{1\ldots4}$ end at the same time. Once the STAs (STA1, STA3, STA4) receive their respective data packets, they may send out ACK packets $\mathbf{816}_{STA1}$, $\mathbf{816}_{STA3}$ and $\mathbf{816}_{STA4}$ on their respectively assigned channels to indicate the reception.

For STAs that are monitoring the channels, when they receive a MPM, RTS or G-RTS from the AP that is not addressed to them, they may cancel the NAV if no transmission from the AP has been detected after waiting for T_handshake+Y×A_Slot_Time+aPHY-RX-START-Delay, where T-Handshake is the time for transmitting all packets to start the MU-PCA transmissions including durations of frames such as MPM, RTS, G-RTS, CTS, G-CTS and multiple SIFS intervals, A_Slot_Time is the duration of a slot, aPHY-RX-START-Delay may be a delay in the PHY layer pertaining to start of reception, and Y may be defined as fit for the particular WLAN systems.

Figure 9:
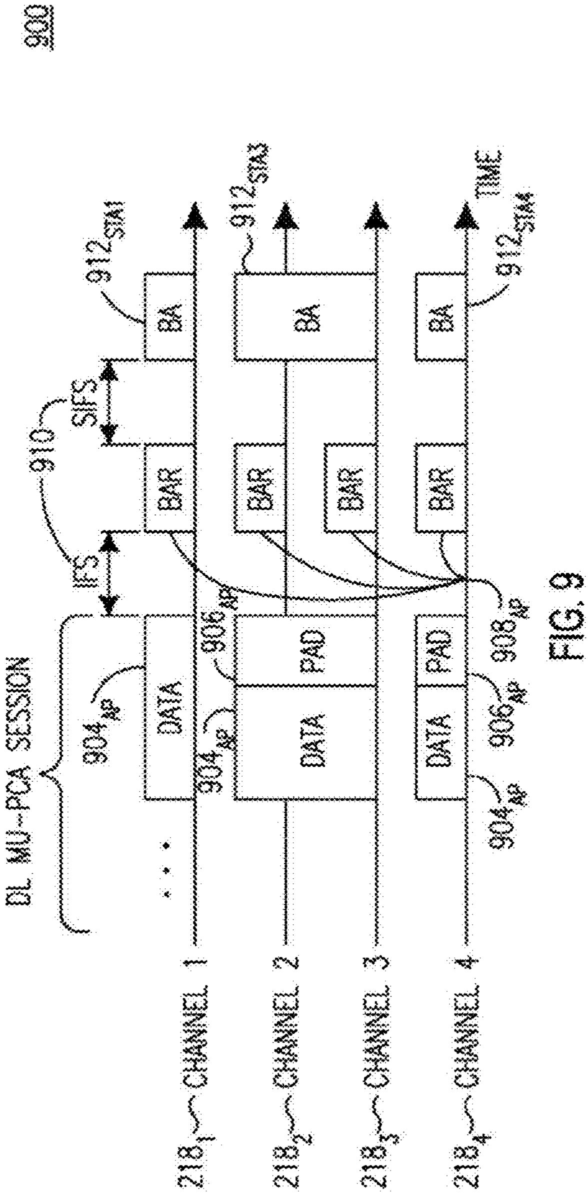
FIG. 9 shows an example MAC scheme for enabling DL MU-PCA using control frames and block acknowledgments (BAs)

In addition to the examples describe above in FIGS. 6-8, the acknowledgement of the DL MU-PCA data frames may also be implemented as Block ACKs (BAS). FIG. 9 shows an example MAC scheme 900 for enabling DL MU-PCA using control frames and BAs. In the example of FIG. 9, the AP may transmit data $\mathbf{904}_{AP}$ (and may use padding as needed $\mathbf{906}_{AP}$) to the STAs (STA1, STA3, STA4) during the DL MU-PCA session 902. At the end of DL MU-PCA Session 902, the AP may immediately or with some IFS 910 delay send BAR frames $\mathbf{908}_{AP}$ on all channels $\mathbf{218}_{1\ldots4}$. The STAs (STA1, STA3, STA4), when receiving the BAR frames $\mathbf{908}_{AP}$ may use BAs $\mathbf{912}_{STA1}$, $\mathbf{912}_{STA3}$, and $\mathbf{912}_{STA4}$, to ACK the DL MU-PCA data frames $\mathbf{904}_{AP}$ they received from the AP. In another example, at the end of DL MU-PCA Session, the STAs may use BAs to ACK the DL MU-PCA data frames they received from the AP. In another example, at the end of the DL MU-PCA Session, the AP may immediately or with some IFS delay send BAR frames on the primary channel(s). The STA that ranked as the first STA in the MU-PCA group may transmit a BA to the AP to acknowledge the DL MU-PCA frames it received from the AP; once the AP receives the BA from the first STA in the DL MU-PCA group, it may send a Block ACK Request frame (BAR) to a second STA in the MU-PCA group; and the second STA may then reply with a BA. This process may continue until all STAs in the MU-PCA group have transmitted their BA to the AP to acknowledge the DL MU-PCA frames they have received from the AP.

The standalone UL MU-PCA may be supported by MAC schemes such as the examples illustrated in FIGS. 12-15 (described below) by exchanging packets such as Uplink Request (ULR), Group-Poll (G-Poll), Group-ACK (G-ACK) and G-CTS. In order to provide detailed description of the three MAC schemes, the format of the control frames such as URL, G-Poll, G-ACK as well as the transmission of the control frames are first described. The example frames shown in FIGS. 10 and 11 do not show all possible fields that may be included in the frame. For example, the MAC header and frame body may include other fields not shown. Moreover, the fields may appear in any order and may not necessarily be in the order shown. For example, the Type, SubType and DA fields may not appear in the MAC header in the order shown.

Figure 10:
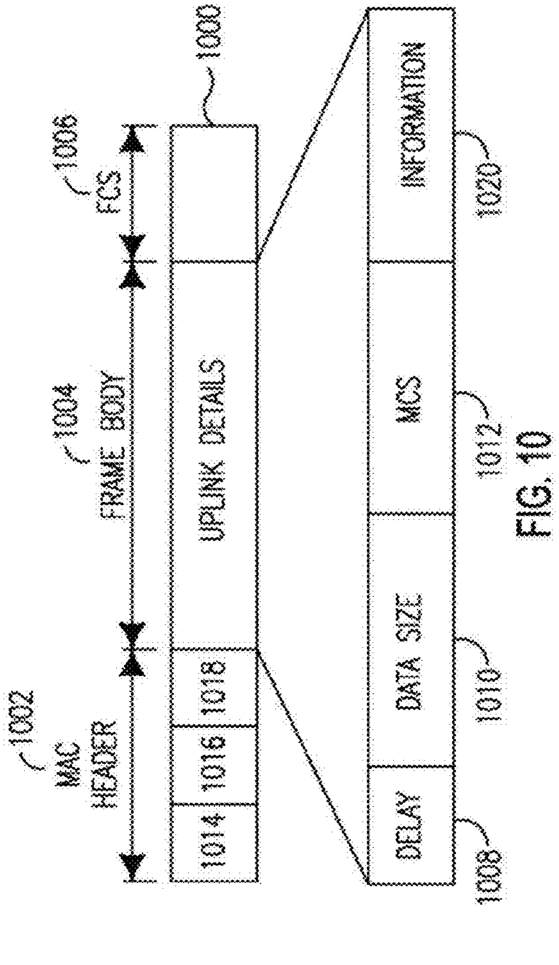
FIG. 10 shows an example frame format of the Uplink Request frame (ULR)

FIG. 10 shows an example frame format of the Uplink Request frame (ULR) 1000. The ULR 1000 may include a MAC header 1002, a frame body 1004, and FCS 1006. The Type field 1014 and Subtype field 1016 in the MAC Header 1002 may indicate that the frame is of the type ULR (other fields 1018 in the MAC Header 1002 may be included). For example, the bits of the Type Field 1014 and Subtype field 1016 may be set according to Table 3.

TABLE 3

| B3 B2 | Type Description | B7 B6 B5 B4 | Subtype Description |
|---|---|---|---|
| 0 1 | Control | 0 1 0 0 | ULR |

The frame body 1004 of ULR 1000 may include the specifications or uplink details of the data to be sent to the AP using UL MU-PCA such as, for example, maximum allowed delay 1008, data size 1010, MCS 1012 used to transmit and other information 1020 such as QoS priority, among other things. In an example, the data size 1010 and MCS 1012 may be combined into one field that represents the duration or transmission opportunity (TXOP) duration that the STA is requesting. The URL 1000 may be implemented as any type of frame such as action frames, action no-ACK frames or any other type of management or control frames, or as an IE, field and subfield of a management and control frame.

Figure 11:
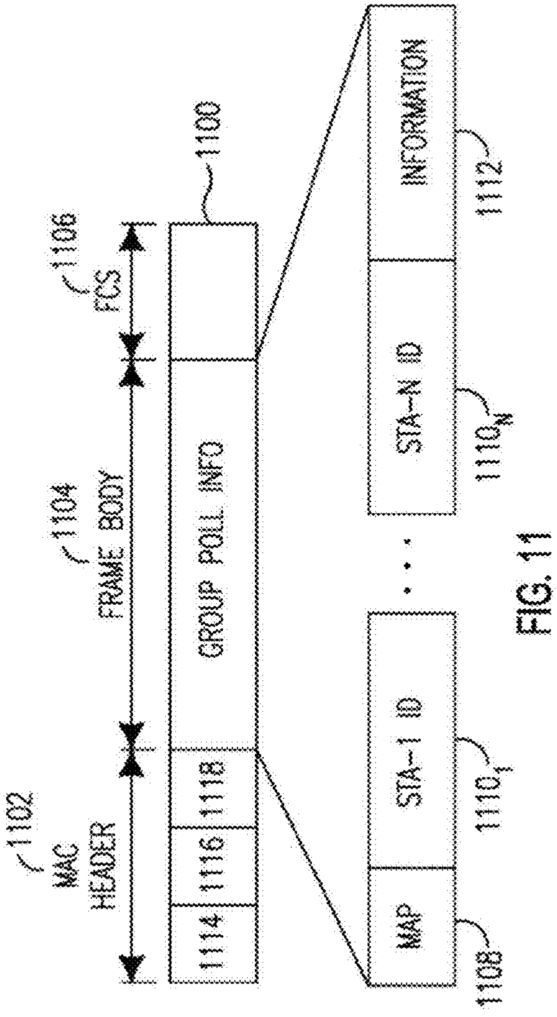
FIG. 11 shows an example frame format of the Group-Poll (G-Poll) frame.

FIG. 11 shows an example frame format of the Group-Poll (G-Poll) frame 1100. The G-Poll frame 1100 may include a MAC header 1102, a frame body 1104, and FCS 1106. The Type field 1114 and Subtype field 1116 may indicate that the G-Poll frame 1100 is of the type G-Poll. For example, the Type Field 1114 and Subtype field 1116 may be set according to Table 4.

TABLE 4

| B3 B2 | Type Description | B7 B6 B5 B4 | Subtype Description |
|---|---|---|---|
| 0 1 | Control | 0 0 1 1 | G-Poll |

The DA field 1118 in the MAC Header 1102 may be set to a multicast MAC address representing a group of STAs if the MU-PCA group has been formed and may be identified by the multicast MAC address. In another example, the DA field 1118 may be set to a broadcast address and the STAs being polled may be identified in the frame body 1104 or by the Group ID in the PLCP header (not shown). The G-Poll frame 1100 may also be transmitted to the unicast MAC address of the targeted STA.

The MAP field 1108, which may be in the frame body or MAC header 1102 or PLCP header (not shown), may indicate how many STAs are being polled and other information that is contained in the frame body. The STA IDs 1110$_{1 \ldots N}$ of the STA could be, for example, associate IDs (AIDs), MAC addresses or other form of IDs that the AP and the STAs may have established beforehand. If G-Poll is transmitted to a pre-established group of STAs, STA IDs may be omitted. The information 1112 contained in the frame body 1104 could be for example channels assigned to the STAs on which the STAs should transmit their ULR in response to the reception of the G-Poll frame 1100. The G-Poll frame 1100 may be implemented as any type of frame such as Action Frames, Action No-ACK frames or any type of management or control frames, or as an IE, field and subfield of a management and control frame.

The frame format of Group-ACK (G-ACK) may be like the frame format of the G-Poll frame 1100 shown in FIG. 11 except Type field 1114 and Subtype field 1116 may indicate that the frame format is of the type G-ACK, and information 1112 may be different or absent. Alternatively, assuming G-ACK has the same frame format as the G-Poll frame 1100 of FIG. 11, the MAP field 1108 portion of the G-ACK may indicate that it is a G-ACK rather than a G-Poll. The G-ACK frame body may contain a field for each STA in the group of STAs that has one or more bits to acknowledge the reception of one or more packets. Each field may also indicate the starting sequence number for each STA that the G-ACK frame is acknowledging. The G-ACK may be implemented as any type of frames such as Action Frames, Action No-ACK frames or any other types of Management and Control frames or IEs or fields within Management and Control frames. Transmission of control packets such as G-Poll, ULR, G-CTS, and G-ACK in the context of stand-alone UL MU-PCA may be transmitted in multiple modes and may follow the same rules as described previously for the transmission of MPM frames.

Figure 12:
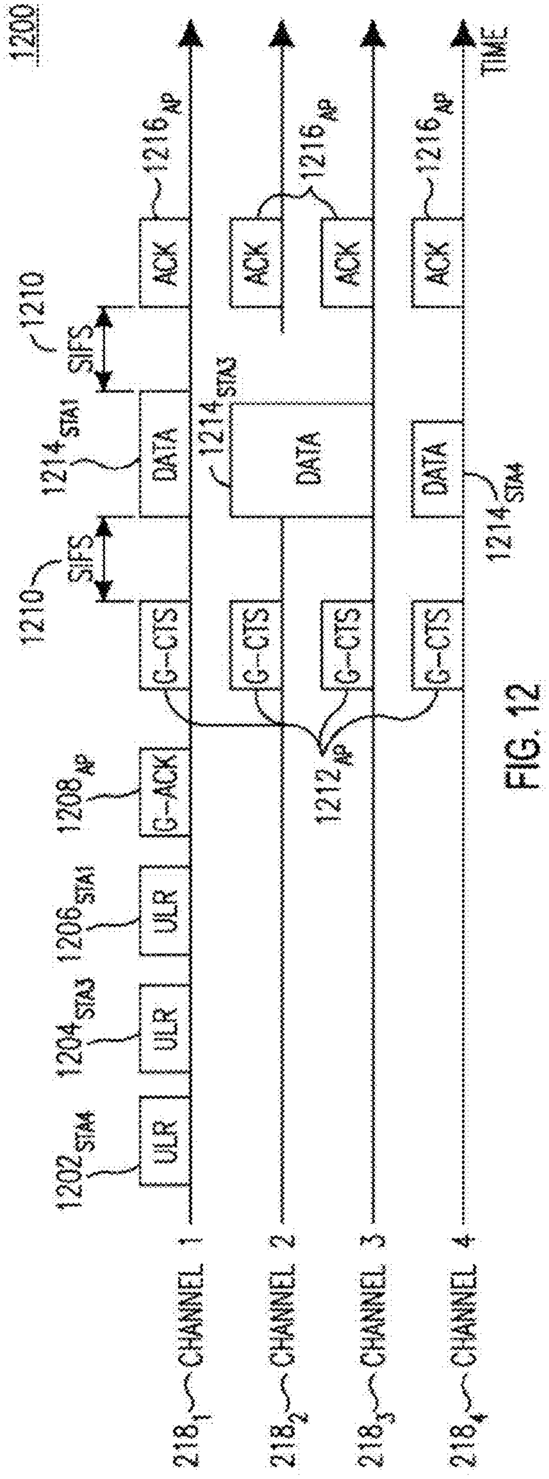
FIG. 12 shows an example MAC scheme supporting uplink (UL) MU-PCA for data without strict delay bound.

FIG. 12 shows an example MAC scheme 1200 supporting UL MU-PCA for data without strict delay bound. STAs, when they obtain the access to the channel, or when they are being polled, or when transmitting packets to the AP, may send an ULR or piggyback an ULR onto previous UL packets to the AP to inform the AP that they have uplink packets to send and may also include specifications of these packets such as, for example, delay, data size, MCS used, or time/TXOP requested, among other things. In the example of FIG. 12, STA4, STA3 and STA1 transmit ULR 1202$_{STA4}$, 1204$_{STA3}$, and 1206$_{STA1}$ sequentially on the primary channel 218$_1$ to the AP.

AP may alert the STAs that it has received the ULR(s) with a (G-)ACK transmission 1208$_{AP}$ (i.e., an ACK or G-ACK frame), either as an individual frame or as a piggybacked part of a transmit packet. The AP may not transmit a (G-)ACK if the UL MU-PCA is scheduled to start shortly after the AP receives the ULRs. If the delay limit as specified in the ULR frame has passed and there was no G-ACK or other piggybacked form of the G-ACK received from the AP, the STA may assume that the transmission of the ULR has failed and it may choose to send another ULR, either separately or piggybacked onto another packet (for example, as a part of an aggregated MAC protocol data unit (A-MPDU) or an aggregated service protocol data unit (A-MSDU)). It may choose to send the data packet directly to the AP.

In the example of FIG. 12, after obtaining the available channels, the AP may transmit G-CTS 1212$_{AP}$ with channel assignments to the STAs participating in the UL MU-PCA, which may do any of the following: alert the STAs participating in the UL MU-PCA of the channels they are assigned to transmit UL packets; align the start of all UL transmissions from the STAs; and/or reserve the medium on all available channels by setting the duration field of the G-CTS and therefore the NAV of all monitoring STAs on these channels till the end of the ACKs by the AP to all UL data packets. The duration field of G-CTS 1212$_{AP}$ may be set to, for example, 2×SIFS_Time+Max_Data_Duration+ACK_Duration, where SIFS_Time may be the duration of the SIFS 1210 interval, ACK_Duration may be the duration of the ACK frame 1216$_{AP}$ and the Max_Data_Duration may be the transmission of the longest data packet in time 1214$_{STA1}$ transmitted on all available channels 218$_{1 \ldots 4}$, which may be calculated using the Data Size field and MCS field included in each ULR frame 1202$_{STA4}$, 1204$_{STA3}$, and 1206$_{STA1}$. The AP may also assign the longest UL data packet (in time) to be transmitted on the primary channel 218$_1$.

The STAs in the UL MU-PCA group (STA1, STA3, and STA4) may transmit uplink packets 1214$_{STA1}$, 1214$_{STA3}$, and 1214$_{STA4}$, respectively, to the AP on their assigned channel(s) (e.g. STA1 on channel 218$_1$, STA3 on channels 218$_{2-3}$ and STA4 on channel 218$_4$).

AP may wait for an additional SIFS 12010 after the end of the longest UL data packet in time, and may transmit ACKs 1216$_{AP}$ (or BAs) to alert the reception of the UL packets. Alternatively, the AP may send a Group-ACK, which is a jointly-encoded ACK, for all UL packets instead of doing it one-by-one, either over the entire bandwidth 218$_{1 \ldots 4}$ or on the primary channel 218$_1$.

Figure 13:
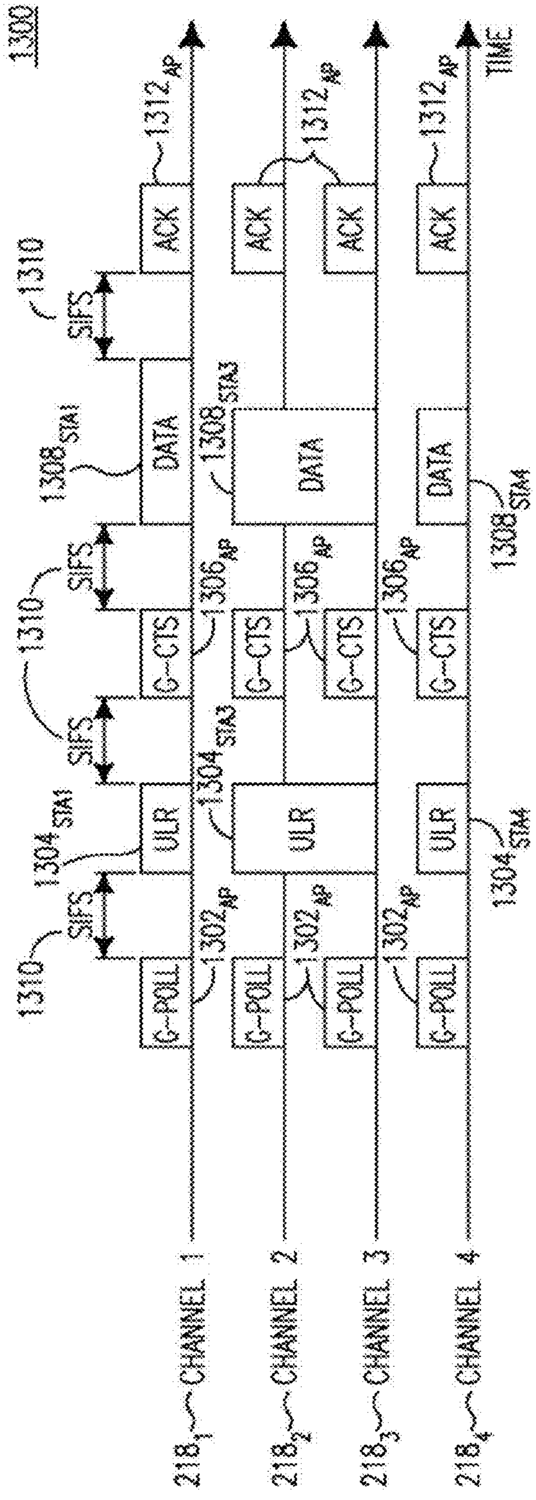
FIG. 13 shows an example MAC scheme supporting UL MU-PCA for data with strict delay bound.

FIG. 13 shows an example MAC scheme 1300 supporting UL MU-PCA for data with strict delay bound. This type of UL MU-PCA may be used, for example, for high priority STAs where the AP may periodically poll the STAs for UL packets. After obtaining the channel over all available bandwidth 218$_{1 \ldots 4}$, the AP may send G-Poll frames 1302$_{AP}$ on the available channels 218$_{1 \ldots 4}$, which may serve to: poll STAs for uplink packets; alert STAs their assigned channels on which they may reply with a ULR packet; and/or reserve the channel by setting the duration field, and therefore the NAV for STAs monitoring the channels. The STAs (STA1, STA3, and STA4) in the UL MU-PCA group may switch to their respective assigned channels (STA1 to 218$_1$, STA3 to 218$_{2,3}$ and STA4 to 218$_4$) and the appropriate transmitting mode and may reply to the G-Poll frames 1302$_{AP}$ with ULR packet transmissions 1304$_{STA1}$, 1304$_{STA3}$, and 1304$_{STA4}$ over their respective channels to inform the AP of any UL packets they may have.

AP may transmit G-CTS 1306$_{AP}$ with channel assignments to the STAs participating in the UL MU-PCA, which may do any of the following: align the start of all UL transmissions 1308$_{STA1}$, 1308$_{STA3}$ and 1308$_{STA4}$, from the STAs; reserve the medium on all available channels 218$_{1 \ldots 4}$ by setting the duration field of the G-CTS 1306$_{AP}$ and therefore the NAV of all monitoring STAs (STA1, STA3, and STA4) on these channels until the end of the ACK frames 1312$_{AP}$ by the AP to all UL data packets 1308$_{STA1}$, 1308$_{STA3}$ and 1308$_{STA4}$. The duration field of the G-CTS 1306$_{AP}$ may be set to 2×SIFS_Time+Max_Data_Duration+ACK_Duration, where SIFS_Time may be the duration of the SIFS interval 1310, ACK_Duration may be the duration of the ACK frame 1312$_{AP}$ and the Max_Data_Duration may be the transmission of the longest data packet in time (1308$_{STA1}$ in this example) transmitted on all available channels 218$_{1 \ldots 4}$, which may be calculated using the Data Size field and MCS field included in each ULR frame 1304$_{STA1}$, 1304$_{STA3}$, and 1304$_{STA4}$. The AP may also assign the longest UL data packet in time (1308$_{STA1}$ in this example) to be transmitted on the primary channel 218$_1$. All STAs in the UL MU-PCA group (STA1, STA3, and STA4) may transmit uplink packets 1308$_{STA1}$, 1308$_{STA3}$ and 1308$_{STA4}$ to the AP on their respectively assigned channel(s). AP may wait for an additional SIFS interval 1310 after the end of the longest UL data packet in time 1308$_{STA1}$ and may transmit ACKs 1312$_{AP}$ (or BAs) to alert the reception of the UL packets 1308$_{STA1}$, 1308$_{STA3}$ and 1308$_{STA4}$.

For STAs that are monitoring the channels (for example, STA2), when they receive a G-Poll frame 1302$_{AP}$ from the AP that is not addressed to them, they may cancel the NAV if no transmission from the AP has been detected after waiting for ULR_Time+2×SIFS_Time+Y×A_Slot_Time+aPHY-RX-START-Delay, where ULR_Time is the duration of a ULR packet 1304$_{STA4}$, SIFS_Time is the duration of SIFS 1310, A_Slot_Time is the duration of a slot, aPHY-RX-START-Delay may be a delay in the PHY layer pertaining to start of reception, and Y is a configurable parameter.

Figure 14:
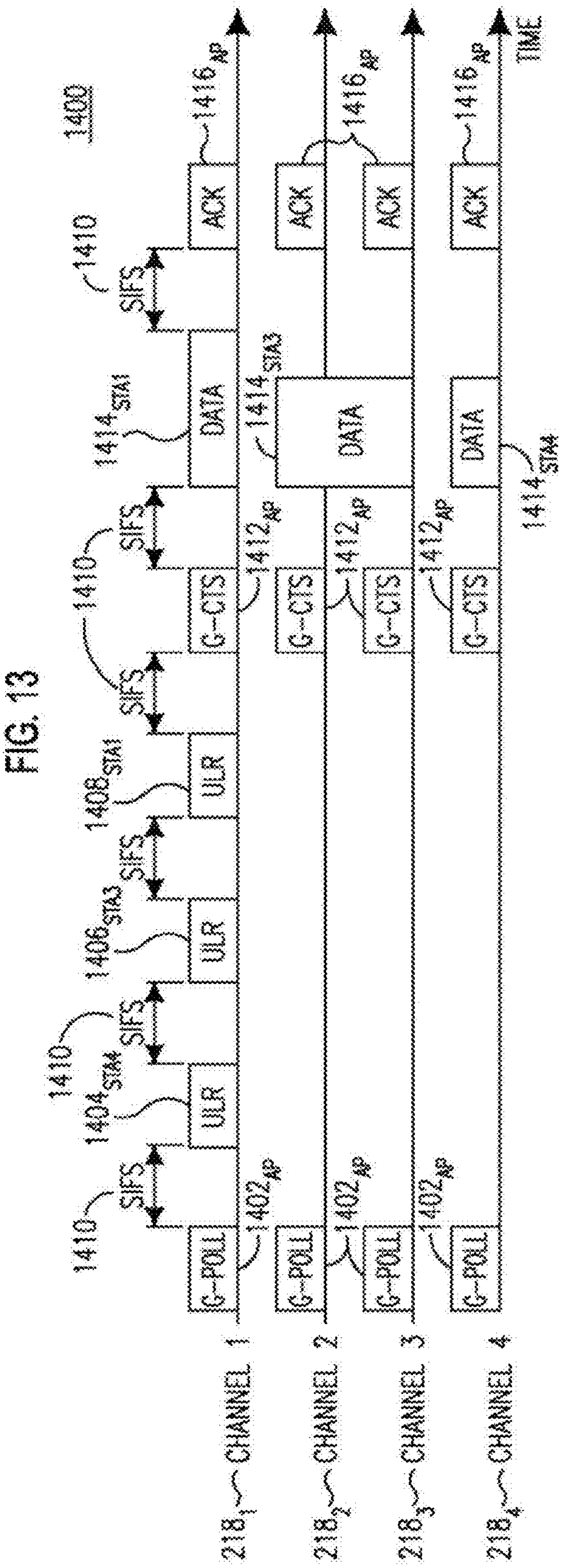
FIG. 14 shows an example MAC scheme supporting UL MU-PCA for data where the ULR packets are transmitted sequentially.

As an alternative to FIG. 13, FIG. 14 shows an example MAC scheme 1400 supporting UL MU-PCA for data where the ULR packets are transmitted sequentially. Just like in FIG. 13, The AP may transmit G-Poll 1402$_{AP}$ to the STAs in the MU-PCA group. The ULR packets 1404$_{STA4}$, 1406$_{STA3}$, and 1408$_{STA1}$ from the STAs in the UL MU-PCA group may be sent sequentially over the primary channel 218$_1$ for STAs that cannot switch channels and operation mode quickly. The G-Poll 1402$_{AP}$ sent by the AP may have the STA assigned to transmit on the primary channel (in this example, STA1) transmitting its ULR frame as the last in the order of ULR transmissions 1404$_{STA4}$, 1406$_{STA3}$, and 1408$_{STA1}$ in order to allow other STAs in the UL MU-PCA group sufficient time to switch channels and operation mode. Like in FIG. 13, the AP may send G-CTS 1412$_{AP}$ on all channels 218$_{1 \ldots 4}$, and it may transmit ACKs 1416$_{AP}$ to acknowledge receipt of the data transmissions 1414$_{STA1}$, 1414$_{STA3}$, and 1414$_{STA4}$ by the STAs (STA1, STA3, and STA4).

In another example, the first STA in the MU-PCA group may transmit a ULR a SIFS time after the first G-Poll frame; upon receiving the ULR from the first STA, the AP may transmit another G-Poll (or another control frame, for example, PS-Poll) on the primary channel to the second STA to request a ULR from the second STA; the second STA may respond with a ULR; the process may repeat until all STAs in the MU-PCA group have transmitted their ULR frames. A STA polled by the AP may not have an UL packet to send. In this case, the AP may assign the channel to a STA that previously has indicated to the AP that it has UL packets.

In another example, after obtaining the channel over all available bandwidth 218$_{1 \ldots 4}$, the AP may send G-Poll frames on the available channels 218$_{1 \ldots 4}$, which may serve to: poll STAs for uplink packets; and/or alert STAs their assigned channels on which they may reply with a UL packet. The STAs in the MU-PCA group may switch to their assigned channel and directly start to transmit their UL packets to the AP after an IFS interval such as SIFS.

Figure 15:
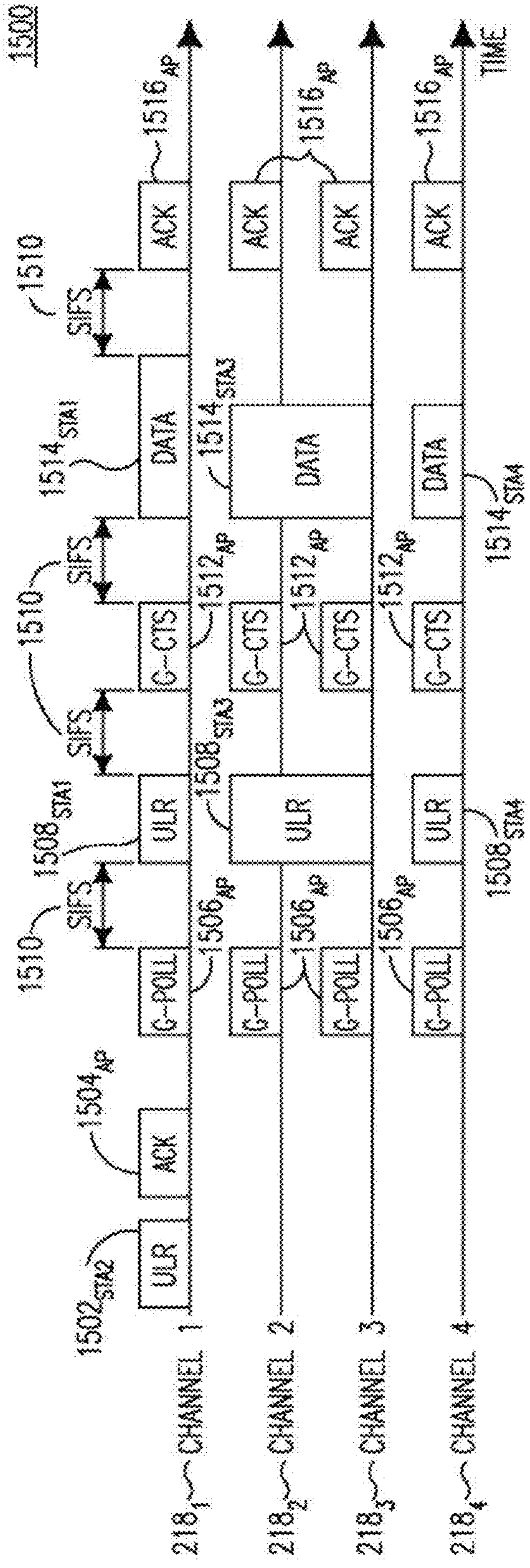
FIG. 15 shows an example MAC scheme supporting UL MU-PCA for data with mixed delay requirements.

FIG. 15 shows an example MAC scheme 1500 supporting UL MU-PCA for data with mixed delay requirements. A STA not belonging to a UL MU-PCA group (for example, STA2) may alert the AP that it has UL packets to send by sending a ULR 1502$_{STA2}$ to the AP. The indication and specification of the UL packets may also be piggybacked onto a previous packet transmitted by the STA (STA2) to the AP. The AP may indicate to STA2 the reception of the ULR 1502$_{STA2}$ by transmitting a (G-)ACK frame 1504$_{AP}$. The (G-JACK frame 1504$_{AP}$ may be acknowledgement for the reception of a group of STAs that indicated they have UL packets for the AP. The (G-)ACK may be piggybacked onto another DL packet or a broadcast/multicast packet. The AP may poll a group of UL MU-PCA STAs (STA1, STA3, STA4) whether they have UL packets to transmit by sending out G-Poll frames 1506$_{AP}$ with assigned channel(s) for each STA on which they may send ULR packets $1508_{STA1}$, $1508_{STA3}$, and $1508_{STA4}$ to the AP. A STA, for example STA4, may indicate that it does not have a UL packet to transmit.

AP may transmit G-CTS $1512_{AP}$ with channel assignments to the STAs that are part of the UL MU-PCA group and have UL packets to send (in this example, STA1 and STA3). It may also send a G-CTS $1512_{AP}$ containing information for STA2 that has previously indicated that it has UL packets to transmit, which may do any of the following: instruct STA2 to switch to its assigned channel $218_4$ and operating mode; align the start of all UL transmissions from the STAs; reserve the medium on all available channels $218_1$ . . . by setting the duration field of the G-CTS $1512_{AP}$ and therefore the NAV of all monitoring STAs on these channels until the end of the ACK $1516_{AP}$ by the AP to all UL data packets $1514_{STA1}$, $1514_{STA3}$ and $1514_{STA2}$. The duration field of G-CTS $1512_{AP}$ may be set to 2×SIFS_Time+Max_Data_Duration+ACK_Duration, where SIFS_Time is the duration of the SIFS interval 1510, ACK_Duration is the duration of the ACK frame $1516_{AP}$ and the Max_Data_Duration is the transmission of the longest data packet in time (in this example, $1514_{STA1}$) transmitted on all available channels $218_{1 \ldots 4}$, which may be calculated using the Data Size field and MCS field included in each ULR frame $1508_{STA1}$, $1508_{STA3}$, and $1508_{STA4}$ and/or from ULR $1502_{STA2}$. The AP may also assign the longest UL data packet in time ($514_{STA1}$) to be transmitted on the primary channel $218_1$.

All STAs in the UL MU-PCA group with data to send (STA1 and STA3) and STA2 may transmit uplink packets $1514_{STA1}$, $1514_{STA3}$ and $1514_{STA2}$ to the AP on their respectively assigned channel(s). AP may wait for an additional SIFS interval 1510 after the end of the longest UL data packet in time ($1514_{STA1}$) and may transmit ACK $1516_{AP}$ to alert the reception of the UL data packets $1514_{STA1}$, $1514_{STA3}$ and $1514_{STA2}$.

In addition to the acknowledgement methods described above, the acknowledgement of UL MU-PCA frames may be implemented using BA as well. The APs may acknowledge the UL MU-PCA, for example, at the end of an UL MU-PCA Session, the AP may use BAs to ACK the UL MU-PCA data frames that it received from the STAs on the individually assigned channels. In another example, at the end of a UL MU-PCA Session, the STAs may immediately or with some IFS delay send BAR frames on their assigned channels. The AP, when receiving the BAR from the STAs, may use BAs to ACK the UL MU-PCA data frames they received from a STA on the channel(s) assigned to that STA. In another example, at the end of a UL MU-PCA Session, the STA that is ranked as the first STA in the MU-PCA group may immediately or with some IFS delay transmit a BAR to the AP. The AP may transmit a BA to acknowledge the UL MU-PCA frames it received from the STA. Once the first STA receives the BA from the AP, the second STA in the MU-PCA frame may send BAR to the AP, and the AP may then reply with a BA. This process may continue until the AP has transmitted its BA to all STAs in the UL MU-PCA group. In another example, the AP may elect to transmit BA to all STAs in the UL MU-PCA group without the explicit BAR from the STAs. In another example, at the end of the UL MU-PCA Session, the AP may transmit ACK or BA or a Group ACK to all STAs in the UL MU-PCA group on the primary or on all channels. A frame may be defined to acknowledge one or more frames for a group of STAs.

UL and DL MU-PCA may be further combined in order to significantly reduce overhead of signaling in group configuration/setup. The MAC schemes supporting the combined UL/DL MU-PCA are shown in FIGS. 16-20. It is worth noting that though specific MAC schemes are shown in FIGS. 16-20 as examples, each feature or element can be used alone without the other features and elements of the described MAC schemes or in various combinations with or without other features and elements.

Figure 16:
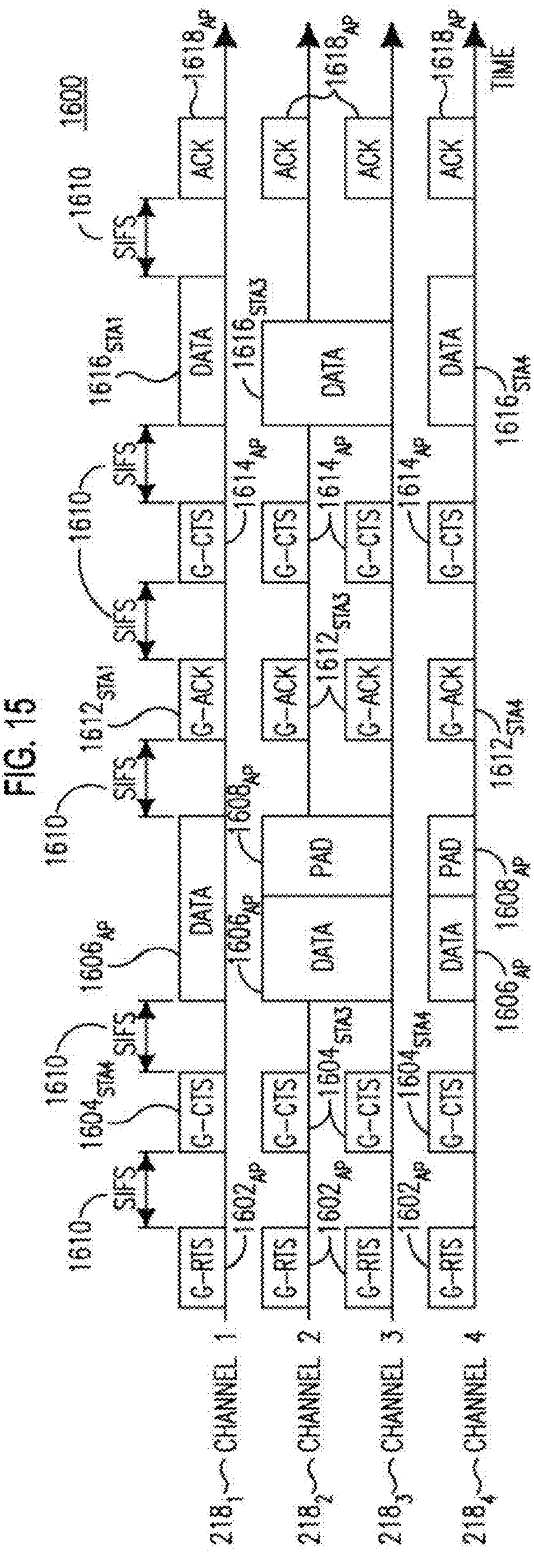
FIG. 16 shows an example of a MAC scheme supporting the combined DL and UL MU-PCA.

FIG. 16 shows an example of a MAC scheme 1600 supporting the combined DL and UL MU-PCA. Prior to beginning of this scheme, the AP may transmit any of the following: DL MU-PCA packets; and/or signaling for requesting the UL MU-PCA transmissions, which may be piggybacked onto the G-ACK terminating the DL MU-PCA packets. After obtaining access to all available channels $218_{1 \ldots 4}$, the AP may send out G-RTS $1602_{AP}$ with Channel Assignment on all channels $218_{1 \ldots 4}$, which may serve to do any of the following: alert the group of STAs participating in the DL MU-PCA (STA1, STA3, and STA4) of the channels that they should switch to receive their DL packets from the AP; reserve all channels $218_{1 \ldots 4}$ until at least all DL MU-PCA packets have been ACKed by the STAs by setting NAV for all nodes operating on these channels, potentially using them as their own primary channel. If one of the channels is already occupied by some other STAs, then G-RTS may not be sent on that channel and no STAs in the DL MU-PCA group may be assigned to that channel. Alternatively, MPM may be transmitted instead of G-RTS $1602_{AP}$.

Following the G-RTS $1602_{AP}$, the STAs in the DL MU-PCA group may switch to the channels assigned to them and switch to the correct operating mode. The STAs (STA1, STA3, and STA4) may then transmit (G-)CTS $1604_{STA1}$, $1604_{STA3}$, and $1604_{STA4}$, which may do any of the following: alert the AP of their readiness for receiving their DL packets; reserve the channel(s) until at least all DL MU-PCA packets have been ACKed by the STAs by setting NAV for all nodes operating on these channels, potentially using them as their own primary channel. Upon receiving the (G-)CTS $1604_{STA1}$, $1604_{STA3}$, and $1604_{STA4}$, the AP may transmit the data packets $1606_{AP}$ (possibly with padding $1608_{AP}$) to each STA (STA1, STA3, and STA4) on their respectively assigned channel(s). Since the data packets $1606_{AP}$ could be of different lengths and could be transmitted using different MCS, the longest packet could be chosen to be transmitted on the primary channel $218_1$ so that the entire BSS may rely on the timing of the primary channel $218_1$ to stay synchronized for BSS-wide operations. Padding $1608_{AP}$ may be used on all channels $218_{1 \ldots 4}$ to make the data packets $1606_{AP}$ of equal length in time so that the DL transmissions end at the same time.

Once the STAs (STA1, STA3, STA4) receive their respective data packets $1606_{AP}$ and decode the data successfully, they may send out ACK, BA or G-ACK packets $1612_{STA1}$, $1612_{STA3}$, and $1612_{STA4}$ to indicate successful reception. The Acknowledgement of the DL MU-PCA packets may not be needed until the end of the MU-PCA sessions or until the AP explicitly request an ACK or BA using a BAR frame. If a STA (STA1, STA3, or STA4) have UL packets to transmit to the AP, it may notify the AP by setting a More Fragment bit in the MAC Header of the ACK, BA or G-ACK frame ($1612_{STA1}$, $1612_{STA3}$, or $1612_{STA4}$) to "1", or use some other method of indication.

The duration field of each G-ACK frame $1612_{STA1}$, $1612_{STA3}$, and $1612_{STA4}$ may be set to equal 3×SIFS_Time+Data_Duration+G-CTS_Time+ACK_Duration, where: SIFS_Time may be the duration of the SIFS interval 1610; ACK_Duration may be the duration of a (G-)ACK frame $1618_{STA1}$, $1618_{STA3}$, or $1618_{STA4}$; Data_Duration may be calculated by using the UL data packet length (for example, length of packets $1616_{STA1}$, $1616_{STA3}$, or $1616_{STA4}$) and the MCS used by the DL data packet $1606_{AP}$ for the respective STA; and the G-CTS_Time may be the same as the duration as the previous G-CTS ($1604_{STA1}$, $1604_{STA3}$, or $1604_{STA4}$) sent by the STA to the AP.

In an example, ACK, BA or G-ACK frame may be omitted or delayed, such that the AP may indicate by signaling Reverse Direction Grant (RDG) for the STA in the DL MU-PCA data frames that the STAs may start to transmit their UL packets or with some delay after the DL MU-PCA transmissions. This RDG indication may be implemented by setting the RDG/More PPDU indictor in the MAC header or using other methods.

With reference to FIG. 16, the AP may transmit G-CTS $1614_{AP}$ to the STAs participating in the UL MU-PCA, where UL channel assignments may be included that may be different than the DL channel assignment. The G-CTS $1614_{AP}$ may be used for any of the following: to align the start of all UL transmissions $1616_{STA1}$, $1616_{STA3}$, and $1616_{STA4}$ from the STAs; to reserve the medium on all available channels $218_{1 \ldots 4}$ by setting the duration field of the G-CTS and therefore the NAV of all monitoring STAs on these channels until, for example, the end of the (G-)ACK frames $1618_{AP}$ by the AP to all UL data packets $1616_{STA1}$, $1616_{STA3}$, and $1616_{STA4}$. The duration field of the G-CTS $1614_{AP}$ may be set to 2×SIFS_Time+Max_Data_Duration+ACK_Duration, where: SIFS_Time is the duration of the SIFS interval 1610; ACK_Duration is the duration of the (G-)ACK frame $1618_{AP}$; and the Max_Data_Duration is the transmission of the longest data packet in time (in this example, $1606_{AP}$ on channel $218_1$) transmitted on all available channels, which is obtained from the duration field of the G-ACK frames $1612_{STA1}$, $1612_{STA3}$, or $1612_{STA4}$.

In another example where the AP indicates RDG in the DL MU-PCA data frame, the AP may choose not to transmit G-CTS. The STAs in the UL MU-PCA may initiate UL MU-PCA transmissions if they have UL frames to transmit, possibly after some IFS delay, starting at the end of the DL MU-PCA frames on their assigned channels.

With reference to FIG. 16, following the reception of (G-)CTS $1614_{AP}$ from the AP, STAs in the UL MU-PCA group (STA1, STA3 and STA4), may transmit uplink packets $1616_{STA1}$, $1616_{STA3}$, and $1616_{STA4}$ to the AP on their respectively assigned channel(s) (channel $218_1$ for STA1, channels $218_{2,3}$ for STA3 and channel $218_4$ for STA4). AP may wait for an additional SIFS interval 1610 after the end of the longest UL data packet in time (in this example, $1616_{STA1}$) and may transmit (G-)ACK frames $1618_{AP}$ to notify the STAs (STA1, STA3 and STA4) of the reception of the UL packets $1616_{STA1}$, $1616_{STA3}$, and $1616_{STA4}$. In another example, a jointly-encoded ACK may be transmitted across all channels $218_{1 \ldots 4}$ or just on the primary channel(s) $218_1$. The ACK may also be implemented as BA or multi-user ACKs on all channels $218_{1 \ldots 4}$ or just on the primary channel(s) $218_1$, or the AP may transmit the BAs if the STAs request them using a BAR.

Figure 17:
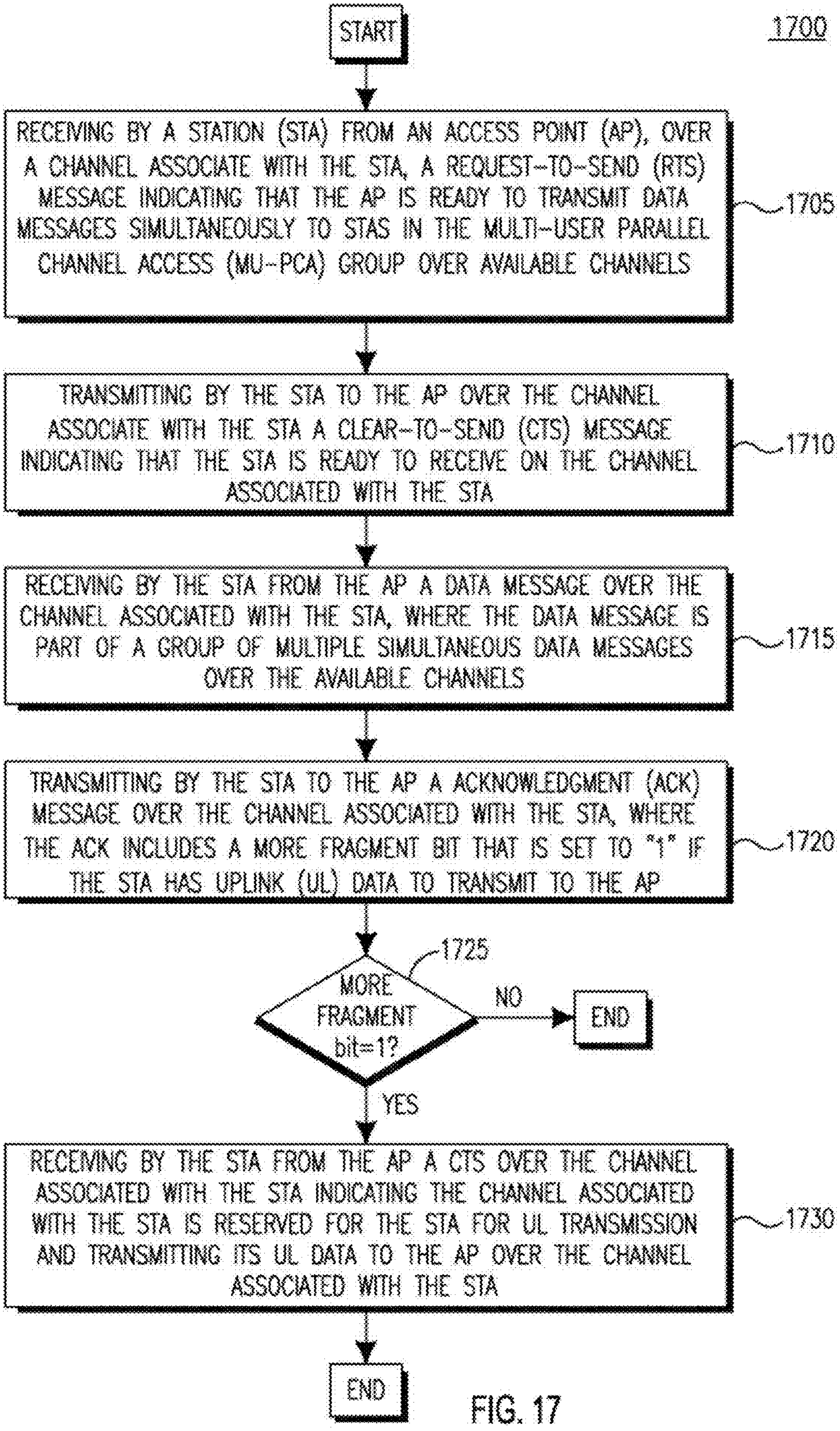
FIG. 17 shows an example flow diagram of a method for combined DL and UL MU-PCA performed by a STA in a BSS system.

FIG. 17 shows an example flow diagram 1700 of a method for combined DL and UL MU-PCA performed by a STA in a BSS system, where the STA is part of a MU-PCA group. In 1705, the STA may receive, from an AP, over a channel associated with the STA, a RTS that indicates that the AP is ready to transmit data messages simultaneously to STAs in the MU-PCA group over available channels. In 1710, the STA may transmit to the AP over the channel associated with the STA, a clear-to-send (CTS) that indicates that the STA is ready to receive on the channel associated with the STA. The CTS may reserve the channel associated with the STA for the STA for the MU-PCA session. In 1715, the STA may receive from the AP a data message over the channel associated with the STA, where the data message is part of a group of multiple simultaneous data messages over the available channels.

In 1720, the STA may transmit to the AP a acknowledgement (ACK) message (or G-ACK or BA) over the channel associated with the STA, where the ACK (or G-ACK or BA) may include a More Fragment bit that is set to '1' if the STA has uplink data to transmit to the AP. If the More Fragment bit is set to 1 indicating the presence of UL data at the STA, 1725, then, in 1730, the STA may receive from the AP a clear-to-send (CTS) message over the channel assigned to the STA indicating the channel associated with the STA is reserved for the STA for UL transmission and the STA may transmit its UL data to the AP over the channel associated with the STA. Any of the messages in FIG. 17 including RTS, CTS, and ACK may be group messages, for example, group RTS (G-RTS), group CTS (G-CTS), and group ACK (G-ACK).

Figure 18:
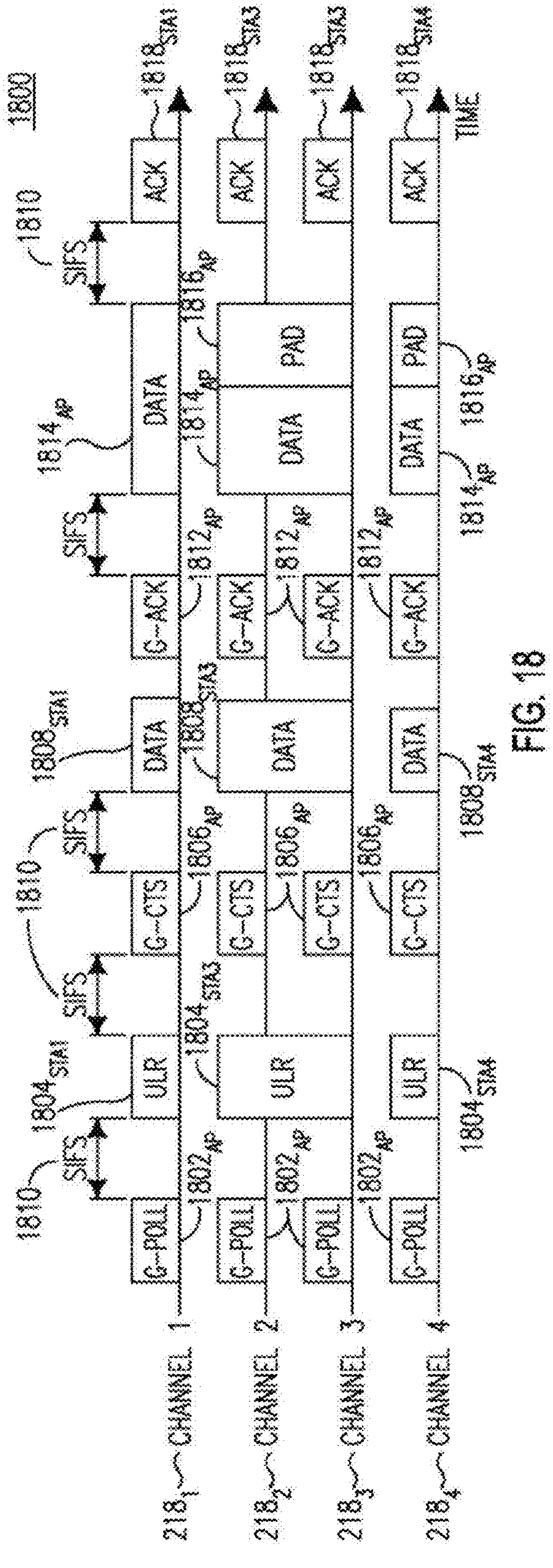
FIG. 18 shows an example MAC scheme supporting the combined UL and DL MU-PCA.

FIG. 18 shows an example MAC scheme 1800 supporting the combined UL and DL MU-PCA. Prior to this MAC scheme 1800, the group of STAs may transmit any of the following: UL MU-PCA packets to the AP; and signaling for the DL MU-PCA transmissions may be piggybacked onto the G-ACK terminating the UL MU-PCA packets. After obtaining the channel over all available bandwidth $218_{1 \ldots 4}$, the AP may send G-Poll frames $1802_{AP}$ on the available channels $218_{1 \ldots 4}$, which may accomplish any of the following: poll STAs for uplink packets; alert STAs their assigned channels on which they can reply with a ULR packets; and/or reserve the channel by setting the duration field, and therefore the NAV for STAs monitoring the channels. The STAs in the UL MU-PCA group (STA1, STA3, and STA4) may switch to the assigned channels and the appropriate transmitting mode and may reply the G-Poll with ULR packets $1804_{STA1}$, $1804_{STA3}$, and $1804_{STA4}$ over their respectively assigned channels (STA1 and $218_1$, STA3 on $218_{2,3}$ and STA4 on $218_4$) to inform the AP of any UL packets they have.

AP may transmit G-CTS $1806_{AP}$ on each channel $218_{1 \ldots 4}$ with channel assignments to the STAs participating in the UL MU-PCA, and which may achieve any of the following: align the start of all UL transmissions from the STAs $1808_{STA1}$, $1808_{STA3}$, and $1808_{STA4}$; and reserve the medium on all available channels $218_{1 \ldots 4}$ by setting the duration field of the G-CTS $1806_{AP}$ and therefore the NAV of all monitoring STAs on these channels till the end of the (G-)ACK frames $1812_{AP}$ by the AP to acknowledge all UL data packets $1808_{STA1}$, $1808_{STA3}$, and $1808_{STA4}$. The duration field of the G-CTS $1806_{AP}$ may be set to 2×SIFS_Time+Max_Data_Duration+ACK_Duration, where SIFS_Time may be the duration of the SIFS interval 1810, ACK_Duration may be the duration of the (G-)ACK frame $1812_{AP}$ and the Max_Data_Duration may be the transmission of the longest data packet in time transmitted on all available channels $218_{1 \ldots 4}$ (for example, $1808_{STA1}$), and which may be calculated using the Data Size field and MCS field included in each ULR frame $1804_{STA1}$, $1804_{STA3}$, and $1804_{STA4}$. The AP may also assign the longest UL data packet in time (for example, $1808_{STA1}$) to be transmitted on the primary channel $218_1$.

All STAs in the UL MU-PCA group (STA1, STA3, and STA4) may transmit uplink packets $1808_{STA1}$, $1808_{STA3}$, and $1808_{STA4}$ to the AP on their respectively assigned channel(s) (STA1 on $218_1$, STA3 on $218_{2,3}$ and STA4 on $218_4$). AP may wait for an additional SIFS interval 1810 after the end of the longest UL data packet in time and if it can decode the received data packet successfully, the AP may transmit G-ACK frames $\mathbf{1812}_{AP}$ to indicate the reception of the UL packets $\mathbf{1808}_{STA1}$, $\mathbf{1808}_{STA3}$, and $\mathbf{1808}_{STA4}$. If one or more UL data packets were not correctly decoded, then the AP may not send G-ACK packets on those corresponding channels. In an example, the AP may transmit a G-CTS addressed to itself if the AP has DL packets to transmit to the STAs from which the AP did not correctly receive the UL packets. The duration field setting of the (G-)CTS $\mathbf{1896}_{AP}$ may be the same as the duration field setting of the G-ACKs explained below. The (G-)ACKs $\mathbf{1812}_{AP}$ may be implemented as any type of frame, for example, as ACK, BA or multi-user ACKs frames. In an example, the acknowledgement of the UL MU-PCA packets may be omitted until the end of the MU-PCA sessions or until the STAs explicitly request an ACK or BA using a BAR frame.

With reference to FIG. 18, if the AP has DL packets to transmit to the STAs, it may set the More Fragment bit in the MAC Header of the G-ACK frame $\mathbf{1812}_{AP}$ to "1" or provide an indication using any other method. The duration field of the G-ACK frame $\mathbf{1812}_{AP}$ may be set to equal to 2×SIFS_Time+Data_Duration+ACK_Duration, where SIFS_Time is the duration of the SIFS interval 1810, ACK_Duration is the duration of the (G-)ACK frames $\mathbf{1812}_{AP}$, Data_Duration is calculated by using the longest DL data packet length in time (for example, data packet $\mathbf{1814}_{AP}$ on channel $\mathbf{218}_1$). In an example where the AP does not provide ACKs, the STAs may include a RDG indicator in the UL MU-PCA frames to provide reverse direction grand for the AP to transmit DL MU-PCA frames.

The AP may transmit its data packets $\mathbf{1814}_{AP}$ to each STA on their assigned channels, which may be after SIFS interval 1810. Since the data packets $\mathbf{1814}_{AP}$ could be of different length and may be transmitted using different MCS, the longest data packet $\mathbf{1814}_{AP}$ may be chosen to be transmitted on the primary channel $\mathbf{218}_1$ so that the entire BSS may rely on the timing of the primary channel $\mathbf{218}_1$ to stay synchronized for BSS-wide operations. Padding $\mathbf{1816}_{AP}$ may be used on any channel $\mathbf{218}_{1 \ldots 4}$ to make the data packets of equal length in time so that the DL transmissions end at the same time. Once the STAs receive their respective data packets $\mathbf{1814}_{AP}$, they may send ACK packets $\mathbf{1818}_{STA1}$, $\mathbf{1818}_{STA3}$ and $\mathbf{1818}_{STA4}$ on their respective channels to indicate the reception. The ACKs $\mathbf{1818}_{STA1}$, $\mathbf{1818}_{STA3}$ and $\mathbf{1818}_{STA4}$ may be implemented as BA. In another example, the acknowledgement of the DL MU-PCA packets may be omitted until the end of the MU-PCA sessions or until the AP explicitly request an ACK or BA using a BAR frame.

Figure 19:
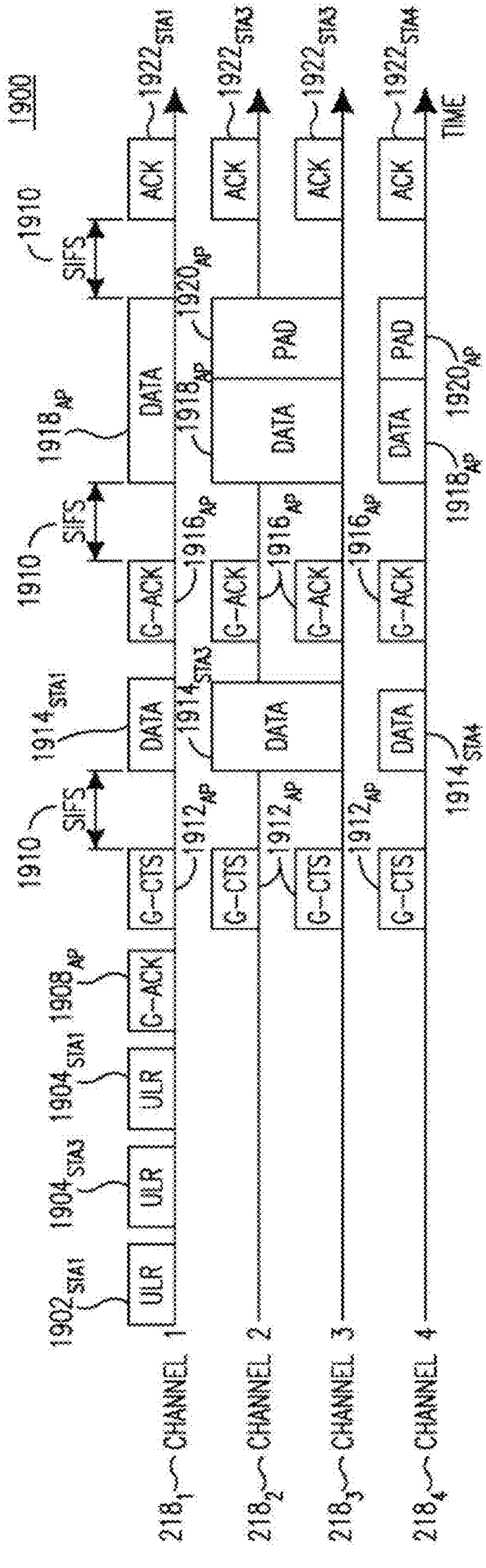
FIG. 19 shows an example MAC scheme where the UL MU-PCA transmission are initiated by ULR transmitted sequentially on the primary channel.

FIG. 19 shows an example MAC scheme 1900 where the UL MU-PCA transmission are initiated by ULR transmitted sequentially on the primary channel, where the individual messages function as described above with respect to other example MAC schemes. Each STA in the MU-PCA (STA1, STA3, and STA4), may transmit a ULR frame $\mathbf{1902}_{STA4}$, $\mathbf{1904}_{STA3}$, and $\mathbf{1906}_{STA1}$ sequentially to the AP on the primary channel $\mathbf{218}_1$, which the AP may acknowledge by sending a G-ACK $\mathbf{1908}_{AP}$ on the primary channel. The AP may transmit G-CTS $\mathbf{1912}_{AP}$ on each channel $\mathbf{218}_{1 \ldots 4}$ with channel assignments to the STAs participating in the UL MU-PCA. The STAs may transmit their data $\mathbf{1914}_{STA1}$, $\mathbf{1914}_{STA3}$ and $\mathbf{1914}_{STA4}$ over their respectively assigned channels (STA1 on $\mathbf{218}_1$, STA3 on $\mathbf{218}_{2,3}$, and STA4 on $\mathbf{218}_4$), and the AP may acknowledged any successfully received data by transmitting a G-ACK $\mathbf{1916}_{AP}$ on the respective channels.

The AP may transmit its data packets $\mathbf{1818}_{AP}$ to each STA on their assigned channels, which may be after SIFS interval 1810. Since the data packets $\mathbf{1918}_{AP}$ may be of different length and may be transmitted using different MCS, the longest data packet $\mathbf{1918}_{AP}$ may be chosen to be transmitted on the primary channel $\mathbf{218}_1$ so that the entire BSS may rely on the timing of the primary channel $\mathbf{218}_1$ to stay synchronized for BSS-wide operations. Padding $\mathbf{1920}_{AP}$ may be used on any channel $\mathbf{218}_{1 \ldots 4}$ to make the data packets of equal length in time so that the DL transmissions end at the same time. Once the STAs receive their respective data packets $\mathbf{1918}_{AP}$, they may send ACK packets $\mathbf{1922}_{STA1}$, $\mathbf{1922}_{STA3}$ and $\mathbf{1922}_{STA4}$ on their respective channels to indicate the reception.

Figure 20:
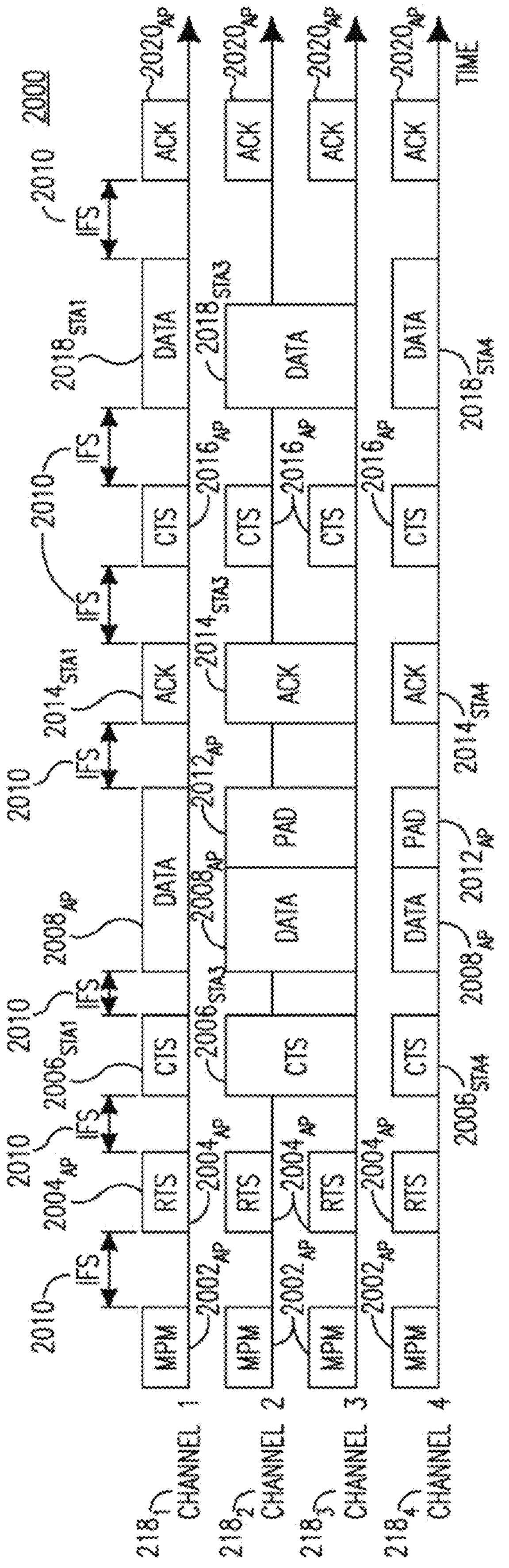
FIG. 20 shows an example MAC scheme enabling combined DL/UL MU-PCA using control frames over multiple channels and which also enables MU-PCA for legacy WiFi STAs.

FIG. 20 shows an example MAC scheme 2000 enabling combined DL/UL MU-PCA using control frames over the entire available bandwidth, which also enable MU-PCA for legacy WiFi STAs, which may be adherent to WiFi standards and drafts, and which may not able to interpret MPM, or G-RTS, G-CTS or G-ACK frames. The AP may initiate the MU-PCA sessions by transmitting a MU-PCA Management (MPM) frames $\mathbf{2002}_{AP}$, which may contain the options indicating that it is a combined DL/UL MU-PCA transmission announcement with channel assignments for each of the STAs in the MU-PCA group (STA1, STA3, and STA4).

In an example, the AP may conduct CCA on all available channels $\mathbf{218}_{1 \ldots 4}$ and transmit MPM frame $\mathbf{2002}_{AP}$ on all channels $\mathbf{218}_{1 \ldots 4}$. The MPM frames $\mathbf{2002}_{AP}$ may contain information in their MAC headers to set NAV on all channels for the entire MU-PCA session. In an example, the MPM may not contain NAV setting information; instead, the AP may access the medium on all channels $\mathbf{218}_{1 \ldots 4}$ using IFS 2010 that is sufficiently short such as SIFS or PIFS to allow the AP to maintain the access to the medium so that the AP may transmit (G-)RTS frames $\mathbf{2004}_{AP}$ frames on all channels $\mathbf{218}_{1 \ldots 4}$ to initiate the DL/UL MU-PCA session. In another example, the AP may conduct CCA only on the primary channel $\mathbf{218}_1$ and may transmit MPM frames $\mathbf{2002}_{AP}$ on the primary channel $\mathbf{218}_1$. The MPM frames $\mathbf{2002}_{AP}$ may announce the DL/UL MU-PCA session and subsequently, the AP may conduct CCA on all channels $\mathbf{218}_{1 \ldots 4}$ and, upon accessing all channels $\mathbf{218}_{1 \ldots 4}$, it may transmit (G-)RTS frames $\mathbf{2004}_{AP}$ on all channels $\mathbf{218}_{1 \ldots 4}$ to continue the DL/UL MU-PCA session.

With reference to FIG. 20, after obtaining access to all available channels $\mathbf{218}_{1 \ldots 4}$, the AP may send out RTS (or G-RTS) frames $\mathbf{2004}_{AP}$ on all channels, which may serve to accomplish any of the following: alert the group of STAs participating in the DL MU-PCA (STA1, STA3, STA4) that they may switch to their assigned channel to receive their DL packets from the AP; reserve all channels $\mathbf{218}_{1 \ldots 4}$ until all DL/UL MU-PCA packets have been ACKed by the STAs by setting NAV for all nodes operating on these channels, potentially using them as their own primary channel. If one of the channels is already occupied by some other STAs, then a (G-)RTS may not be sent on that channel and no STAs in the MU-PCA group may be assigned to that channel.

For legacy WiFi STAs which may not be able to interpret MPM or G-RTS frames, the AP may assign these STAs on the primary channel $\mathbf{218}_1$ or any contiguous or non-contiguous channels including the primary channel on which the legacy WiFi STAs that are capable of operating. If legacy WiFi STAs are involved in the MU-PCA sessions, the AP may transmit RTS frame $\mathbf{2004}_{AP}$ on all channels $\mathbf{218}_{1 \ldots 4}$ or at least may transmit RTS frame $\mathbf{2004}_{AP}$ on the channels that the legacy WiFi devices are assigned to after having sent the MPM frames $\mathbf{2002}_{AP}$ to all STAs first. In an example, if STA1 is a 802.11n STA with its primary channel being Channel 1, it may operate on 40 MHz bandwidth on both Channel 1 and Channel 2; the AP consequently may assign STA1 on Channel 1 and Channel 2 for a 40 MHz operation. The AP may assign other STAs that are able to interpret MPM or G-RTS on Channels 3 and 4. The AP may transmit RTS frames on Channel 1 and Channel 2 or on all channels to initiate the MU-PCA sessions. In another example, if STA1 is a 802.11ac STA with its primary channel being Channel 1 (80 MHz), and STA1 is capable of 80+80 non-contiguous operation, the AP may assign STA1 on Channel 1 and Channel 3 using 80+80 non-contiguous operation. The AP may then assign other STAs that are able to interpret MPM or G-RTS on Channel 2 and Channel 4. The AP may then transmit RTS frames on Channel 1 and Channel 3 or on all channels to initiate the MU-PCA sessions.

With reference to FIG. 20, the STAs in the MU-PCA group (STA1, STA3, and STA4) may switch to the channels assigned to them and switch to the correct operating mode, for example: STA1 is assigned to channel $\mathbf{218}_1$ so it may switch to channel $\mathbf{218}_1$ and it may operate using 1 MHz mode; STA3 is assigned to channels $\mathbf{218}_{2,3}$ so it may switch to channels $\mathbf{218}_{2,3}$ and operate using 2 MHz mode; and STA4 is assigned to channel $\mathbf{218}_4$ so it may switch to channel $\mathbf{218}_4$ and operate using 1 MHz mode.

The STAs may then transmit (G-)CTS $\mathbf{2006}_{STA1}$, $\mathbf{2006}_{STA3}$, $\mathbf{2006}_{STA4}$, which may accomplish any of the following: alert the AP of their readiness for receiving their DL packets $\mathbf{2008}_{AP}$; reserve the channel(s) until at least all DL/UL MU-PCA packets have been ACKed by the STAs ($\mathbf{2014}_{STA1}$, $\mathbf{2014}_{STA3}$, and $\mathbf{2014}_{STA4}$) by setting NAV for all nodes operating on these channels, potentially using them as their own primary channel. For example, the duration field of the (G-)CTS $\mathbf{2006}_{STA1}$, $\mathbf{2006}_{STA3}$, $\mathbf{2006}_{STA4}$ may be set to Duration_(G-)RTS-SIFS_Time-(G-)CTS_Time, where Duration_(G-)RTS may be the duration setting contained in the (G-)RTS frame $\mathbf{2004}_{AP}$, SIFS_Time may be the duration of the SIFS interval 2010 and (G-) CTS_Time is the transmission time of the (G-)CTS packet $\mathbf{2006}_{STA1}$, $\mathbf{2006}_{STA3}$, $\mathbf{2006}_{STA4}$. In an example, each STA in the MU-PCA group may transmit CTS frame $\mathbf{2006}_{STA1}$, $\mathbf{2006}_{STA3}$, $\mathbf{2006}_{STA4}$ if it receives an RTS frame $\mathbf{2004}_{AP}$ from the AP, or may transmit a G-CTS frame $\mathbf{2006}_{STA1}$, $\mathbf{2006}_{STA3}$, $\mathbf{2006}_{STA4}$ if it receives a G-RTS frame $\mathbf{2004}_{AP}$ from the AP.

Upon receiving the CTS or G-CTS $\mathbf{2006}_{STA1}$, $\mathbf{2006}_{STA3}$, $\mathbf{2006}_{STA4}$, the AP may transmit the data packets $\mathbf{2008}_{AP}$ to each STA on their assigned channel(s). Since the data packets $\mathbf{2008}_{AP}$ may be of different length and may be transmitted using different MCS, the longest packet may be chosen to transmitted on the primary channel $\mathbf{218}_1$ so that the entire BSS may rely on the timing of the primary channel $\mathbf{218}_1$ to stay synchronized for BSS-wide operations. Padding $\mathbf{2012}_{AP}$ may be used on any channel as needed to make the data packets of equal length in time so that the DL transmissions on all channels end at the same time. Once the STAs receive their respective data packets $\mathbf{2008}_{AP}$ and decode the data successfully, they may send out ACK (or BA or G-ACK) packets $\mathbf{2014}_{STA1}$, $\mathbf{2014}_{STA3}$, and $\mathbf{2014}_{STA4}$ on their respectively assigned channels to indicate the successful reception. In an example, the acknowledgement of the DL MU-PCA packets $\mathbf{2008}_{AP}$ may be omitted or delayed until the end of the MU-PCA sessions or until the AP requests an ACK or BA using a BAR frame.

If a STA has UL packets to transmit to the AP, it may set the More Fragment bit in the MAC Header of the ACK (BA or G-ACK) frame $\mathbf{2014}_{STA1}$, $\mathbf{2014}_{STA3}$, and $\mathbf{2014}_{STA4}$ to "1" or use any other method of indication. The duration field of the (G-)ACK $\mathbf{2014}_{STA1}$, $\mathbf{2014}_{STA3}$, and $\mathbf{2014}_{STA4}$ may be set equal to 3×SIFS_Time+Data_Duration+ (G-)CTS_Time+ (G-)ACK_Duration, where SIFS_Time is the duration of the SIFS interval 2010, ACK_Duration is the duration of an ACK frame $\mathbf{2014}_{STA1}$, $\mathbf{2014}_{STA3}$, $\mathbf{2014}_{STA4}$, Data_Duration is calculated by using the UL data packet ($\mathbf{2018}_{STA1}$, $\mathbf{2018}_{STA3}$, or $\mathbf{2018}_{STA4}$) length and the MCS used by the DL data packet $\mathbf{2008}_{AP}$, and the (G-)CTS_Time may be the same as the duration as the previous (G-)CTS $\mathbf{2006}_{STA1}$, $\mathbf{2006}_{STA3}$, or $\mathbf{2006}_{STA4}$, sent by the STA to the AP.

In an example where the ACK (or BA or G-ACK) frame is omitted or delayed, the AP may indicate by signaling Reverse Direction Grant (RDG) for the STA in the DL MU-PCA data frames that the STAs may start transmitting their UL packets, possibly with some delay, after the DL MU-PCA transmissions. Such RDG indication may be implemented, for example, by setting the RDG/More PPDU indictor in the MAC header or by any other indication method.

AP may transmit CTS or G-CTS frames $\mathbf{2016}_{AP}$ (where G_CTS may include channel assignments, which may be different than the DL channel assignment) to the STAs participating in the UL MU-PCA over their respectively assigned channels. The CTS frames $\mathbf{2016}_{AP}$ may serve to accomplish any of the following: align the start of all UL transmissions $\mathbf{2018}_{STA1}$, $\mathbf{2018}_{STA3}$, and $\mathbf{2018}_{STA4}$ from the STAs; and reserve the medium on all available channels $\mathbf{218}_{1 \ldots 4}$ by setting the duration field of the (G-)CTS frame $\mathbf{2016}_{AP}$ and therefore the NAV of all monitoring STAs on these channels till the end of the ACK frames $\mathbf{2020}_{AP}$ by the AP to all UL data packets $\mathbf{2018}_{STA1}$, $\mathbf{2018}_{STA3}$, and $\mathbf{2018}_{STA4}$. The duration field of the (G-)CTS frame $\mathbf{2016}_{AP}$ may be set to 2×SIFS_Time+Max_Data_Duration+ (G-)ACK_Duration, where SIFS_Time is the duration of the SIFS interval 2010, (G-)ACK_Duration is the duration of the ACK frame $\mathbf{2020}_{AP}$ and the Max_Data_Duration is the transmission of the longest data packet in time $\mathbf{2018}_{STA1}$ transmitted on all available channels, which is obtained from the duration field of the (G-)ACK frames $\mathbf{2014}_{STA1}$, $\mathbf{2014}_{STA3}$, and $\mathbf{2014}_{STA4}$. In an example where the AP may indicate RDG in the DL MU-PCA data frame, the AP may choose not to transmit CTS or G-CTS. The STAs in the UL MU-PCA STAs may initiate UL MU-PCA transmissions if they have UL frames to transmit immediately or after some IFS delay starting at the end of the DL MU-PCA frames on their assigned channels. All STAs in the UL MU-PCA group transmit uplink packets to the AP on their assigned channel(s).

With reference to FIG. 20, the AP may wait for an additional SIFS interval 2010 after the end of the longest UL data packet in time $\mathbf{2018}_{STA1}$ and it may transmit ACK frames $\mathbf{2020}_{AP}$ to alert the reception of the UL packets $\mathbf{2018}_{STA1}$, $\mathbf{2018}_{STA3}$, and $\mathbf{2018}_{STA4}$. In an example, a jointly-encoded ACK is transmitted across all channels $\mathbf{218}_{1 \ldots 4}$ or just on the primary channel(s) $\mathbf{218}_1$. The ACK frames $\mathbf{2020}_{AP}$ may also be implemented as BA or multi-user ACKs all channels $\mathbf{218}_{1 \ldots 4}$ or just on the primary channel(s) $\mathbf{218}_1$, or the AP may transmit the BAs if the STAs request them using a BAR.

In an example, the UL MU-PCA portion of the combined DL/UL or combined UL/DL MU-PCA transmission may also be of mixed delay requirements as described above similarly for the standalone UL MU-PCA transmission if one or more STAs in the UL MU-PCA group do not have any UL packets to transmit. Similar to what was described for Standalone DL and Standalone UL MU-PCA sessions above, the acknowledgement may be implemented by ACK, BA or multi-user ACKs. The AP and the STAs may individually request acknowledgement by sending BARs and may receive BA as a response. The AP may also transmit multi-user ACKs to a group of STAs to acknowledge UL MU-PCA data frames.

In case one or more data packet transmission fails in the DL standalone, UL standalone or combined UL/DL MU-PCA schemes, the data packets that failed may need to be retransmitted. Different possible retransmission methods may be used. In one example, the DL or UL packets may be maintained at the top of the transmit buffer and may be retransmitted at the very next transmit opportunity either in a one-to-one unicast transmission or in subsequent DL, UL or combined DL/UL MU-PCA transmissions. Depending on the length of the packet, the long or short retransmission timer may be increased each time a packet is retransmitted. The packet may be discarded if the retransmission timer reaches the threshold value. In another example, the medium may be reserved sufficiently long by setting the duration field of the G-RTS, G-CTS, G-Poll and or G-ACK so that there is sufficient time for retransmission of the DL or UL MU-PCA packets on the allocated bandwidth. The NAV setting may be cancelled by the reception of the ACK packets transmitted to signal the reception of the DL, UL MU-PCA packets.

The STAs and APs in a BSS may indicate their capabilities and preferences for MU-PCA prior to MU-PCA transmissions and receptions. For example, the AP may include in its beacon, Probe Response or any other type of frame, an indicator that the AP is capable of MU-PCA. Such indicator may also be implemented as several indicators for capabilities such as, for example, one indicator may be used for capability for UL MU-PCA and/or another indicator may be used for capability for DL MU-PCA. In another example, there may be four indicators: DL MU-PCA Capable, UL MU-PCA Capable, DL SU-PCA Capable, or UL MU-PCA Capable. The MU-PCA capability indicator(s) may be included in any existing or new field such as an IE in any management or control frame or any other type of frame or in MAC or PLCP headers.

Similarly, the STA may indicate its capability for MU-PCA as well using one or more indicators for UL and DL MU-PCA, or UL and or SU-PCA, in, for example, Probe Request, Association Request, or other management or control frames or any type of frames or in MAC or PLCP headers. The AP and the STAs may indicate their MU-PCA preference. The MU-PCA capability indicator(s) may be included in any existing or new field such as in an IE in a management, control or other type of frame.

The AP MU-PCA preference (DL and/or UL) may include any of the following items. The AP MU-PCA preference may include MU-PCA channels related information including, for example, a number of channels available for MU-PCA or a location of MU-PCA channels. The location information may be location of primary channel, for example, identified by any of the following parameters: frequency band, channel numbers, center frequency, and/or bandwidth, among other parameters. The location information may be location of MU-PCA non-primary channels, for example, identified by any of the following parameters: frequency band, channel numbers, offset compared to the primary channel or a reference channel or frequency, center frequencies, and/or bandwidth, among other parameters.

The AP MU-PCA preference may also include MU-PCA options. For example, in a MU-PCA transmission, a STA may be assigned to transmit or receive on one or more channels, or even the entire bandwidth. In this case, examples of SU-PCA options may include any of the following: PHY layer aggregation only, MAC layer aggregation only, mixed PHY/MAC layer aggregation, contiguous aggregation only, and/or non-contiguous aggregation capable. For the option of PHY Layer aggregation only, the AP may only transmit/receive one MAC frame (including, for example, A-MPDU, or A-MSDU) to/from a STA within a MU-PCA transmission modulated on one or more contiguous or non-contiguous channels. For the option of MAC Layer aggregation only, the AP may transmit/receive multiple MAC frames (including, for example, A-MPDUs, or A-MSDUs) to/from a STA within a MU-PCA transmission with each MAC frame modulated on one channel. For the option of Mixed PHY/MAC Layer aggregation, the AP may only transmit/receive one or more MAC frames (including, for example, A-MPDUs, or A-MSDUs) to/from a STA within a MU-PCA transmission with each MAC frame modulated on one or more contiguous or non-contiguous channels. For the option of contiguous aggregation only, the AP may allow only aggregations of contiguous channels in MU-PCA transmissions. For the option of non-contiguous aggregation capable, the AP may allow aggregation of non-contiguous channels as well as contiguous channels.

The AP MU-PCA preference may also include the maximum size of MU-PCA group, which may indicate the maximum number of STAs that can belong to a MU-PCA group, or in other words, the maximum number of STAs that can participate in MU-PCA at a given time.

The STA MU-PCA preference (DL and/or UL) may include any of the following items. The STA MU-PCA preference (DL and/or UL) may include MU-PCA channels related information and MU-PCA options. MU-PCA channels related information may include, for example, any of the following information: a maximal number of channels available for MU-PCA; bandwidth for each MU-PCA channels; whether bandwidth for MU-PCA channels is dynamic or static; and/or preferred DL/UL MU-PCA channel(s). For the preferred DL/UL MU-PCA channel(s) information, the preference of the DL/UL MU-PCA channels may be based on, for example, the hardware implementation, capability, detected interference and/or noise levels, etc. Accordingly, the location of preferred DL/UL MU-PCA channels may be identified in the information, for example, using any of the following parameters: frequency band, channel numbers, offset compared to the primary channel or a reference channel, frequency, center frequencies, and/or bandwidth, among other parameters.

MU-PCA options may include, for example, any of the following options: SU-PCA capable and SU-PCA options. SU-PCA capable may indicate whether the STA is capable of conducting SU-PCA. For SU-PCA options, in a MU-PCA transmission, a STA may be assigned to transmit or receive on one or more channels, or even the entire bandwidth. The SU-PCA options may include, for example, any of the following options: PHY Layer aggregation only; MAC layer aggregation only; Mixed PHY/MAC layer aggregation; contiguous aggregation only; non-contiguous aggregation capable.

For the PHY Layer aggregation only option, the STA may only transmit/receive one MAC frame (including A-MPDU, or A-MSDU) to/from another STA within a MU-PCA transmission modulated on one or more contiguous or non-contiguous channels. For the MAC Layer aggregation only option, the STA may transmit/receive multiple MAC frames (including, for example, A-MPDUs, or A-MSDUs) to/from another STA within a MU-PCA transmission with each MAC frame modulated on one channel. For the mixed PHY/MAC Layer aggregation option, the STA may only transmit/receive one or more MAC frames (including, for example, A-MPDUs, or A-MSDUs) to/from another STA within a MU-PCA transmission with each MAC frame modulated on one or more contiguous or non-contiguous channels. For the contiguous aggregation only option, the STA may only be capable of aggregations of contiguous channels in MU-PCA transmissions. For the non-contiguous aggregation capable option, the STA may be capable of aggregation of non-contiguous channels as well as contiguous channels. In addition, the AP or the STAs may indicate change of MU-PCA capability and/or preferences at any time using new or existing management, control or other types of frames.

A WLAN PHY layer transceiver may support single user transmission over the whole frequency band, or MU-MIMO transmission while each user occupies the whole frequency band, and may use space division multiple access (SDMA) to distinguish users. The PHY layer transceiver schemes discussed below support multiple users while each user partially occupies the frequency band. In the following, the transmitter and receiver are assumed to have symmetrical bandwidth. Based on the nature of frequency location of the aggregated channels, the following are examples of a few types of channel aggregation: contiguous channel aggregation, where aggregated channels may be contiguous in frequency domain; non-contiguous channel aggregation, where aggregated channels may not be non-contiguous in frequency domain; and hybrid channel aggregation, where some of the aggregated channels may be contiguous, and others may be non-contiguous. In the following, PHY layer methods are described, which may be utilized in any of the examples of channel aggregation. The PHY layer methods may be used in conjunction with any of the MAC solutions presented described above. In order to avoid potential contentions, G-CTSs may be sent by STAs on their respective channels to reserve transmission channels. Other STAs that want to operate on the same channel may listen to all packets to determine if the channel is available. On receiving G-RTS and G-CTS, STAs may set their NAV and have virtual carrier sense (VCS), described in detail below.

The IFFT and/or fast Fourier transform (FFT) size for each user may be determined by the smallest bandwidth defined, or configured, for use. For example, if 1 MHz is the smallest operational bandwidth of a system, then the IFFT/FFT size may be fixed to 32 corresponding to a bandwidth of 1 MHz. For other systems, the same rule may be applied. In another example, the IFFT/FFT size may be different depending on the sub-carrier size, or other system design considerations such as the guard period size. An AP and/or STA may also choose to operate on wider bandwidth if several contiguous channels are assigned to one user. When wider bandwidth is utilized, the system may have higher spectral efficiency than a system where several channels are used separately. In this scenario, the STA may be capable of aggregating with contiguous channels and transmit with larger bandwidth. The STA may support different capabilities. The modification of STA behavior based on the associated capabilities of the STA is described in detail below. The following are examples of STA behavior that may be dependent on STA capabilities.

In one example, a STA may be capable of channel aggregation. If the STA has capability for channel aggregation and needs more data from the AP, it may pre-negotiate with the AP. Then the AP may send G-RTS requesting the STA to send G-CTS on multiple channels. If the aggregated channels assigned to the STA are non-contiguous, a segment parser may be utilized to split the data from the MAC layer into different frequency channels. Transmitting and receiving on each channel may be performed by the STA using procedures that are separately defined for each frequency channel. Depending on the different channel quality, receive signal-to-noise ration (SNR), and/or transmitter/receiver capability, both equal MCS and/or unequal MCS may be applied for aggregated channels. For equal MCS, an AP or STA may perform encoding and modulation on the data passed from the MAC layer, and then split them by segment parser to different aggregated channels. In another example, the AP or STA may conduct segment parsing before encoding and modulation. For unequal MCS, each aggregated channel may have its own MCS.

Based on different MCS levels, and AP or STA may split the bits from the MAC layer into different channels using a segment parser, and may perform separate encoding and modulation schemes. For example if channel 1 is able to handle 16 quadrature amplitude modulation (QAM) at ½ code rate and channel 2 is able to handle quadrature phase shift keying (QPSK) at rate 1/2 to guarantee, for example, a 10% Frame Error Rate (FER) at the receiver, then the segment parser may split twice as many bits for channel 1 than for channel 2. In another example, the same data may be sent on both frequency bands (i.e. channels) to better exploit frequency diversity.

Figure 21:
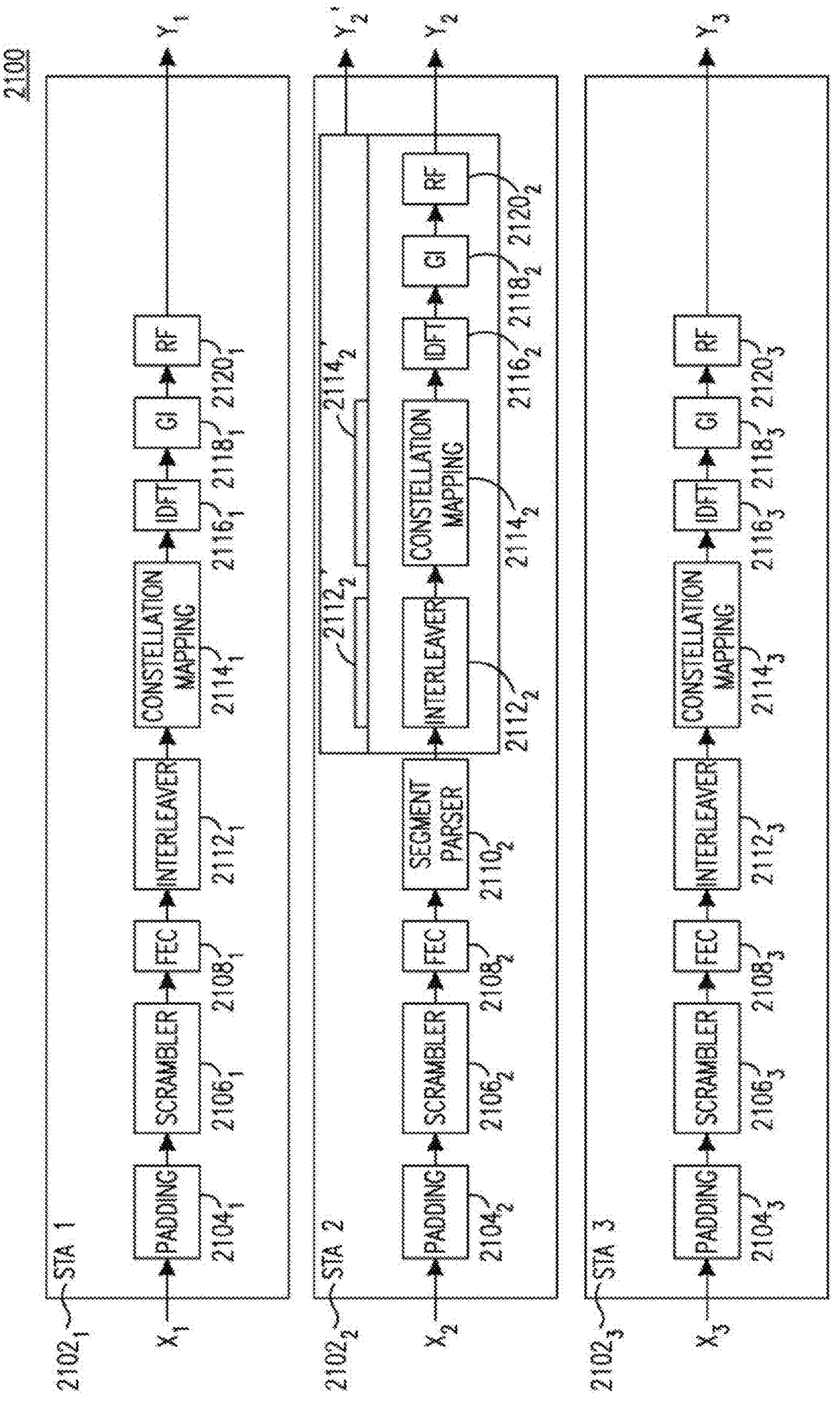
FIG. 21 shows an example transmission flow diagram with a user capable of channel aggregation.

FIG. 21 shows an example transmission flow diagram 2100 with a STA capable of channel aggregation. In FIG. 21, it is assumed that equal MCS or unequal MCS may be applied. In this example, three MU-PCA STAs $\mathbf{2102}_{1,2,3}$ are supported simultaneously at the AP side, where it is assumed that STA2 $\mathbf{2102}_2$ occupies two channels, channels 2 and 3, that are non-contiguously aggregated, and is capable of channel aggregation. Each MU-PCA STA $\mathbf{2102}_{1,2,3}$ may receive data $x_1$, $x_2$, and $x_3$ (respectively) as input and may apply padding $\mathbf{2104}_{1,2,3}$ as needed to the data. Each cSTA $\mathbf{2102}_{1,2,3}$ may apply scrambling $\mathbf{2106}_{1,2,3}$, forward error correction (FEC) $\mathbf{2108}_{1,2,3}$, and interleaving $\mathbf{2110}_{1,2,3}$ to their respective input streams. STA1 and STA3 $\mathbf{2102}_{1,3}$, which don't perform channel aggregation, may each apply constellation mapping $\mathbf{2313}_{2,3}$, inverse discrete Fourier transform (IDFT) $\mathbf{2116}_{1,3}$, guard interval (GI) $\mathbf{2118}_{1,3}$, and radio frequency frontend (RF) $\mathbf{2120}_{1,3}$, respectively, to produce channels $y_1$ and $y_3$.

STA2 $\mathbf{2102}_2$ may use segment parser $\mathbf{2110}_2$ to generate two channels in parallel, and may apply two interleavers $\mathbf{2112}_2$ and $\mathbf{2112}_2'$, two constellation mappers $\mathbf{2114}_2$ and $\mathbf{2114}_2'$, two IDFTs $\mathbf{2116}_2$ and $\mathbf{2116}_2'$, two GIs $\mathbf{2118}_2$ and $\mathbf{2118}_2'$, and two RF frontends $\mathbf{2120}_2$ and $\mathbf{2120}_2'$, to generate two channels $y_2$ and $y_{2'}$.

In FIG. 21, for STA2 $\mathbf{2102}_2$, a segment parser $\mathbf{2110}_2$ may be used after FEC coding $\mathbf{2108}_2$ but before interleaver $\mathbf{2112}_2$. In another example, segment parser $\mathbf{2110}_2$ may follow a single interleaver $\mathbf{2112}_2$ so that it may achieve better frequency diversity. In another example, the segment parser $\mathbf{2110}_2$ may be placed before FEC encoder $\mathbf{2108}_2$, where there may be an FEC encoder for each segment and a separate coding rate and/or coding scheme may be performed on each segment.

Figure 22:
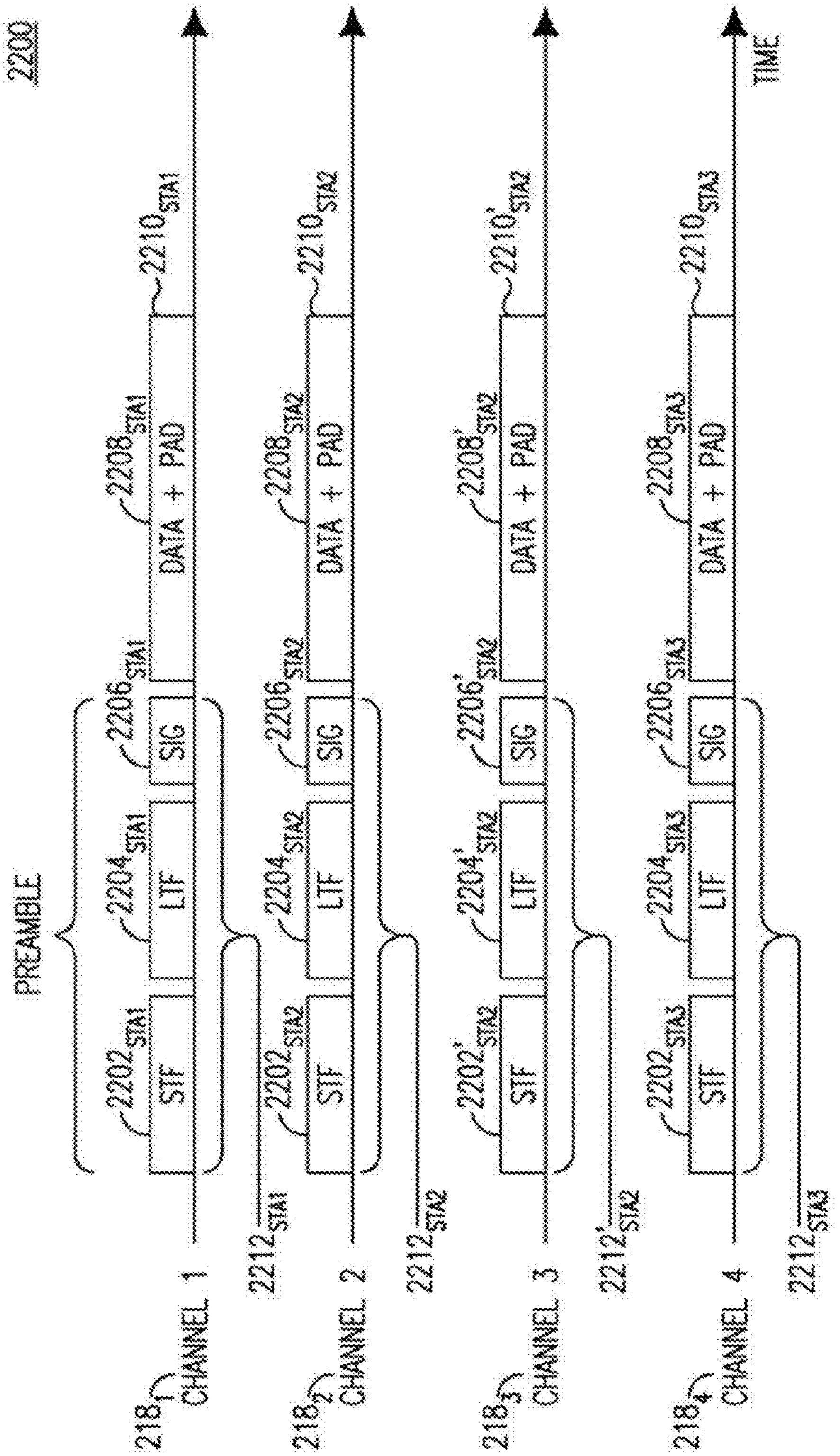
FIG. 22 shows an example physical (PHY) layer scheme with physical layer convergence protocol (PLCP) headers transmitted on separate frequency channels.

FIG. 22 shows an example PHY layer scheme 2200 with PLCP headers are transmitted on separate frequency channels. In this example, STA2 (for example, from FIG. 21) is assigned to channels $\mathbf{218}_{2,3}$ and may use data aggregation, STA1 is assigned to channel $\mathbf{218}_1$ and STA3 is assigned to channel $\mathbf{218}_4$. PLCP protocol data units (PPDUs) $\mathbf{2210}_{STA1}$, $\mathbf{2210}_{STA2}$, $\mathbf{2210}_{STA2}'$ and $\mathbf{2210}_{STA3}$ may be transmitted on their respective channels $\mathbf{218}_{1,2,3,4}$. Each PPDU, for example PPDU $\mathbf{2210}_{STA1}$, may include a preamble portion $\mathbf{2212}_{STA1}$ and a data portion $\mathbf{2208}_{STA1}$, where the preamble portion $\mathbf{2212}_{STA1}$ may include a short training field (STF) $\mathbf{2202}_{STA1}$, a long training field (LTF) $\mathbf{2204}_{STA1}$, and a signal (SIG) field $\mathbf{2206}_{STA1}$. Channels $\mathbf{218}_{2,3}$ may have separate PPDUs $\mathbf{2210}_{STA2}$ and $\mathbf{2210}_{STA2}$' even though they are both used by STA2. The SIG fields $\mathbf{2206}_{STA2}$ and $\mathbf{2206}_{STA2}$' for STA2 in this example may contain the same information, which may be repeated with or without phase rotation, on channels $\mathbf{218}_{2,3}$. With unequal MCS, all MCS may be indicated in the SIG field $\mathbf{2206}_{STA1}$, $\mathbf{2206}_{STA2}$, $\mathbf{2206}_{STA2}$', and $\mathbf{2206}_{STA3}$, and mapping between MCS levels and frequency channels may also be signaled in SIG fields $\mathbf{2206}_{STA1}$, $\mathbf{2206}_{STA2}$, $\mathbf{2206}_{STA2}$', and $\mathbf{2206}_{STA3}$. A separate SIG fields $\mathbf{2206}_{STA2}$ and $\mathbf{2206}_{STA2}$' may be encoded on each channel $\mathbf{218}_{2,3}$ for STA2.

With unequal MCS, each channel $\mathbf{218}_{1\ldots4}$ May be assigned a separate MCS. Therefore, the two SIG fields $\mathbf{2206}_{STA2}$ and $\mathbf{2206}_{STA2}$' transmitted on channels $\mathbf{218}_{2,3}$ may be different. In another example, the SIG field $\mathbf{2206}_{STA2}$ for STA2 may be divided into a common SIG field, and individual SIG fields. The common SIG field may contain common information for the transmission, and may be transmitted in the SIG fields $\mathbf{2206}_{STA2}$ and $\mathbf{2206}_{STA2}$' over the channels $\mathbf{218}_{2,3}$. The individual SIG field may contain the information for one frequency channel/band, for example, the MCS and length field for the channel/band. The individual SIG field may be transmitted in $\mathbf{2206}_{STA2}$ or $\mathbf{2206}_{STA2}$' on its assigned channel $\mathbf{218}_{2,3}$, respectively.

Depending on the operation WLAN system, the preamble format $\mathbf{2212}_{STA1}$, $\mathbf{2212}_{STA2}$, $\mathbf{2212}_{STA2}$', and $\mathbf{2212}_{STA3}$ may be different. For example, a longer preamble, including (very) high throughput preamble or directional preamble for beamforming or MU-MIMO transmission, may be applied. If the aggregated channels assigned to a STA are contiguous, the STA or AP may utilize the same transmission scheme as with non-contiguous aggregation, or operate with wider bandwidth.

Figure 23:
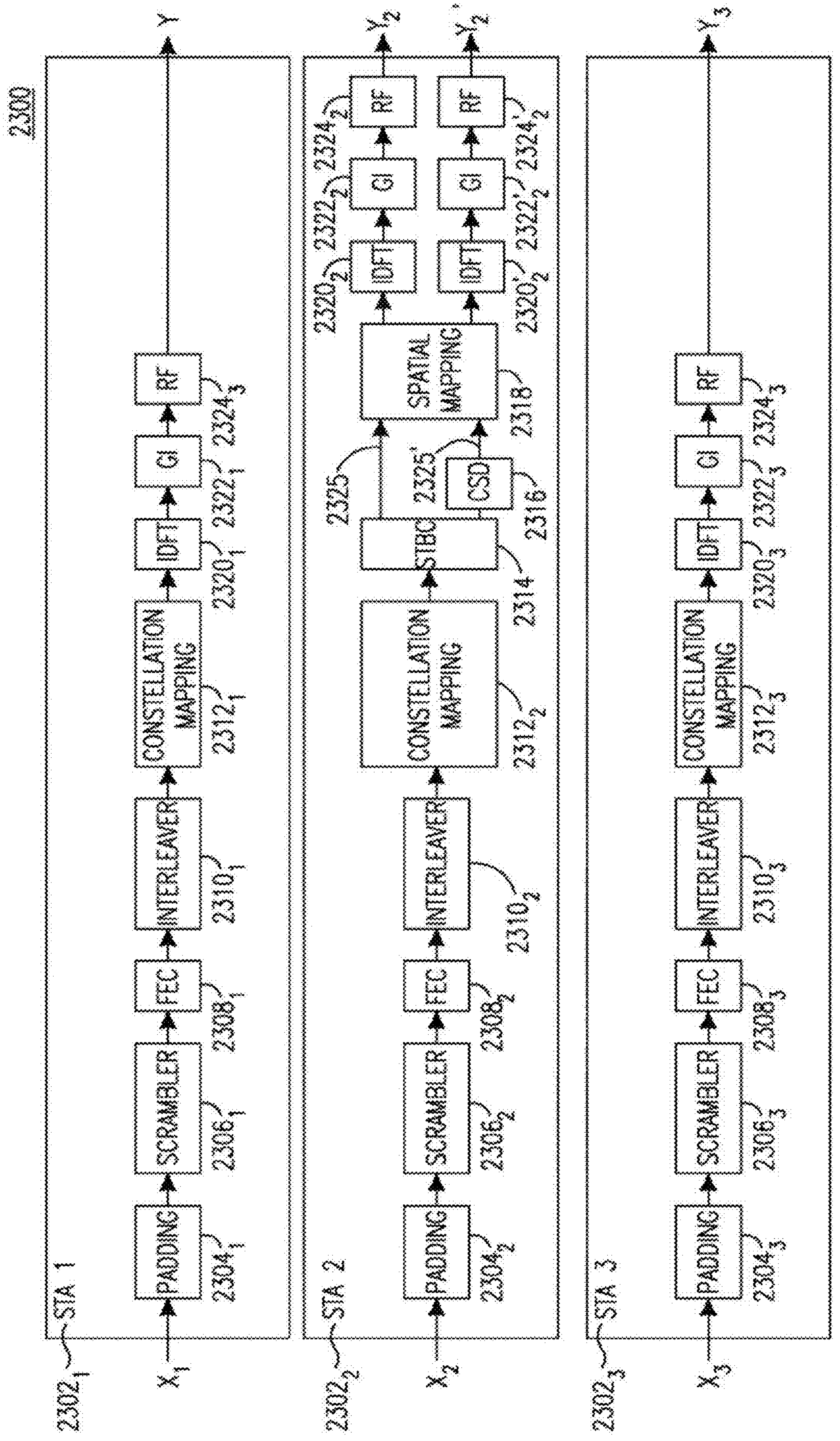
FIG. 23 shows an example of DL transmission flow diagram at an AP over hybrid aggregated channels.
Figure 24:
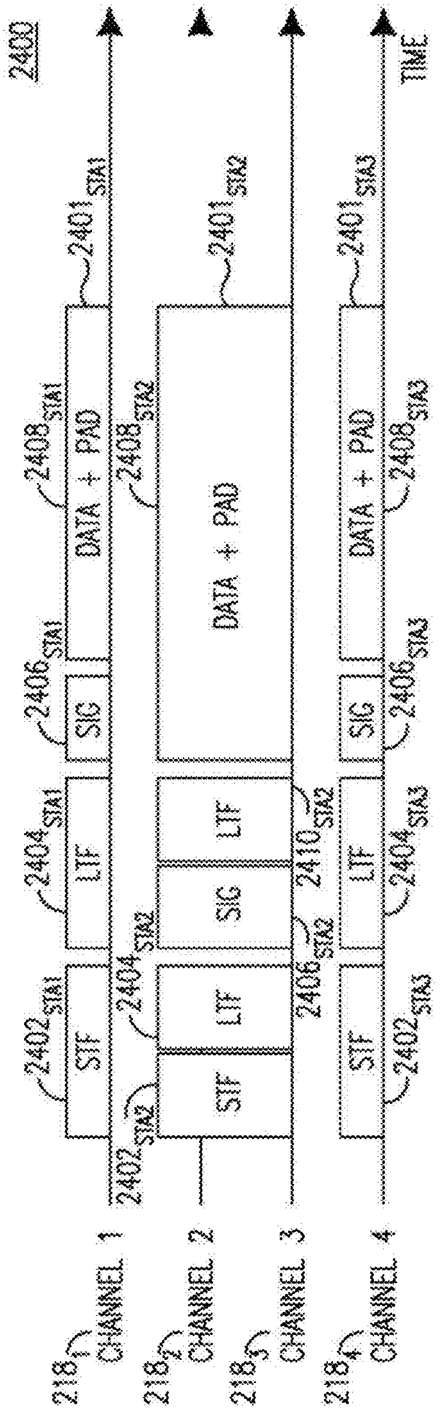
FIG. 24 shows an example flow of PLCP protocol data unit (PPDU) transmissions over channels including hybrid aggregated channels.
Figure 25:
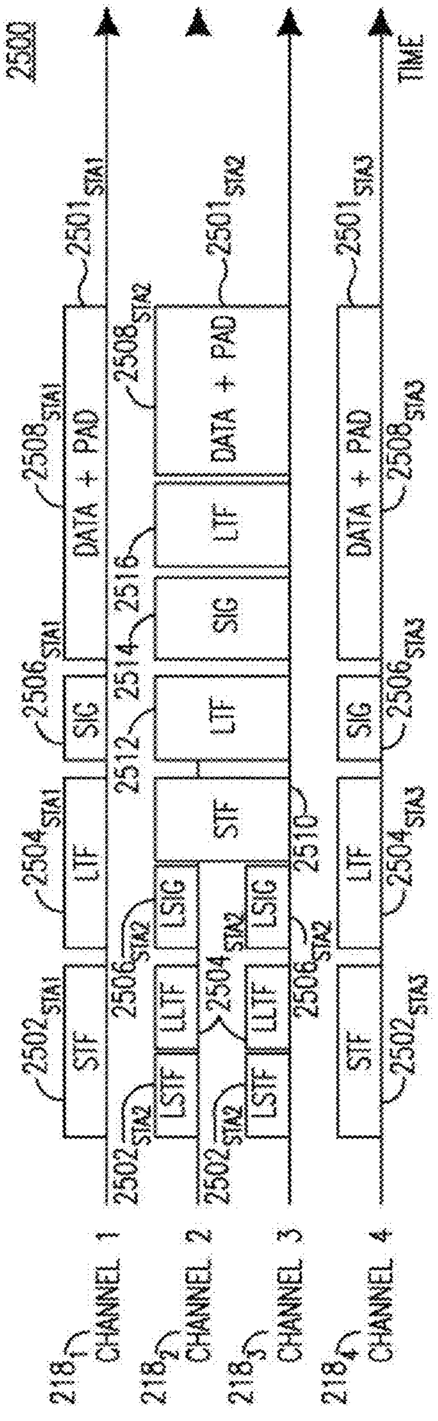
FIG. 25 shows another example flow of PPDU transmissions over channels including hybrid aggregated channels.

FIG. 23 shows an example of DL transmission flow diagram 2300 at an AP over hybrid aggregated channels. In the examples of FIGS. 23, 24 and 25, it is assumed channels 1 and 4 are non-contiguous, while channels 2 and 3 are adjacent or contiguous. Three MU-PCA STAs $\mathbf{2302}_{1,2,3}$ may transmit simultaneously. PPDUs for MU-PCA STAs $\mathbf{2302}_{1,3}$ may be transmitted on channels 1 and 4 respectively, while STA $\mathbf{2302}_2$ may be capable of channel aggregation and assigned to two contiguous channels, channels 2 and 3, hence transmitting on a larger bandwidth.

Each MU-PCA STA $\mathbf{2302}_{1,2,3}$ may receive data $x_1$, $x_2$, and $x_3$ (respectively) as input and may apply padding $\mathbf{2304}_{1,2,3}$ as needed to the data. Each MU-PCA STA $\mathbf{2302}_{1,2,3}$ may apply scrambling $\mathbf{2306}_{1,2,3}$, FEC $\mathbf{2308}_{1,2,3}$, interleaving $\mathbf{2310}_{1,2,3}$, and constellation mapping $\mathbf{2312}_{2,3}$ to their respective input streams. MU-PCA STAs $\mathbf{2302}_{1,3}$, which don't perform channel aggregation, may each apply IDFT $\mathbf{2320}_{1,3}$, GI $\mathbf{2322}_{1,3}$, and RF $\mathbf{2324}_{1,3}$, respectively, to produce signals $y_1$ and $y_3$. Because STA2 $\mathbf{2302}_2$ may use channel aggregation, STA2 $\mathbf{2302}_2$ may apply two IDFTs $\mathbf{2320}_2$ and $\mathbf{2320}_2$', two GIs $\mathbf{2322}_2$ and $\mathbf{2322}_2$', and two RF frontends $\mathbf{2324}_2$ and $\mathbf{2324}_2$', to generate two signals $y_2$ and $y_2$'.

For STA2 $\mathbf{2302}_2$, padding bits 23042 may be added to the input stream $x_2$, and then pass to the scrambler 23062. The scrambled bits are forwarded to the FEC 23082 for FEC coding. An interleaver $\mathbf{2310}_{STA2}$ may be applied and the interleaved bits may be passed to the constellation mapping $\mathbf{2312}_{STA2}$. The constellation symbols generated may be passed to a space time coding block (STBC) 2314. In an example, the constellation symbols may be passed directly to spatial mapping unit 2318 without the STBC 2314. STBC 2314 may be specified in the TXVECTOR passed from MAC layer to PHY layer and this information may be transmitted in a SIG field. After the STBC block 2314, one symbol stream may become two symbol streams 2325 and 2325'. The first symbol stream 2325 may be passed as it is to the spatial mapping unit 2318, and the second symbol stream 2325' may be applied with a cyclic shift diversity (CSD) scheme 2316. A spatial mapping unit 2318 may be applied on the two symbol streams 2325 and 2325'. The spatial mapping unit 2318 may be, for example, a spatial domain precoding scheme. Then general IDFT $\mathbf{2320}_2$ and $\mathbf{2320}_2$', GI blocks $\mathbf{2322}_2$ and $\mathbf{2322}_2$', and RF frontend $\mathbf{2324}_2$' are followed for each symbol stream.

The IDFT $\mathbf{2320}_2$ and $\mathbf{2320}_2$' sizes utilized by STA $\mathbf{2302}_2$ in this example may be two times larger than the size of the IDFTs $\mathbf{2320}_{1,3}$ of MU-PCA STAs $\mathbf{2302}_{1,3}$. Additionally, different transmission schemes may be applied to STA $\mathbf{2302}_2$. For example, any of the following transmission techniques may or may not be used: space-time block coding (STBC) 2314, beamforming (not shown), or other MIMO schemes not shown may be utilized. Cyclic Shift Diversity (CSD) 2316 may be used to apply progressive phase or time shifts to each spatial stream, which may increase the frequency diversity of the channel for MU-PCA. Spatial mapping unit 2318 may be used to map the coded information to separate spatial streams. Moreover, both equal MCS and unequal MCS schemes may be applied. With unequal MCS, an extra segment parser may be applied to split the MAC packet. There are many possible ways to split the packet. For example, a packet may be split into two parts, where each part is corresponding to a different channel (e.g. channels 2 and 3).

In another example, the packet may be split into more than two parts and each part may correspond to predefined sub-channels or sub resource blocks, where resource block may refer to a group of subcarriers. A resource block may be smaller than or equal to a sub-channel. Different MCS levels may be applied to different parts, such that the MCS levels may be signaled in the SIG field. A SIG field may include all the MCS levels for a user. The mapping between MCS levels and channels/resource blocks may also be given in the SIG field. The SIG field may be repeated over all the channels or the SIG field may be divided into a common SIG field, and an individual SIG fields. The common SIG field may contain common information for the transmission, and may be transmitted over all available channels. The individual SIG field may contain the information for one frequency channel/band, for example, the MCS and length field for the channel/band. The individual SIG field may be transmitted on the channel/band to which it is assigned.

When a STA aggregates multiple channels (contiguous or non-contiguous), it may interleave, with a single interleaver, over all channels, and also use unequal MCS. One way to accomplish this is as follows. Let $N_{BITS}$ be the total number of bits to be transmitted in one aggregated orthogonal frequency division multiplexing (OFDM) symbol. $N_{BITS}$ may depend on the desired constellation in each band denoted by a number of bits per constellation Symbol $N_{BPS,i}$ and a number of data carriers ($N_{D,i}$) in each band i as follows:

$$N_{BITS} = \sum_i N_{D,i} N_{BPS,i} \quad \text{Equation 1}$$

For example, in 802.11 a 40 MHz channel has $N_{D,1}$=108 whereas a 20 MHz channel has $N_{D,2}$=52. If one 40 MHz and one 20 MHz channel were to be aggregated, with the 40 MHz mode being used with 64 QAM ($N_{BPS,1}$=6 and $N_{D,1}$=108) and the 20 MHz mode with 16QAM ($N_{BPS,2}$=4 and $N_{D,2}$=52), then $N_{BITS}$=108×6+52×4=856. Then, the number of columns ($N_{COL}$) may be set for the interleaver based on $N_{BITS}$. $N_{COL}$ may be a factor of $N_{BITS}$. Continuing the example above, $N_{COL}$ may be 8 or 107, where 856=8×107. $N_{COL}$ may be derived from simulation results for the particular channel model. The number of rows in the interleaver may be defined as $N_{ROW}=N_{BITS}/N_{COL}$. The index of the coded bit before the first permutation may be denoted by k; i may be the index after the first and before the second permutation; and j may be the index after the second permutation, just prior to modulation mapping. Accordingly, the first permutation of the interleaver may be defined as:

$$i = N_{ROW}(k \bmod N_{COL}) + \mathrm{floor}(k/N_{COL}) \quad k = 0, 1, \ldots , N_{BITS} - 1 \qquad \text{Equation 2}$$

The second permutation may be carried out on each band separately, depending on the MCS being used in that band. Assume $N_{TOT,i}=N_{D,i}N_{BPS,i}$ denotes the number of total bits in each band per OFDM symbol. Then:

$$s_i = \max\left(\frac{N_{BPS,i}}{2}, 1\right) \qquad \text{Equation 3}$$

and $$j = s_i \cdot \mathrm{floor}(k/s_i) + \left(k + N_{TOT,i} - \mathrm{floor}\left(N_{COL}, \frac{k}{N_{TOT,i}}\right)\right) \bmod s_i \qquad \text{Equation 4}$$

$$k = 0, 1, N_{TOT,i} - 1$$

When there are multiple spatial stream, the interleaver described above maybe used on each spatial stream, and an additional rotation may be applied between different spatial streams. A deinterleaver may reverse the above permutations on each band and spatial stream, if present.

FIG. 24 shows an example flow 2400 of PPDU transmissions over channels including hybrid aggregated channels. Assuming STA1, STA2, and STA3 from FIG. 23 are transmitting PPDUs 2401$_{STA1}$, 2401$_{STA2}$, and 2401$_{STA3}$, PPDUs 2401$_{STA1}$ and 2401$_{STA3}$ for STA1 and STA 3 may be transmitted on channels 218$_1$ and 218$_4$ respectively, while STA2 may be capable of channel aggregation and assigned to two contiguous channels 218$_{12}$, hence transmitting on a larger bandwidth. PPDUs 2401$_{STA1}$ and 2401$_{STA3}$ may include, respectively: STF 2402$_{STA1}$ and 2402$_{STA3}$, LTF 2404$_{STA1}$ and 2404$_{STA3}$, SIG 2406$_{STA1}$ and 2406$_{STA3}$ and data (plus padding) 2408$_{STA1}$ and 2408$_{STA3}$. STF may be used for starting of packet detection, and coarse time and frequency offset correction, among other things. LTF may be used for fine time and frequency offset correction, and channel estimation, among other things. SIG field may carry the PHY layer header.

PPDU 2401$_{STA2}$, which includes aggregated data transmitted over two channels 218$_{2,3}$, may include: STF 2402$_{STA2}$, LTF 2404$_{STA2}$ and LTF 2410$_{STA2}$, SIG 2406$_{STA2}$ and data (plus padding) 2408$_{STA2}$. PPDU 2401$_{STA2}$ may have two LTFs 2404$_{STA2}$ and 2410$_{STA2}$, where the second LTF 2410$_{STA2}$ may be ysed for channel estimation if two data streams are transmitted to STA2.

Comparing to PPDUs 2401$_{STA1}$ and 2401$_{STA3}$ for STA1 and STA3, which are transmitted with normal bandwidth, in the PPDU 2401$_{STA2}$ for STA2, both the PLCP header including STF 2402$_{STA2}$, LTF 2404$_{STA2}$, SIG field 2406$_{STA2}$, and data 2408$_{STA2}$ for STA2 are transmitted with wider bandwidth. Transmissions shown in this example flow 2400 may be protected by GRTS/GCTS protocol. Therefore unintended STAs in the same BSS or overlapping BSS (OBSS) may not need to understand the MU-PCA transmission. In the example of FIG. 24, unintended STAs may not understand the preamble transmitted on channel 218$_{2,3}$ if they are not capable to operate on a wider bandwidth. The unintended STAs may detect GRTS/GCTS sequence transmitted before the data session, and set NAV accordingly. However, it is also possible to provide extra protection at the PHY layer by changing PLCP header format.

FIG. 25 shows another example flow 2500 of PPDU transmissions over channels including hybrid aggregated channels. The transmission scheme over the channels 218$_{1 \ldots 4}$ is the same as in FIG. 24 (PPDU 2501$_{STA1}$ is the same as PPDU 2401$_{STA1}$, PPDU 2501$_{STA2}$ is the same as PPDU 4501$_{STA2}$, and PPDU 2501$_{STA13}$ is the same as PPDU 2401$_{STA3}$) except for the legacy PLCP header information for STA2 that may be transmitted separately on channels 218$_{2,3}$. The legacy PLCP header information includes: legacy STF (LSTF) 2502$_{STA2}$, legacy LTF (LLTF) 2504$_{STA2}$ and legacy SIG (LSIG) 2506$_{STA2}$. Therefore, FIG. 25 shows an example variation of PLCP header format to FIG. 24, which may be detectable by non MU-PCA users and other OBSS users since one set of STF, LTF and SIG field is transmitted repeatedly on channel 2 and channel 3.

The above examples described in FIGS. 23-25 show a solution to communicate with STA2/User 2 with wider bandwidth. System spectral efficiency may be higher when using wider bandwidth, therefore a scheduler may be aware of whether channel aggregation is done contiguously or not, and may try to assign users with heavy traffic load to the contiguously aggregated channels. In another example, STA2/User 2 may communicate with the normal single channel bandwidth but occupy two normal channels. The IFFT/IDFT size for STA2/User 2 may be the same as that for STA1 and STA3. In this case, a segment parser may be utilized to split the traffic to two parts (similar to the examples of FIGS. 21 and 22). Depending on the channel quality and STA feedback capability, both equal MCS and unequal MCS may be applied. This solution may be less efficient than the STA2/User 2 operating with wider bandwidth), but may be easier to implement.

In one example, a STA may be capable of MIMO. MIMO scheme may be used for MU-PCA transmissions. MIMO transmission may include, but is not limited to, space division multiplexing (SDM), STBC, beamforming, CDD, or MU-MIMO. MIMO transmission may depend on the number of available antennas at the transmitter and receiver sides. For example, a MIMO system with M transmit antennas and N receive antennas may support up to min(M, N) spatial data streams either for single users MIMO (SU-MIMO) or MU-MIMO. In existing WiFi specifications and standards, AP/STA may have knowledge of the number of available antennas at the both the transmitter and receiver sides. Thus, an appropriate MIMO scheme may be selected. In MU-PCA transmission, knowing the number of antennas available at AP side may not be enough for STA to choose a proper MIMO scheme since the antennas at AP side need to be shared with multiple users. Moreover, the number of users supported by MU-PCA transmission may change from time to time. Therefore, it may not be possible for the AP to announce its MIMO capability and number of supported MU-PCA users once, and all the MU-PCA transmissions may follow the same setup. In an example, the AP may assign the MCS to the STAs. In this way, the AP may determine the proper MIMO scheme for STAs, and may announce MCS and multiple user positions (which define channel/spatial stream assignment for multiple users) in, for example, the PLCP header (e.g. in the SIG field). In another example, this information may be exchanged prior to the MU-PCA transmission.

In another example of STA behavior, a STA may not be capable of channel aggregation. In this case, the STA may be assigned a maximum of one channel, and one bandwidth. MU-PCA or SU-PCA may utilize the same transceiver scheme. Both equal MCS and unequal MCS may be applied, and different MIMO schemes may be applied as well.

When a set of channels are used in either SU-PCA or MU-PCA, the transmit power used for each channel may be different. This may be due to regulations established by regional or national administrations or due to channel conditions observed that may be vastly different. In the SU-PCA case, the channels in the aggregated channel set may experience different interference, fading, etc. In the MU-PCA case, the channels between the AP and the various STAs may vary due to distance, shadow fading, etc., in addition to interference and fast fading. Unequal MCSs may be used to accommodate the conditions of each channel and to achieve higher throughput.

In order to support unequal MCSs and/or unequal transmit powers for each of the set of contiguous or non-contiguous channels or frequency segments, modified TXVECTOR and RXVECTOR may be used, examples of which are described in the following. The TXVECTOR and RXVECTOR may be designed as vectors in the following form:

$$TXVECTOR = [\text{TXVECTOR\_Common}, \text{TXVECTOR\_0}, \text{TXVECTOR\_1}, \ldots, \text{TXVECTOR\_N}], \quad \text{Equation 5}$$

$$RXVECTOR = [\text{RXVECTOR\_Common}, \text{RXVECTOR\_0}, \text{RXVECTOR\_1}, \ldots, \text{RXVECTOR\_N}], \quad \text{Equation 6}$$

where TXVECTOR_Common and RXVECTOR_Common may contain parameters that apply to all channels used in the SU-PCA or MU-PCA or all frequency segments; and TXVECTOR_i and RX_VECTOR_i, for $0 \le i \le N$, may contain parameters specific to the $i^{th}$ channel or frequency segment. The $i^{th}$ channel may be of any bandwidth and may consist of contiguous and non-contiguous frequency segments.

For example, in 802.11af networks, TXVECTOR_i and RXVECTOR_i may contain parameters for the $i^{th}$ channel of bandwidth W, for example, in operation modes defined in the 802.11af standard such as TVHT_W, TVHT_2W, TVHT_4W, TVHT_W+W and TVHT_2W+2W operation modes.

Alternatively, TXVECTOR_i and RXVECTOR_i may contain parameters for the $i^{th}$ channel of bandwidth 2W in the TVHT_2W, TVHT_4W and TVHT_2W+2W operation modes. Some parameters that may be included in the TXVECTOR_Common and RXVECTOR_Common are shown in Table 5, where Y and N indicate the presence (Y) or absence (N) of the corresponding parameter.

TABLE 5

| Parameter | Description | TXVECTOR_Common | RXVECTOR_Common |
|---|---|---|---|
| Format | VHT indicates VHT Format<br>TVHT indicates TVHT Format | Y | Y |
| NON_HT_Modulation | Similar to 11AC settings | Y | Y |
| N_TX | Total Number of transmit chains | Y | N |
| CH_Bandwidth | Indicates the bandwidth of the SU-PCA and MU-PCA transmissions. | Y | Y |

Table 6 shows some parameters that may be included in the TXVECTOR_i and RXVECTOR_i where Y and N indicate the presence (Y) or absence (N) of the corresponding parameter in TXVECTOR_i and RXVECTOR_i, and MU indicates presence for MIMO mode.

TABLE 6

| Parameter | Description | TX-VECTOR | RX-VECTOR |
|---|---|---|---|
| N_TX_i | Total Number of transmit chains used for the $i^{th}$ channel or frequency segment | Y | N |
| CH_Bandwidth_i | The bandwidth for the $i^{th}$ channel or frequency segment. For example, CH_Bandwidth_i may be W, W + W, 2W, 2W + 2W and 4W in 802.11af. | Y | Y |
| EXPANSION_MAT_TYPE_i | It may be set to Compressed_SV for the $i^{th}$ channel or frequency segment | Y | N |
| EXPANSION_MAT_i | Contains a set of beamforming feedback matrices for the $i^{th}$ channel or frequency segment | MU | N |
| CHAN_MAT_TYPE_i | It may be set to Compressed_SV for the $i^{th}$ channel or frequency segment | N | Y |
| CHAN_MAT_i | Contains a set of compressed beamforming feedback matrices based on the channel measured during the training symbols of the received PPDU on the $i^{th}$ channel or frequency segment | N | Y |

TABLE 6-continued

| Parameter | Description | TX-VECTOR | RX-VECTOR |
|---|---|---|---|
| DELTA_SNR_i | Contains a set of delta SNR values based on the channel measured during the training symbols of the received PPDU | MU | Y |
| RCPI_i | Measured received RF power on the $i^{th}$ channel or frequency segment | N | Y |
| SNR_i | Measured SNR_i per spatial stream on the $i^{th}$ channel or frequency segment | N | Y |
| FEC_CODING_i | Indicates which FEC encoding is used on the $i^{th}$ channel or frequency segment | MU | MU |
| STBC_i | Indicates whether STBC is used on the $i^{th}$ channel or frequency segment | Y | Y |
| TXPWR_Level_i | Indicates the transmit output power levels that shall be used for the current transmission on the $i^{th}$ channel or frequency segment | Y | N |
| RSSI_i | Measured RSSI value for the $i^{th}$ channel or frequency segment | N | Y |
| MCS_i | The MCS scheme used for the transmission of the PPDU | Y | N |
| REC_MCS_i | Indicates the MCS that the STA's receiver recommends | N | Y |
| PSDU_Length_i | Indicates the number of octets in the PSUD on the $i^{th}$ channel or frequency segment | N | Y |
| USER_POSITION_i | Index for user in MU transmission on the $i^{th}$ channel or frequency segment | N | Y |
| NUM_STS_i | Indicates the number of space-time streams on the $i^{th}$ channel or frequency segment | MU | Y |
| GROUP_ID_i | Indicates the Group_ID on the $i^{th}$ channel or frequency segment | Y | Y |
| Partial_AID_i | Abbreviated indication of the intended recipient(s) on the $i^{th}$ channel or frequency segment | Y | Y |
| NUM_USERS_i | Indicates the number of users on the $i^{th}$ channel or frequency segment | Y | N |
| BEAMFORMED_i | Set to 1 if a beamforming steering matrix is applied to the waveform in a SU transmission | Y | Y |

All parameters in Table 6, for example Parameter_i, for $0 \le i \le N$, may be a parameter specific to the $i^{th}$ channel or frequency segment. The $i^{th}$ channel may be of any bandwidth and may consist of contiguous and non-contiguous frequency segments. For example, in 802.11af networks, Parameter_i may be a parameter for the $i^{th}$ channel of bandwidth W in a TVHT_W, TVHT_2W, TVHT_4W, TVHT_W+W and TVHT_2W+2W operation mode. Alternatively, Parameter_i may be a parameter for the $i^{th}$ channel of bandwidth 2W in the TVHT_2W, TVHT_4W and TVHT_2W+2W operation mode.

The STA/AP may achieve the support for unequal MCS and unequal transmit power for SU-PCA and MU-PCA by using PLCP transmit and receive procedure, such as the examples discussed below, and the STA/AP may obtain access to the channel as described in above. Transmission of the PPDU may be initiated by the PLCP after receiving the PHYTXSTART.request (TXVECTOR) primitive, such that the TXVECTOR elements for the PHY-TXSTART.request primitive are described above.

For each channel or frequency segment, the PLCP may issue the parameters in the following physical medium dependent (PMD) primitives to configure the PMD: PMD_TXPWRLVL.request and PMD_TX_PARAMETERS.request. The TXPPWRLVL and TX_PARAMETERS may be specific for each of the channel or frequency segment. The PLCP may issue a PMD_TXSTART(TXVECTOR).request primitive to start transmission of a PLCP preamble on each of the channels or frequency segments defined by the elements in the TXVECTOR parameter. After the PLCP preamble transmissions are started on all channels or frequency segments, the PHY layer entity may initiate data scrambling and data encoding. The encoding method for the Data field of each packet on each channel or frequency segment may be based on the FEC_CODING_i, CH_BANDWIDTH_i, NUM_STS_i, STBC_i, MCS_i, and NUM_USERS_i parameter of the TXVECTOR, as described above. The data may be exchanged between the MAC and PHY layers through a series of PHY-DATA.request(DATA) primitives for each data frame on each of the channels or frequency segments issued by the MAC, and PHY-DATA.confirm primitives issued by the PHY layer.

PLCP receive procedures may support unequal MCS and unequal transmit power in SU-PCA and MU-PCA. Upon the PMD receiving the transmitted PLCP preambles on all channels or frequency segments, PMD_RSSI.indication may report a receive signal strength to the PLCP for each of the channels or frequency segments. The PMD primitive PMD_RSSI may be issued to the PLCP, which may record a received RSSI value, RSSI-i, for each of the channel or frequency segment. The PLCP may include the most recently received RSSI_i values in the PHY-RXSTART.indication(RXVECTOR) primitive issued to the MAC.

After the PHY-CCA.indication(BUSY, channel-list) is issued, the PHY entity may begin receiving the training symbols on all the channels or frequency segments. A PHY-RXSTART.indication(RXVECTOR) primitive may be issued when correct signaling and modes are detected from the preambles on all the channels or frequency segments. The RXVECTOR associated with this primitive may include any of the parameters specified above. Thy PHY layer may further decode the PSDUs on all the channels or frequency segments according to the RXVECTOR. The received bits for the PSDUs may be assembled into octets, decoded, and presented to the MAC using a series of PHYDATA.indication(DATA) primitive exchanges for each PSUD on a channel or frequency segment. After the reception of the final bit of the last PSDU octet, and possible padding and tail bits, on all channels or frequency segments, the receiver may return to the RX IDLE state.

The PHY layer may have some limitations on operation bandwidth. For example, some of the 802.11ah devices, when participate in MU-PCA, may be able to aggregate multiple channels, however, the bandwidth of each operation channel may be limited to 2 MHz, while at the AP side, three channels (each with bandwidth 1 MHz) may be aggregated and assigned to this MU-PCA user. In this example, at the MAC layer, the AP may prepare two separate MAC packets, which will be transmitted to the user. At the PHY layer, the AP may assign one MAC packet to one of the aggregated channels, with 2 MHz bandwidth, and may assign the rest of MAC packet to another channel with 1 MHz bandwidth. This may be achieved using layer mapping.

Figure 26:
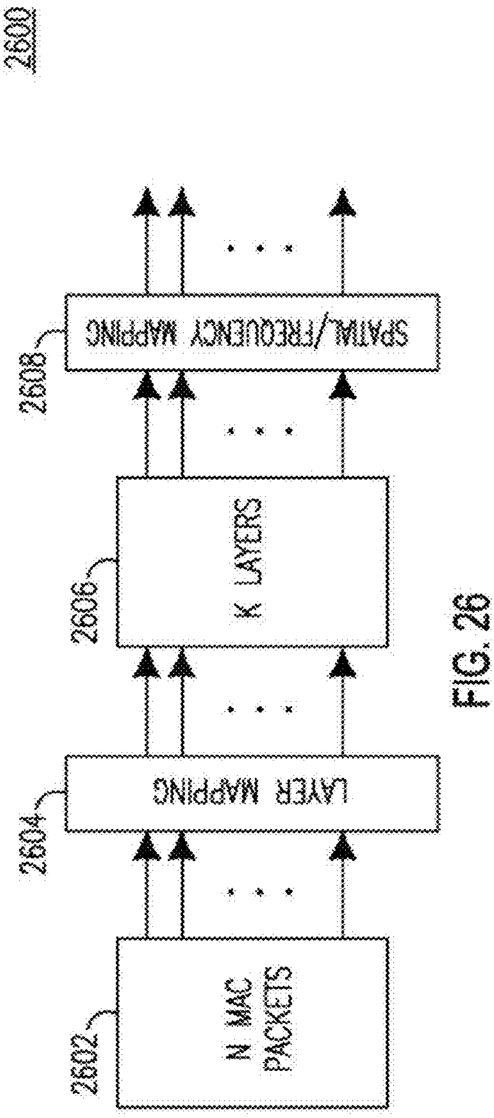
FIG. 26 is a flow diagram of an example method of using layer mapping to may N MAC packets to K layers.

FIG. 26 is a flow diagram of an example method 2600 of using layer mapping 2604 to map N MAC packets 2602 (for N or fewer users) to K layers 2606. Each layer may process the assigned data stream independently. For example, each layer may have separate coding and modulation schemes, also separate MIMO schemes. Different interleavers (not shown) may be defined for each layer or one interleaver may be used over several layers. The layer mapping 2604 may, for example: map one MAC packet to one layer; multiple MAC packets to one Layer; one MAC packet to multiple layers; or comprehensive mapping from multiple MAC packets to multiple layers. After layer processing, the packet may be passed to Spatial/Frequency Mapping 2608, which may further map the multiple layers to multiple spatial streams or frequency bands. The method 2600 may be applied to all the PHY designs discussed previously.

The following examples, pertain to MU-PCA enabled by using transmit/receive with asymmetrical bandwidth. Using asymmetrical bandwidth may have a flexible architecture, and the number of users it may support by MU-PCA is not limited by the number of antennas. Moreover, it may simplify or reduce the cost of the WLAN STA, or AP/STA design. Use of MU-PCA over contiguous and/or non-contiguous channels through widely separated frequencies may be challenging for asymmetrical bandwidth. For example, UL MU-PCA STAs transmitted simultaneously to the AP may have to be close in received power levels at the AP in order to avoid the near-far problem. Also, simultaneous transmission of UL MU-PCA packets may have to arrive at the AP within the Guard Interval (GI) to allow the AP to correctly decode each packet.

The 802.11af and 802.11ah specifications may be considered clocked down versions of the 802.11ac specification. Consequently, the guard interval (GI) may become as long as 8 microseconds, which may be sufficiently long to allow time alignment of UL MU-PCA packets assuming a Round Trip Time (RTT) of 6.67 microseconds over a coverage range of 1 km. It is also noted that the Timing Synchronization Function (TSF) timer may retain its current precision of 1 microsecond. Under the assumption of TSF timer precision and GI durations, a single receiver may be used at the AP, instead of multiple receiver for each of the frequency segments, to receive packets from multiple STAs simultaneously.

The channelization proposed in the 802.11ah framework may make the use of transmit/receive with asymmetrical bandwidth a reasonable possibility. It is possible for current, and near future, RF techniques to cover the entire bandwidth envisioned for 802.11ah and other sub-1 GHz technologies with a single RF chain.

MAC and PHY layer methods leverage the above observations to handle transmit/receive with asymmetrical bandwidth. The MAC Layer schemes for standalone UL, standalone DL, combined UL/DL and retransmission schemes may be similar to those described above for transmit/receive with asymmetrical bandwidth. However, since transmit/receive are with asymmetrical bandwidth, additional modifications of the MAC Layer may be performed, as described below. PHY Layer methods for supporting MU-PCA with asymmetrical bandwidth are also presented. One example is to provide MU-PCA using a relatively wideband AP and relatively narrowband STAs. In another example, MU-PCA is provided to STAs using a multi-narrow band combined AP and narrowband STAs. In these examples, the hardware of the AP and the non-AP may be modified.

Examples methods, signaling and procedures described below provide MU-PCA for multiple STAs simultaneously over multiple contiguous, or non-contiguous, channels of widely separated frequencies. These methods may enable MU-PCA using transmit/receive with asymmetrical bandwidth in, for example, 802.11ah, or similar technologies, and it may also enable MU-PCA in other WLAN systems where there is precise timing to align UL MU-PCA transmissions.

The MAC designs to support MU-PCA using transmit/receive with asymmetrical bandwidth may consist of two parts, discussed below: the MAC schemes that enable standalone DL, standalone UL and combined DL/UL MU-PCA; and STA group management. The MAC Layer schemes for standalone UL, standalone DL, combined UL/DL, UL/DL MU-PCA and retransmission schemes are similar to those presented in the case of MU-PCA using transmit/receive with symmetrical bandwidth as discussed above.

STAs participating in the MU-PCA (using transmit/receive with asymmetrical bandwidth) may be organized into groups in a pre-arranged or ad hoc fashion for UL, DL or combined UL and DL transmissions. The STA grouping for UL and DL may be different. The DL MU-PCA group management is similar to that described above for MU-PCA using transmit/receive with symmetrical bandwidth. The STAs may be grouped together according to one or combination of several different criteria such as operating channel width, similar received power at the AP, QoS priorities, synchronizations, and buffered packet length, among other criteria. If coordinated well, the group of STAs may be able to utilize some portion of the available frequency bandwidth up to the entire bandwidth.

For UL MU-PCA group management, simultaneous UL MU-PCA transmissions may arrive at the AP with similar receive power and within the GI. The grouping may be conducted using the received signal strength indication (RSSI) indicator for each STA that may already be available to the AP. The AP may record the RSSI for each packet received from a STA. The AP may define RSSI intervals in the form of, for example, [0 dB, N dB], [N+1 dB, 2×N dB], . . . , [m×N+1 dB, (m+1)×N dB]. The value of N may depend on the tolerance of the receiver of the AP. For example, a STA may fall in RSSI interval or bin n if 90% of its latest L RSSI values fall into the interval [(n−1)×N+1 dB, n×N dB].

All STAs contained in the same bin may be candidates to be grouped into the same UL MU-PCA group. Since RSSI may be a coarse estimation of the distance between the STA and AP, it may allow simultaneously transmitted UL MU-PCA packets from the group to arrive at the AP within the GI. STAs within the same RSSI bin may be further selected into groups that may maximally occupy available channels by diverse criteria, for example, by doing any of the following: selecting STAs of the maximal channel width first; selecting STAs of the minimal channel width first; or selecting STAs with similar QoS requirements. In addition, a variety of signaling, mechanisms and procedures for grouping of STAs as well as for group monitoring and maintenance may be applied to enable MU-PCA in a variety of WLAN systems.

PHY layer procedures for MU-PCA using transmit/receive with asymmetrical bandwidth are described in the following. In some cases, the AP may perform relatively wideband transmit/receive, and a STA may perform relatively narrowband transmit/receive. PHY layer methods may lower the hardware cost at the AP side, may increase the complexity at the STA side, and/or may make the MU-PCA more flexible. Assuming OFDM based WLAN systems, for different channel bandwidth, the subcarrier frequency spacing may be a constant number. Accordingly, once the channel bandwidth is doubled, the IFFT/FFT size utilized for the OFDM system may also doubled. For example, in 802.11ah, the 2 MHz channel bandwidth mode may require a 64 point IFFT/FFT at the PHY layer, while the 4 MHz channel bandwidth mode may require a 128 point IFFT/FFT. Assume sub-carrier spacing is denoted as $\Delta_F$.

Assuming the AP has aggregated N channels, and each channel has center frequency $f_n$, $n \in \{1, 2, \ldots N\}$ and bandwidth $BW_n$, then the aggregated channel bandwidth BW may be:

$$BW = \sum_{n=1}^{N} BW_n \quad \text{Equation 7}$$

The bandwidth spanned by the entire aggregation is:

$$BW_{span} = \max\left(f_1 + \frac{BW_1}{2}, \ldots, f_n + \frac{BW_N}{2}\right) - \min\left(f_1 - \frac{BW_1}{2}, \ldots, f_N - \frac{BW_N}{2}\right) \quad \text{Equation 8}$$

For contiguous channel aggregation, $BW=BW_{span}$, whereas for non-contiguous channel aggregation case, $BW<BW_{span}$. The AP may assign the aggregated channels to K users. The IFFT/IDFT size $N_{FFT}$ utilized at the aggregated channel may be equal to:

$$N_{FFT} = \text{round}\left(\frac{BW_{span}}{\Delta_F}\right) \quad \text{Equation 9}$$

For example, in 802.11ah, if the AP contiguously aggregates two 1 MHz channels and one 2 MHz channel, then $BW=BW_{span}$=4 MHz. If $\Delta_F$=31.25 kHz, then the IFFT/IDFT size Nur for the aggregated channel is 4000/31.25=128. In an example with non-contiguous channel aggregation, $BW_{span}$=5 MHz, while BW=4 MHz, and the IFFT/IDFT size $N_{FFT}$ for this non-contiguously aggregated channel is 5000/31.25=160.

Figure 27:
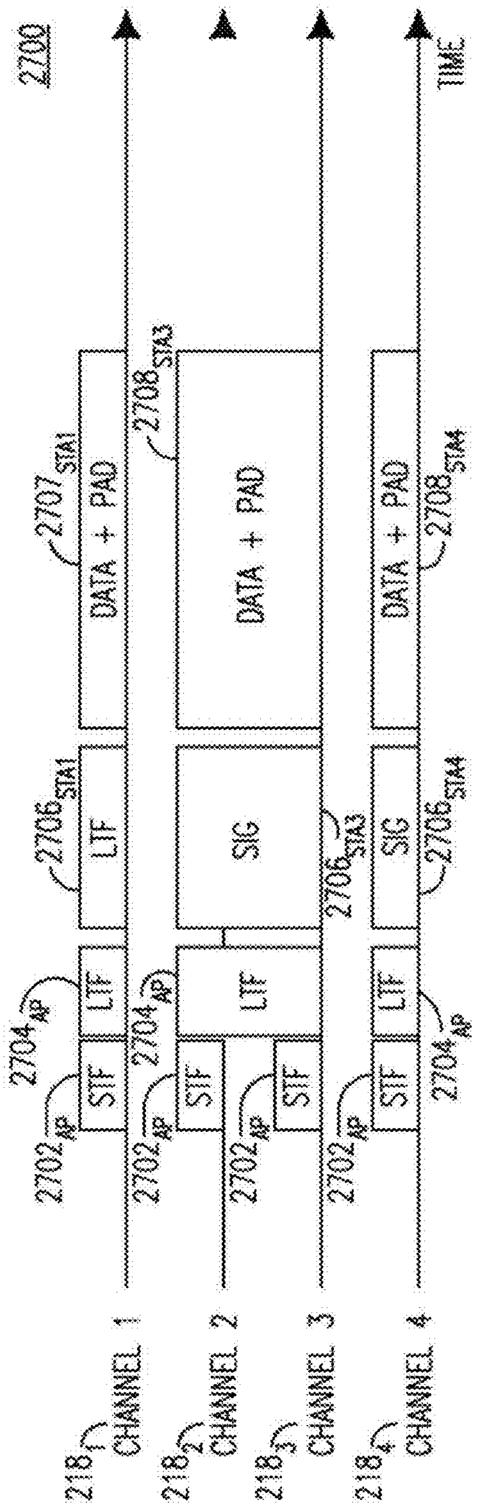
FIG. 27 shows an example of a PHY layer scheme with 3 MU-PCA users.
Figure 28:
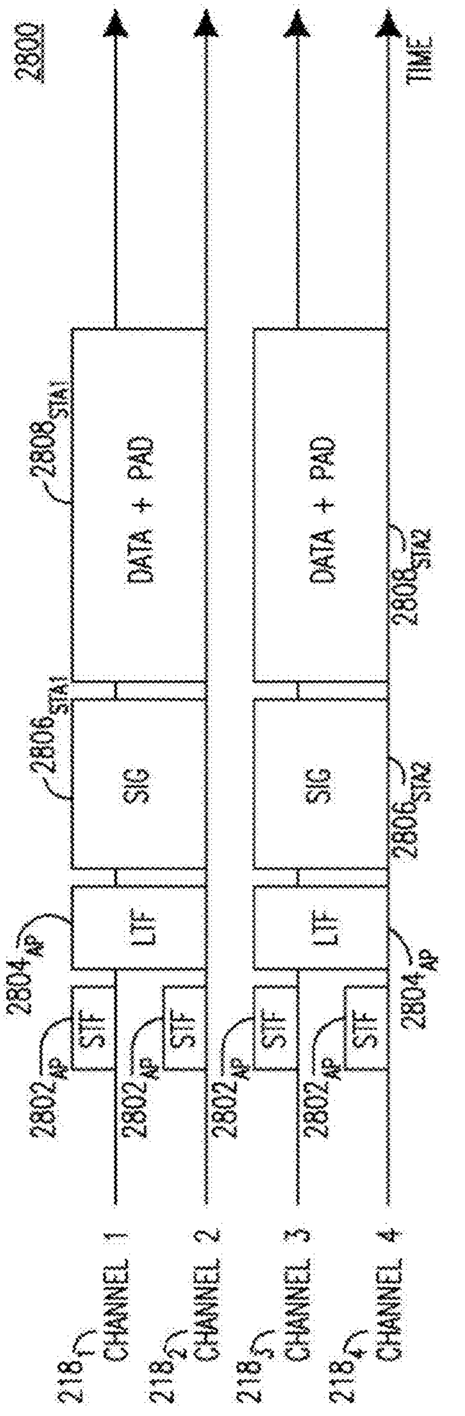
FIG. 28 shows an example of a PHY layer scheme with 2 MU-PCA users.
Figure 29:
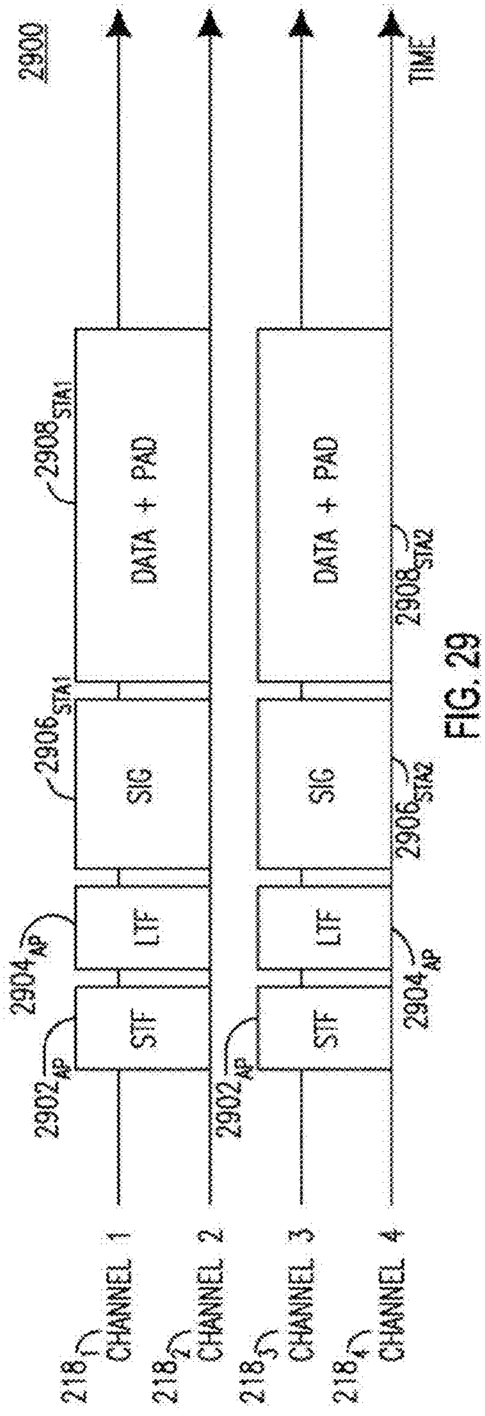
FIG. 29 shows an example of a PHY layer scheme with an example STF format for MU-PCA transmissions.

PPDU structure and PLCP header may be modified, as illustrated in FIGS. 27, 28 and 29. In FIGS. 27, 28, and 29, the PLCP header includes short training field (STF), long training field (LTF) and SIG field. A PLCP header may include a longer preamble, for example, it may include: a first set of STF, LTF, SIG fields for legacy operation or for Omni operation where the set of STF, LTF, SIG may be transmitted with Omni antenna weight); and a second set of STF, LTF and SIG field for (very) high throughput operation or directional operation, where the set of STF, LTF, SIG may be transmitted with selected antenna weight, and where this mode may be used for MU-MIMO transmission or Beamforming transmission. The DL and UL transceiver s are described below.

For the DL transmitter, the STF could be transmitted using STF format of the smallest channel defined in the standards. In different parallel channels, the STF may be repeated with or without phase rotation. In another example, the STF may be transmitted using the same bandwidth as the rest of packet. LTF, SIG and Data fields may be transmitted using the IFFT/IDFT size $N_{FFT}$ as defined in Equation 9. Special guard intervals and/or null subcarriers (tones) may be inserted between users. The special guard/null subcarriers may be designed according to corresponding spectral mask requirements. The location of guard/null tones may be changed according to the user allocation and user bandwidth. LTF may be transmitted using wideband format with the guard tones. LTF may be used with narrow band format; however, the LTF sequence may cover all the data subcarriers utilized in SIG/Data portion of the packet. The SIG field may be identical and repeated on each channel; or it could be user specific or channel specific.

FIGS. 27 and 28 show examples of PHY layer schemes 2700 and 2800 with 3 and 2 MU-PCA users, respectively. In FIG. 27, STA1 is assigned to channel $\mathbf{218}_1$, STA3 is assigned to channels $\mathbf{218}_{2,3}$, and STA4 is assigned to channel $\mathbf{218}_4$. The AP may transmit STF $\mathbf{2702}_{AP}$ with or without phase rotation over each aggregated channel $\mathbf{218}_{1 \ldots 4}$, followed by LTF $\mathbf{2704}_{AP}$, while transmitting LTF $\mathbf{2704}_{AP}$ over the combined bandwidth of channels $\mathbf{218}_{2,3}$. The STAs (STA1, STA3, and STA4) may transmit Sig $\mathbf{2706}_{STA1}$, $\mathbf{2706}_{STA3}$, and $\mathbf{2706}_{STA4}$, and data (and padding) $\mathbf{2708}_{STA1}$, $\mathbf{2708}_{STA3}$, and $\mathbf{2708}_{STA4}$ to the AP over their respectively assigned channels.

In FIG. 28, STA1 is assigned to channels $\mathbf{218}_{1,2}$, and STA2 is assigned to channels $\mathbf{218}_{3,4}$. The AP may transmit STF $\mathbf{2702}_{AP}$ with or without phase rotation over each aggregated channel $\mathbf{218}_{1 \ldots 4}$, followed by LTF $\mathbf{2804}_{AP}$ over the combined bandwidth of channels $\mathbf{218}_{1,2}$ and $\mathbf{218}_{3,4}$. The STAs (STA1, STA3, and STA4) transmit SIG $\mathbf{2806}_{STA1}$ and $\mathbf{2806}_{STA2}$ and data (and padding) $\mathbf{2808}_{STA1}$ and $\mathbf{2808}_{STA2}$ over their respectively assigned channels.

FIG. 29 shows an example of a PHY layer scheme 2900 with an example STF format for MU-PCA transmissions. In FIG. 29, STA1 is assigned to channels $\mathbf{218}_{1,2}$, and STA2 is assigned to channels $\mathbf{218}_{3,4}$. The STF $\mathbf{2902}_{AP}$ may be transmitted using the same bandwidth as the rest of the packet, that is over combined channels $\mathbf{218}_{1,2}$ and $\mathbf{218}_{3,4}$. Simple or preamble format may be used. For example, the long preamble with (very) high throughput portion or directional portion (used for Beamforming or MU-MIMO transmission) may be used. The long preamble may provide extra PHY protection. As in the example of FIG. 28, the AP may transmit LTF $\mathbf{2904}_{AP}$ over the combined bandwidth of channels $\mathbf{218}_{1,2}$ and $\mathbf{218}_{3,4}$. The STAs (STA1, STA3, and STA4) may transmit SIG $\mathbf{2906}_{STA1}$ and $\mathbf{2906}_{STA2}$ and data (and padding) $\mathbf{2908}_{STA1}$ and $\mathbf{2908}_{STA2}$ over their respectively assigned channels.

Figure 30:
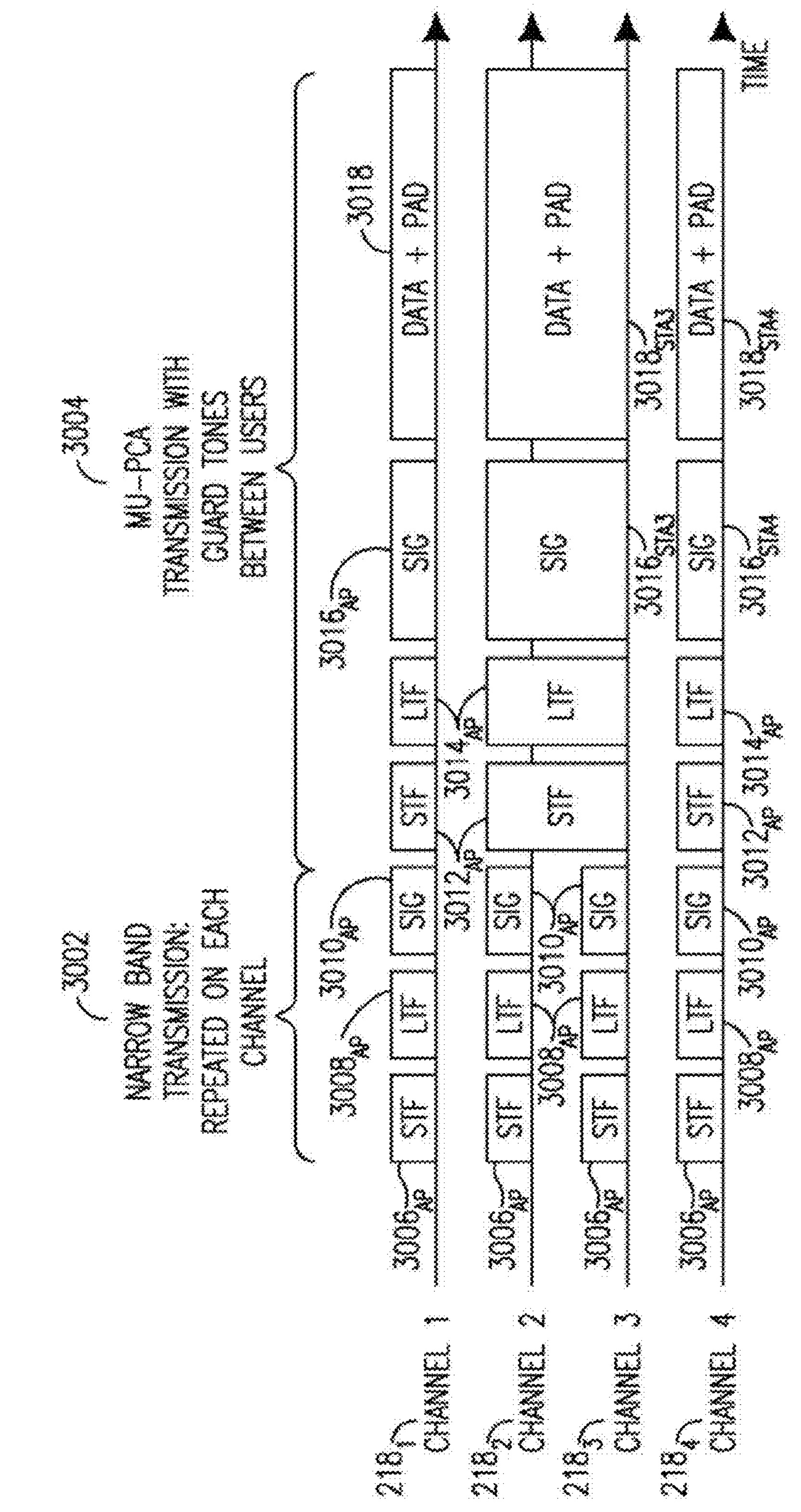
FIG. 30 shows an example PHY layer scheme with PPDUs using long preamble.

FIG. 30 shows an example PHY layer scheme 3000 with PPDUs using long preamble to provide extra protection over MU-PCA transmissions. A narrowband transmission 3002 by the AP, including the preamble portion including STF $\mathbf{3006}_{AP}$, LTF $\mathbf{3008}_{AP}$, and SIG field $\mathbf{3010}_{AP}$, may be repeated on each channel $\mathbf{218}_{1 \ldots 4}$. The preamble portion corresponding with narrowband transmission 3002 may be detected by normal unintended STAs with or without MU-PCA capability. A preamble portion corresponding to the MU-PCA transmission 3004, including STF $\mathbf{3012}_{AP}$ and LTF $\mathbf{3014}_{AP}$, may be detected by MU-PCA capable STAs. The STAs in the MU-PCA group (STA1, STA3 and STA4) may respectively transmit SIG fields $\mathbf{3016}_{STA1}$, $\mathbf{3016}_{STA3}$, and $\mathbf{3016}_{STA4}$ and their data (with padding) $\mathbf{3018}_{STA1}$, $\mathbf{3018}_{STA3}$, and $\mathbf{3018}_{STA4}$. Information may be carried in the SIG fields $\mathbf{3010}_{AP}$ of the narrowband transmission, such that non MU-PCA capable STAs or unintended STAs may know it is a MU-PCA transmission, and if it is a potential destination or receiver of the MU-PCA transmission. Other variations are possible. For example, MU-PCA STF $\mathbf{3012}_{AP}$ and LTF $\mathbf{3014}_{AP}$ transmission may be omitted, and the legacy STF (LSTF) and legacy (LLTF) may be reused.

In FIGS. 27-30, the LTFs $\mathbf{3014}_{AP}$ are shown with the same length or duration among all the MU-PCA users. This is referred to as equal LTF design. With equal LTF design, the AP may know the number of data streams assigned to each MU-PCA users, thus the number of LTF symbols used for channel estimation for each MU-PCA user may be calculated accordingly. The AP may transmit the LTF with the largest number among all the MU-PCA users. For example, STA1 may transmit one data stream, thus one LTF may be used for channel estimation. STA2 may transmit two data stream, thus two LTFs may be used for channel estimation. For MU-PCA for STA1 and STA2 together, the AP may transmit 2 LTFs. In this way, the AP may signal each user the number of data streams it assigned and the number of total LTFs transmitted in SIG field.

In another example, unequal LTF may be used. With this design, the AP may transmit the number of LTFs needed for that user. Using the above example again, the AP may transmit one LTF for STA1 on its assigned channel(s), which may be followed by the transmission of data. The AP may transmit two LTFs for STA2 on its assigned channel(s). In this way, the AP may signal each user the number of data streams assigned.

Figure 31:
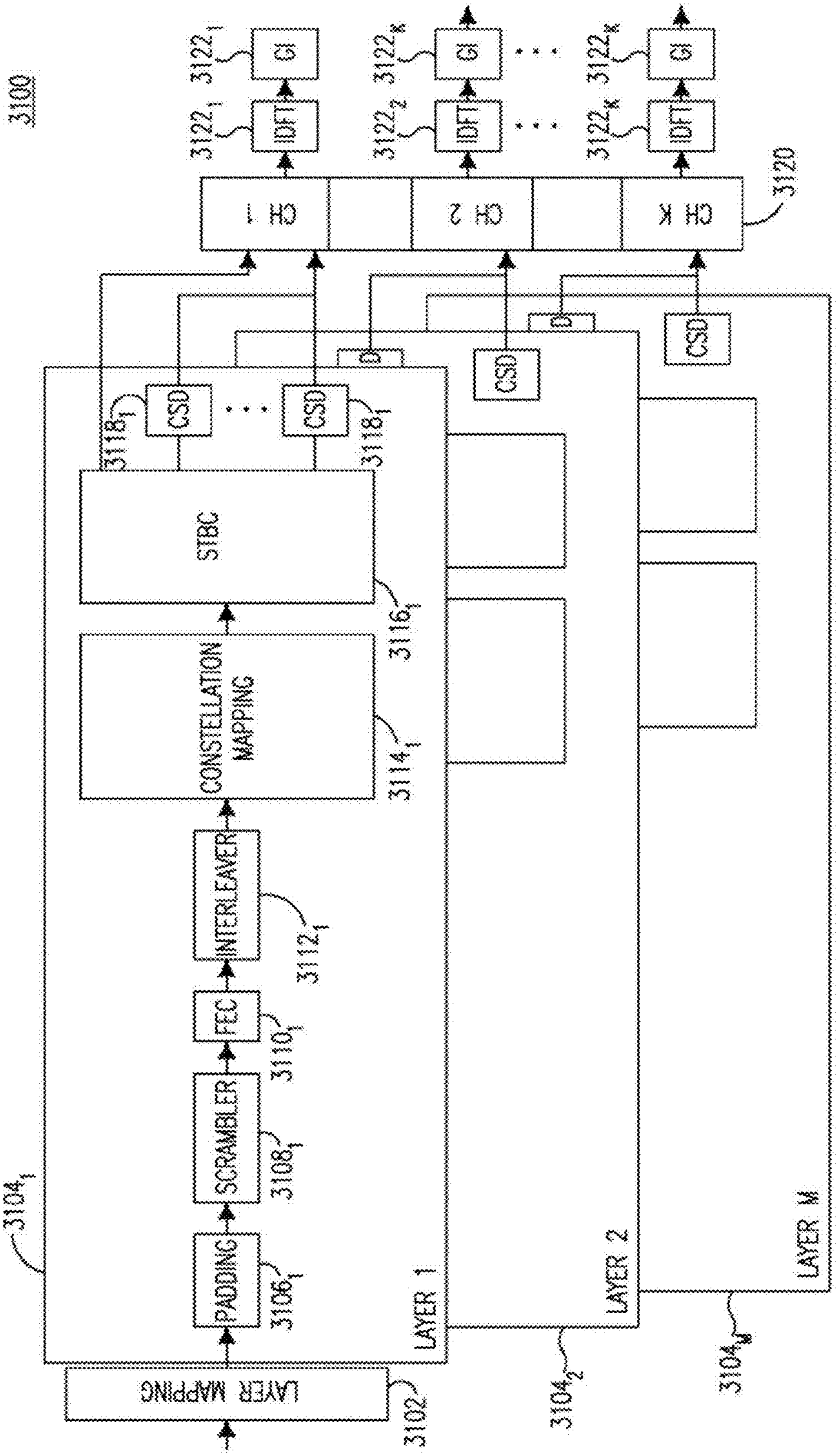
FIG. 31 shows an example transmission flow diagram for transmitting DL communications.

FIG. 31 shows an example transmission flow diagram 3100 at the AP side. Layer may correspond to data stream, MAC packet, users or other possible partition of data. Following layer mapping 3102, each of the M layers $\mathbf{3104}_{1 \ldots M}$ may be separately coded and modulated using separate layer processing. In another word, each layer may have its own MCS and MIMO schemes. In FIG. 31, each layer $\mathbf{3104}_{1 \ldots M}$ may include, for example: padding component $\mathbf{3106}_{1 \ldots M}$, scrambler $\mathbf{3108}_{1 \ldots M}$, FEC component $\mathbf{3110}_{1 \ldots M}$, interleaver $\mathbf{3112}_{1 \ldots M}$, constellation mapper $\mathbf{3114}_{1 \ldots M}$, STBC $\mathbf{3116}_{1 \ldots M}$, and multiple cyclic shift diversity (CSD) components $\mathbf{3118}_{1 \ldots M}$. In an example, the PHY layer may split a MAC packet into multiple layers, for a one user case where one MAC packet is prepared for unicast to the user. Frequency segment mapper 3120 may map the M layers to the K frequency segments or channels, and each segment may be processed with IDFT $\mathbf{3122}_{1 \ldots K}$, and a GI components $\mathbf{3124}_{1 \ldots K}$ may apply guard intervals between users.

For example, multiple MAC packets may be prepared, such that each user may have one MAC packet or multiple MAC packets. The AP may map the MAC packets to multiple layers, by mapping multiple MAC packets to one layer; or mapping one MAC packet to multiple layers. Coding and modulation may be performed on each layer, then frequency segment mapping may map the layers to frequency segments. Multiple layers may be mapped to one frequency segment, or one layer may be mapped to multiple frequency segments. In another example, the AP may broadcast or multicast one MAC packet to multiple users on multiple channels. The MAC packet may be repeatedly mapped to multiple layers then multiple frequency segments.

For a DL receiver, The STA may need to know the AP transmitting bandwidth ($BW_{span}$) and the sub-channel allocation. The exchange of this information may be done within the MAC handshakes (for example, the grouping configuration signaling) before the MU-PCA transmission. STA may use at least the same sampling rate as AP. Instead of using the same wide-band filtering, the STA may apply its narrow band filtering. As for a WiFi signal, the STA may utilize STF(s) on its own frequency band for automatic gain control (AGC), coarse frequency offset and coarse timing detection. A wideband FFT with size $N_{FFT}$ may be performed, and based on truncated or full size LTF (which may depend on whether a wideband LTF or narrow band LTF is transmitted), fine timing frequency correction and channel estimation may be applied. Following the LTF, SIG field and data part may be decoded normally. The FFT size used at the STA side may be $N_{FFT}$ defined in Equation 9.

For an UL transmitter, the STA may need to know the AP receiving bandwidth ($BW_{span}$) and sub-channel allocation. The exchange of this information may be done within the MAC handshakes (for example, the grouping configuration signaling) before setting up the MU-PCA transmission. The STF transmitted by each STA may be a narrow band format, while the LTF transmitted by each STA may be a truncated wideband LTF, or a narrow band format LTF. With a narrow band LTF, the LTF sequence in frequency domain may cover all the data subcarriers by the corresponding transmitting STA.

Figure 32:
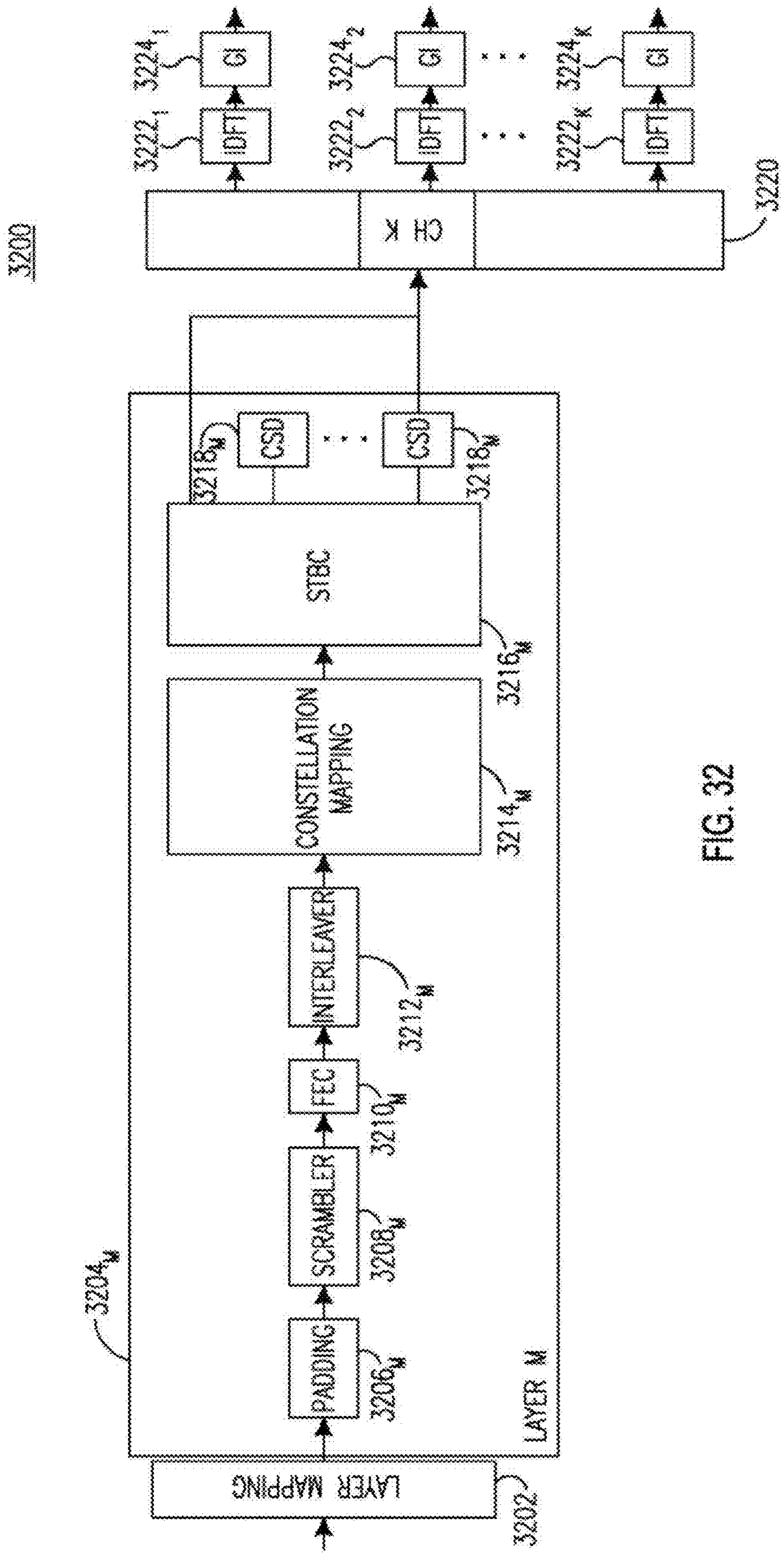
FIG. 32 shows an example transmission flow diagram for transmitting UL communications.

FIG. 32 shows an example transmission flow diagram 3200 at the STA side, which may be used to prepare the data portion of PPDU for transmission. One layer, layer $\mathbf{3204}_m$, is shown in FIG. 32, however, more than one layer may be allocated to the STA, and each layer may have a separate MCS. Following layer mapping 3202, layer $\mathbf{3204}_m$ may apply any of the following to the signal (see, for example, description of FIG. 31): padding $\mathbf{3206}_m$, scrambler $\mathbf{3208}_m$, FEC $\mathbf{3210}_m$, interleaver $\mathbf{3212}_m$, constellation mapping $\mathbf{3214}_m$, STBC $\mathbf{3216}_m$, and CSD $\mathbf{3218}_m$, to generate k channels. Any of these elements may be omitted, for example, STBC $\mathbf{3216}_m$. The k channels may be provided to frequency segment mapper 3220 that may map the M layers to K frequency segments or channels, and then IDFT $\mathbf{3222}_{1 \ldots K}$ and GI removal $\mathbf{3224}_{1 \ldots K}$ may be applied to each of the k channels.

In the example of FIG. 32, one layer is mapped to one frequency segment. In another example, multiple layers may be mapped to one frequency segment or one layer may be mapped to multiple frequency segments. The IFFT/IDFT size utilized at STA side may be $N_{FFT}$ as defined in Equation 9.

Figure 33:
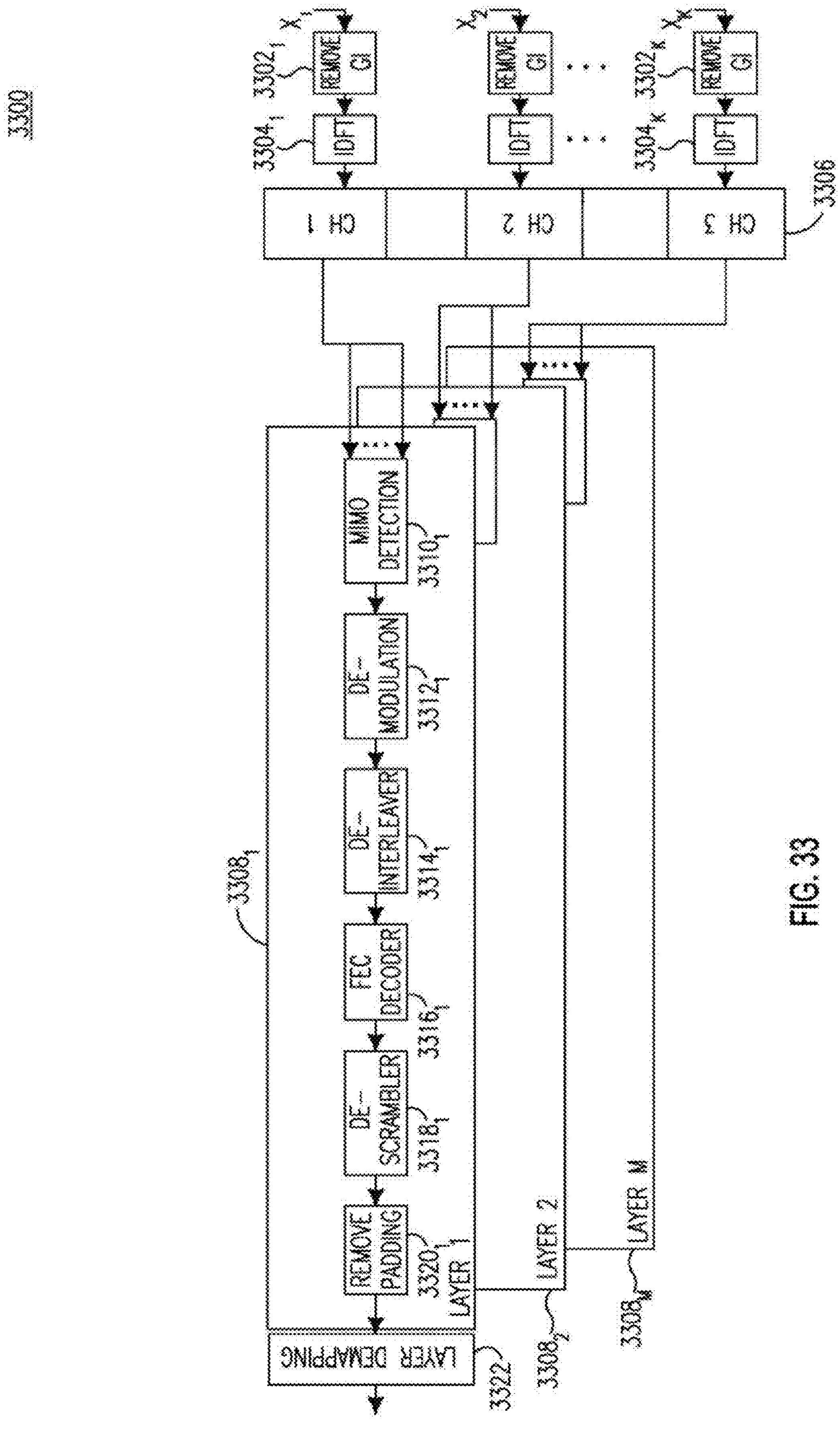
FIG. 33 shows an example transmission flow diagram for receiving UL communications.

FIG. 33 shows an example transmission flow diagram 3300 at the AP side, where the AP may act as the receiver for UL communication. MU-PCA may be setup at the MAC layer; while in the PHY layer one or more packets may be expected to arrive simultaneously at the assigned frequency segments $x_1 \ldots x_k$. For each segment $x_{1 \ldots k}$, following GI removal $\mathbf{3302}_{1 \ldots k}$ and inverse discrete Fourier transform (IDFTa) $\mathbf{3304}_{1 \ldots k}$, frequency segment de-mapping 3306 may map the data signal in frequency domain to multiple layers $\mathbf{3308}_{1 \ldots m}$. Each layer $\mathbf{3308}_{1 \ldots m}$ may apply single-channel receiver processing to the data of the corresponding layer, the processing which may include any of the following: MIMO detection $\mathbf{3310}_{1 \ldots m}$, de-modulation $3312_{1 \ldots m}$, de-interleaver $3314_{1 \ldots m}$, de-scrambler $3318_{1 \ldots m}$, and padding removal $3320_{1 \ldots m}$. Layer de-mapper 3322 may map the output of the layers $3308_{1 \ldots m}$ to MAC packets. This scheme may be applied with or without a MIMO scheme (i.e. MIMO detection $3310_{1 \ldots m}$). MIMO schemes may include, but are not limited to, spatial multiplexing, space-time block codes, and beamforming, for example.

MCS levels may be indicated in SIG field. A big SIG field may be defined, which may include all the MCS levels used for a STA/user. The mapping between MCS levels and channels/resource blocks may be given in the SIG field too. This "big" SIG field may be transmitted or repeated over all the channels for the STA/user. In another example, the SIG fields may be divided into a common SIG field and individual SIG fields. The common SIG field may contain common information for the transmission, and may be transmitted over the entire bandwidth/channels for a STA/user. The individual SIG field may contain the information for one frequency channel/band, for example, the MCS and length field for the channel/band. The individual SIG field may be transmitted on its assigned channel/band.

Other examples of PHY designs and procedures for MU PCA using transmit/receive with asymmetrical bandwidth are described. The STA may need to know the frequency allocation information. Each user may utilize its own Fourier transform, or several users may share a relatively wideband Fourier transform. In an example, for a user/STA with one channel or multiple contiguously aggregated channels, the IFFT/FFT size may be defined by the channel bandwidth allocated to this user/STA. In an example, a STA/user may be assigned two contiguously aggregated 1 MHz channels, and then the IFFT/FFT size may be 64. In another example, for a 1 MHz channel, the IFFT/FFT size utilized may be 32. In another example, for a user with more than one non-contiguously aggregated channels, separate Fourier transforms or one Fourier transform may be used.

More than one user may share contiguously aggregated channels. In an example, assume channel 1 may be separated (i.e. non contiguous) from channels 2, 3, and 4, which are contiguous. Assume that channel 1 may be allocated to user 1; channels 2 and 3 may be allocated to user 2, and channel 4 may be allocated to user 3. In an example, separate Fourier transforms may be used for different users. In the example above, user 2 may utilize Fourier transform that covers channel 2 and channel 3; while user 3 may utilize a Fourier transform that covers channel 4. In another example, one wideband Fourier transform may be used for contiguous channels. For example, n the example above, STAs/users 2 and 3 may utilize one wideband Fourier transform.

In another example, separate Fourier transforms may be utilized for separate STAs/users. In this case, each STA/user may conduct its own transmission function blocks. After constructing the OFDM signal in the time domain, the signal may be shifted to its assigned frequency segment. The frequency shift may be performed either at baseband or in the RF domain. If the frequency shift is conducted in the RF domain, the processing of the signal may be the same as for MU PCA with transmit/receive with symmetric bandwidth described above.

Figure 34:
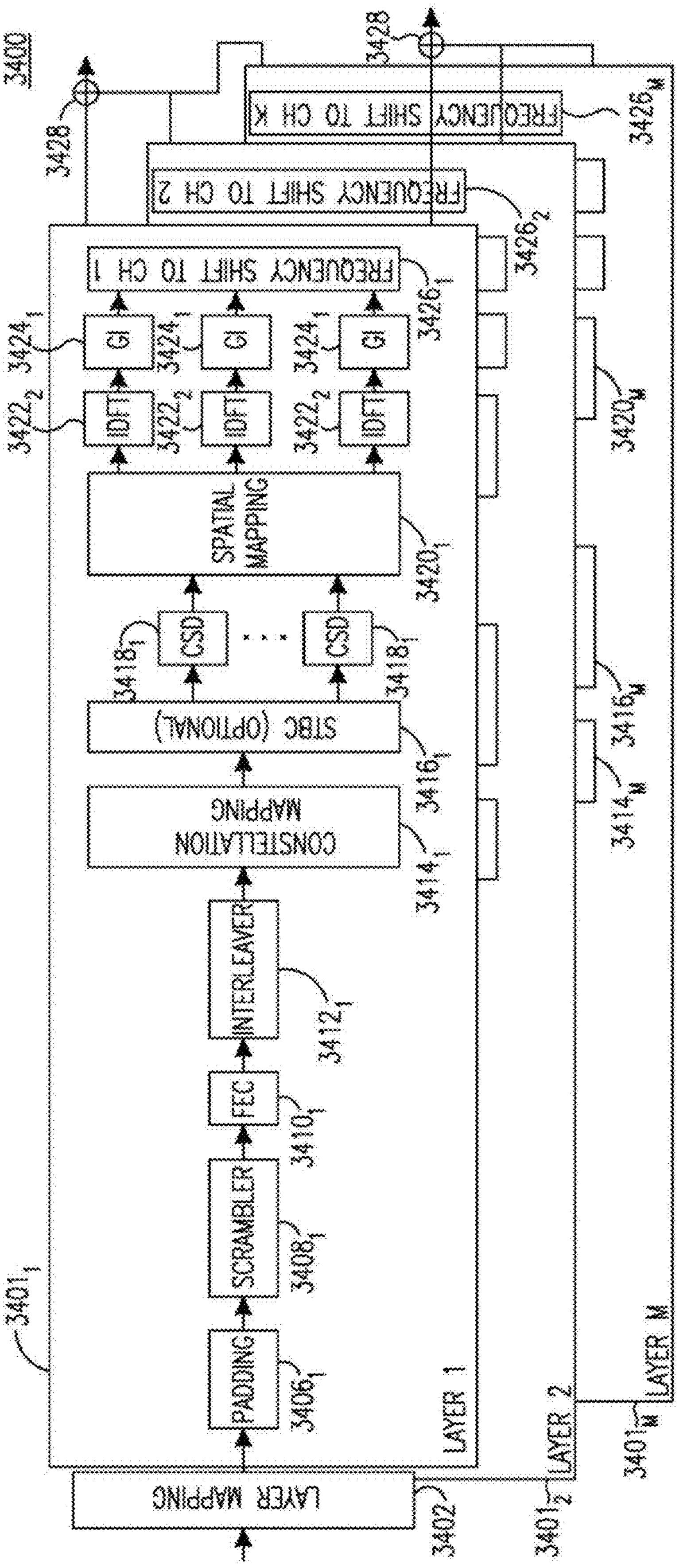
FIG. 34 shows an example transmission flow diagram for transmitting DL communications.

FIG. 34 shows an example transmission flow diagram 3400 at the AP side for DL transmission. Following layer mapping 3402, each layer $3404_{1 \ldots M}$ may apply any of the following to the signal: padding $3406_{1 \ldots M}$, scrambler $3408_{1 \ldots M}$, FEC $3410_{1 \ldots M}$, interleaver $3412_{1 \ldots M}$, constellation mapping $3414_{1 \ldots M}$, STBC $3416_{1 \ldots M}$, and CSD $3418_{1 \ldots M}$. Any of these elements may be omitted, for example, STBC $3416_{1 \ldots M}$.

In the example of FIG. 34, within each layer $3401_{1 \ldots M}$, spatial mapping $3420_{1 \ldots M}$ may generate a separate signal for each user, and a transmission flow may be applied to each user's signal, which may include IDFT $4322_{1 \ldots M}$, and GI insertion $3424_{1 \ldots M}$. Then, within each layer $3404_{1 \ldots M}$, frequency shifter $3426_{1 \ldots M}$ may shift the time domain signal to the k assigned frequency segments/channels. The frequency shift may be performed either at baseband or in the RF domain. For each transmit antenna, the summation 3428 of the time domain signals of all the users may be transmitted. The STF and LTF may be transmitted using the same bandwidth as data.

For a DL receiver design, the STA may need to know the frequency segment assigned to it, and may use a single-channel receiver on that frequency segment. For UL transmitter design, the STA may need to know the frequency segment assigned to it, and may use a transmitter on that frequency segment. In an example for UL receiver design, at the AP side, the received signal may be down-converted into K streams, and detection/decoding may be performed. In another example, the whole signal may be down converted to baseband with the following center frequency:

$$\frac{(\lfloor F_{C,MAX} + BW(F_{C,MAX})\rfloor - \lfloor F_{C,MIN} + BW(F_{C,MIN}\rfloor)}{2} \qquad \text{Equation 10}$$

where $F_{C,MAX}=\max(F_{C,k})$, $F_{C,MIN}=\min(F_{C,k})$, and $F_{C,k}$ is the center frequency of the $k^{th}$ user. Narrow band filtering may be applied on each frequency band, and followed by other receiving procedures. This scheme may be applied with or without MIMO schemes. MIMO scheme include, but are not limited to, spatial multiplexing, space-time block codes, and beamforming, among others.

In the above, the PPDUs may be transmitted within the contention free period, for example, when the MAC mechanism has set up the NAV protection for the whole period, and other STAs may not need to understand the particular SIG fields in the PPDUs. If a non-MU-PCA STA may need to detect a SIG field of the MU-PCA PPDUs, the PLCP header may be modified, or other modifications may be made. For example, the MU-PCA STF and LTF transmission may be removed or reduced, and LSTF and LLTF may be re-used. Like for symmetric transmit/receive, equal MCS and unequal MCS may be supported in this scheme. MCS levels may be indicated in SIG field.

Due to the operation channel bandwidth limitation, one user may be assigned multiple MAC packets. Also, several users may share the same MAC packet (e.g., broadcast packet or multicast packet). The PHY layer may be able to process all kinds of MAC packets for different scenarios. A general transmission block flow may be applied to asymmetrical bandwidth. A single user may be considered a special case for MU-PCA transmissions. In this case, for a single user transmission, the layer mapping may map one or more MAC packets to one layer. Then, one set of coding/modulation and MIMO scheme may be applied to this layer. In another example, layer mapping may map one or more MAC packets to multiple layers. In another example, separate coding/modulation, and MIMO scheme may be applied to multiple layers.

Although the solutions described herein consider 802.11 specific protocols, it is understood that the solutions described herein are not restricted to this scenario and are applicable to other wireless systems as well.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A wireless station (STA) comprising:

a transceiver; and a processor, wherein the transceiver and the processor are configured to:

receive, from an access point (AP), a group request to send a (G-RTS) control frame configured for a group of STAs and to reserve at least one channel, wherein the G-RTS control frame is configured to be received using a broadcast address, the G-RTS control frame comprising a type field for indicating a frame type as a control frame, wherein the G-RTS control frame includes first respective association identifiers (AIDs) for a plurality of STAs identified to transmit a clear-to-send (CTS) message, wherein the G-RTS control frame indicates at least one channel on which the CTS message is to be transmitted, and wherein the G-RTS control frame is configured, at least in part, to initiate a channel reservation for a downlink (DL) data transmission and an acknowledgment (ACK);

identify, in the G-RTS control frame, an AID of the STA from the AIDs corresponding to the STA and the at least one channel indicated for transmission of the CTS message;

transmit, to the AP, the CTS message using the indicated at least one channel, wherein the CTS message is configured to be transmitted at an end of a Short Interframe Space (SIFS) following receipt of the G-RTS control frame;

receive, from the AP in response to the CTS message, the DL data transmission;

transmit, to the AP, the ACK in response to the DL data transmission;

receive, from the AP, a control frame configured to trigger uplink data transmissions, wherein the control frame comprises a broadcast address and is configured to be received using the broadcast address, the control frame comprising a type field for indicating a frame type as the control frame, wherein the control frame includes respective assigned channel resource allocations and second AIDs for a plurality of STAs to perform uplink (UL) data transmissions, wherein the received control frame is configured to solicit simultaneous transmission of UL data from at least one other STA of the plurality of STAs during a period of time;

identify, in the control frame, an AID of the STA from the AIDs and a resource allocation from the assigned channel resource allocations corresponding to the AID, wherein the resource allocation indicates at least one channel;

transmit, to the AP, an UL data transmission over the at least one channel indicated in the resource allocation, the UL data transmission being transmitted at an end of a Short Interframe Space (SIFS) following receipt of the control frame; and receive, from the AP, an acknowledgement (ACK) in response to the UL data transmission, wherein the control frame comprises a duration field that defines a period to reserve the at least one channel indicated in the resource allocation to allow the UL data transmission to be transmitted and the ACK to be received.

2. The wireless STA of claim 1, wherein the control frame comprises a group clear-to-send (G-CTS) control frame.

3. The wireless STA of claim 1, wherein the UL data transmission comprises a physical layer convergence procedure (PLCP) protocol data unit (PPDU).

4. The wireless STA of claim 1, wherein the transceiver and processor are configured to receive a block acknowledgement in response to the UL data transmission.

5. The wireless STA of claim 1, wherein the DL data transmission comprises a physical layer convergence procedure (PLCP) protocol data unit (PPDU).

6. A method performed by a wireless station (STA), the method comprising:

receiving, from an access point (AP), a group request to send a (G-RTS) control frame configured for a group of STAs and to reserve at least one channel, wherein the G-RTS control frame is configured to be received using a broadcast address, the G-RTS control frame comprising a type field for indicating a frame type as a control frame, wherein the G-RTS control frame includes first respective association identifiers (AIDs) for a plurality of STAs identified to transmit a clear-to-send (CTS) message, wherein the G-RTS control frame indicates at least one channel on which the CTS message is to be transmitted, and wherein the G-RTS control frame is configured, at least in part, to initiate a channel reservation for a downlink (DL) data transmission and an acknowledgment (ACK);

identifying, in the G-RTS control frame, an AID of the STA from the AIDs corresponding to the STA and the at least one channel indicated for transmission of the CTS message;

transmitting, to the AP, the CTS message using the indicated at least one channel, wherein the CTS message is configured to be transmitted at an end of a Short Interframe Space (SIFS) following receipt of the G-RTS control frame;

receiving, from the AP in response to the CTS message, the downlink (DL) data transmission;

transmitting, to the AP, the ACK in response to the DL data transmission;

receiving, from the AP, a control frame configured to trigger uplink data transmissions, wherein the control frame comprises a broadcast address and is configured to be received using the broadcast address, the control frame comprising a type field for indicating a frame type as the control frame, wherein the control frame includes respective assigned channel resource allocations and second AIDs for a plurality of STAs to perform uplink (UL) data transmissions, wherein the received control frame is configured to solicit simultaneous transmission of UL data from at least one other STA of the plurality of STAs during a period of time;

identifying, in the control frame, an AID of the STA from the AIDs and a resource allocation from the assigned channel resource allocations corresponding to the AID, wherein the resource allocation indicates at least one channel;

transmitting, to the AP, an UL data transmission over the at least one channel indicated in the resource allocation, the UL data transmission being transmitted at an end of a Short Interframe Space (SIFS) following receipt of the control frame; and receiving, from the AP, an acknowledgement (ACK) in response to the UL data transmission, wherein the control frame comprises a duration field that defines a period to reserve the at least one channel indicated in the resource allocation to allow the UL data transmission to be transmitted and the ACK to be received.

7. The method of claim 6, wherein the control frame comprises a group clear-to-send (G-CTS) control frame.

8. The method of claim 6, wherein the UL data transmission comprises a physical layer convergence procedure (PLCP) protocol data unit (PPDU).

9. The method of claim 6, comprising receiving a block acknowledgement in response to the data transmission.

10. The method of claim 6, wherein the DL data transmission comprises a physical layer convergence procedure (PLCP) protocol data unit (PPDU).

11. An access point (AP) comprising:

a transceiver; and a processor, wherein the transceiver and the processor are configured to:

transmit, to a (STA), a group request to send a (G-RTS) control frame configured for a group of STAs and to reserve at least one channel, wherein the G-RTS control frame is configured to be received by the STA using a broadcast address, the G-RTS control frame comprising a type field for indicating a frame type as a control frame, wherein the G-RTS control frame includes first respective association identifiers (AIDs) for a plurality of STAs identified to transmit a clear-to-send (CTS) message, wherein the G-RTS control frame indicates at least one channel on which the CTS message is to be transmitted by the STA, and wherein the G-RTS control frame is configured, at least in part, to initiate a channel reservation for a downlink (DL) data transmission and an acknowledgment (ACK);

receive, from the STA, the CTS message using the indicated at least one channel, wherein the CTS message is configured to be sent by the STA at an end of a Short Interframe Space (SIFS) following receipt of the G-RTS control frame at the STA;

transmit, to the STA in response to the CTS message, the DL data transmission;

receive, from the STA, the ACK in response to the DL data transmission;

transmit, to the STA, a control frame configured to trigger uplink data transmissions, wherein the control frame comprises a broadcast address and is configured to be received by the STA using the broadcast address, the control frame comprising a type field for indicating a frame type as the control frame, wherein the control frame includes respective assigned channel resource allocations and second AIDs for a plurality of STAs to perform uplink (UL) data transmissions, wherein the transmitted control frame is configured to solicit simultaneous transmission of UL data from at least one other STA of the plurality of STAs during a period of time;

receive, from the STA, an UL data transmission over the at least one channel indicated in a resource allocation, the UL data transmission configured to an end of a Short Interframe Space (SIFS) following the control frame; and transmit, to the STA, an acknowledgement (ACK) in response to the UL data transmission, wherein the control frame comprises a duration field that defines a period to reserve the at least one channel indicated in the resource allocation to allow the UL data transmission to be received and the ACK to be transmitted.

12. The AP of claim 11, wherein the control frame comprises a group clear-to-send (G-CTS) control frame.

13. The AP of claim 11, wherein the UL data transmission comprises a physical layer convergence procedure (PLCP) protocol data unit (PPDU).

14. The AP of claim 11, wherein the transceiver and processor are configured to transmit a block acknowledgement in response to the data transmission.

15. The AP of claim 11, wherein the DL data transmission comprises a physical layer convergence procedure (PLCP) protocol data unit (PPDU).

16. A method performed by an access point (AP), the method comprising:

transmitting, to a (STA), a group request to send a (G-RTS) control frame configured for a group of STAs and to reserve at least one channel, wherein the G-RTS control frame is configured to be received by the STA using a broadcast address, the G-RTS control frame comprising a type field for indicating a frame type as a control frame, wherein the G-RTS control frame includes first respective association identifiers (AIDs) for a plurality of STAs identified to transmit a clear-to-send (CTS) message, wherein the G-RTS control frame indicates at least one channel on which the CTS message is to be transmitted by the STA, and wherein the G-RTS control frame is configured, at least in part, to initiate a channel reservation for a downlink (DL) data transmission and an acknowledgment (ACK);

receiving, from the STA, the CTS message using the indicated at least one channel, wherein the CTS message is configured to be sent by the STA at an end of a Short Interframe Space (SIFS) following receipt of the G-RTS control frame at the STA;

transmitting, to the STA in response to the CTS message, the DL data transmission;

receiving, from the STA, the ACK in response to the DL data transmission;

transmitting, to the STA, a control frame configured to trigger uplink data transmissions, wherein the control frame comprises a broadcast address and is configured to be received by the STA using the broadcast address, the control frame comprising a type field for indicating a frame type as the control frame, wherein the control frame includes respective assigned channel resource allocations and second AIDs for a plurality of STAs to perform uplink (UL) data transmissions, wherein the transmitted control frame is configured to solicit simultaneous transmission of UL data from at least one other STA of the plurality of STAs during a period of time;

receiving, from the STA, an UL data transmission over the at least one channel indicated in a resource allocation, the UL data transmission configured to an end of a Short Interframe Space (SIFS) following the control frame; and transmitting, to the STA, an acknowledgement (ACK) in response to the UL data transmission, wherein the control frame comprises a duration field that defines a period to reserve the at least one channel indicated in the resource allocation to allow the UL data transmission to be received and the ACK to be transmitted.

17. The method of claim 16, wherein the control frame comprises a group clear-to-send (G-CTS) control frame.

18. The method of claim 16, wherein the UL data transmission comprises a physical layer convergence procedure (PLCP) protocol data unit (PPDU).

19. The method of claim 16, comprising transmitting a block acknowledgement in response to the data transmission.

20. The method of claim 16, wherein the DL data transmission comprises a physical layer convergence procedure (PLCP) protocol data unit (PPDU).

* * * * *